US00RE48526E

(19) United States
(12) Reissued Patent
Yabe et al.

(10) Patent Number: US RE48,526 E
(45) Date of Reissued Patent: Apr. 20, 2021

(54) MAGNETIC ENCODER AND BEARING

(71) Applicant: NSK LTD., Tokyo (JP)

(72) Inventors: Toshikazu Yabe, Kanagawa (JP); Takeshi Murakami, Kanagawa (JP); Nariaki Aihara, Kanagawa (JP); Toshimi Takajo, Kanagawa (JP)

(73) Assignee: NSK LTD., Tokyo (JP)

(21) Appl. No.: 16/437,837

(22) Filed: Jun. 11, 2019

Related U.S. Patent Documents

Reissue of:
(64) Patent No.: 7,592,798
Issued: Sep. 22, 2009
Appl. No.: 10/586,990
PCT Filed: Jan. 18, 2005
PCT No.: PCT/JP2005/000526
§ 371 (c)(1),
(2) Date: Jul. 21, 2006
PCT Pub. No.: WO2005/071362
PCT Pub. Date: Aug. 4, 2005

(30) Foreign Application Priority Data

Jan. 22, 2004 (JP) ..... 2004-014033
Jan. 30, 2004 (JP) ..... 2004-024111
(Continued)

(51) Int. Cl.
*G01P 3/48* (2006.01)
*G01P 3/54* (2006.01)
(Continued)

(52) U.S. Cl.
CPC ..... *F16C 19/186* (2013.01); *F16C 33/7879* (2013.01); *F16C 41/007* (2013.01);
(Continued)

(58) Field of Classification Search
CPC ..... G01P 3/48; G01P 3/54; F16C 19/06
(Continued)

(56) References Cited

U.S. PATENT DOCUMENTS 4,549,157 A * 10/1985 Loubier ..... 335/303
6,872,325 B2 * 3/2005 Bandyopadhyay et al. ..... 252/62.54
(Continued)

FOREIGN PATENT DOCUMENTS

JP 60-55054 A 3/1985
JP S60-55054 A 3/1985
(Continued)

OTHER PUBLICATIONS

International Search Report for PCT/JP2005/000526 dated Apr. 26, 2005.
(Continued)

*Primary Examiner* — My Trang Ton
(74) *Attorney, Agent, or Firm* — Sughrue Mion, PLLC

(57) ABSTRACT

A magnet portion 27 of a magnetic encoder 26 includes a magnetic member and a resin, and a highly reliable magnetic encoder 26 having a high magnetic property and enabling to detect a rotational number with high accuracy, and a hub unit bearing 2a are provided. Further, the resin is preferably a thermoplastic resin and further preferably includes a thermoplastic resin including a soft segment in a molecule. Further, the magnetic encoder 26 further includes a fixed member 25 attached with the magnet portion 27 and comprising a magnetic material, and the magnet portion 27 and the fixed member 25 are bonded by an adhering agent including at least one of a phenolic resin based and an epoxy resin based.

17 Claims, 46 Drawing Sheets

(30) Foreign Application Priority Data

May 19, 2004 (JP) ..... 2004-148741
Oct. 1, 2004 (JP) ..... 2004-289967

(51) Int. Cl.

| | |
|---|---|
| ***F16C 19/06*** | (2006.01) |
| ***F16C 19/18*** | (2006.01) |
| ***F16C 33/78*** | (2006.01) |
| ***F16C 41/00*** | (2006.01) |
| ***F16J 15/326*** | (2016.01) |
| ***G01P 3/44*** | (2006.01) |
| ***G01P 3/487*** | (2006.01) |

(52) U.S. Cl.
CPC ..... *F16J 15/326* (2013.01); *G01P 3/443* (2013.01); *G01P 3/487* (2013.01); *F16C 2326/02* (2013.01)

(58) Field of Classification Search
USPC ..... 324/166, 167, 173, 174, 178, 179; 341/15, 16; 384/448
See application file for complete search history.

(56) References Cited

U.S. PATENT DOCUMENTS

| | | | | |
|---|---|---|---|---|
| 7,207,723 | B2 * | 4/2007 | Nakajima | F16C 19/184 384/448 |
| 7,229,708 | B2 * | 6/2007 | Abe et al. | 428/840.5 |
| 7,374,343 | B2 * | 5/2008 | Nakajima | F16C 33/7879 324/174 |
| 2002/0141673 | A1 * | 10/2002 | Ito et al. | 384/448 |
| 2003/0059139 | A1 * | 3/2003 | Nakajima | 384/448 |
| 2004/0220316 | A1 | 11/2004 | Abe et al. | |
| 2005/0275565 | A1 * | 12/2005 | Nachtigal et al. | 341/16 |

FOREIGN PATENT DOCUMENTS

| | | | |
|---|---|---|---|
| JP | S61-164215 | A | 7/1986 |
| JP | S63-54712 | A | 3/1988 |
| JP | S64-25716 | U | 2/1989 |
| JP | H06-331384 | A | 12/1994 |
| JP | H07-237266 | A | 9/1995 |
| JP | H08-227819 | A | 9/1996 |
| JP | H10-285895 | A | 10/1998 |
| JP | 2000-60080 | A | 2/2000 |
| JP | 2000-158476 | A | 6/2000 |
| JP | 2000-195714 | A | 7/2000 |
| JP | 2001-255337 | A | 9/2001 |
| JP | 2001-272250 | A | 10/2001 |
| JP | 2001-323942 | A | 11/2001 |
| JP | 2002-228675 | A | 8/2002 |
| JP | 2003-035565 | A | 2/2003 |
| JP | 2003-57070 | A | 2/2003 |
| JP | 2003-130684 | A | 5/2003 |
| JP | 2003-183443 | A | 7/2003 |
| JP | 2003-222150 | A | 8/2003 |
| JP | 2003-280394 | A | 10/2003 |
| JP | 2003-297621 | A | 10/2003 |
| JP | 2004-011827 | A | 1/2004 |
| JP | 2004-037441 | A | 2/2004 |
| JP | 2004-150859 | A | 5/2004 |

OTHER PUBLICATIONS

International Preliminary Report on Patentability for PCT/JP2005/000526 dated Aug. 31, 2006.

Japanese Office Action dated Aug. 12, 2008.

Chinese Office Action dated Feb. 20, 2009.

* cited by examiner

METAL SIDE

MAGNETIC ENCODER AND BEARING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 7,592,798, which was filed as U.S. application Ser. No. 10/586,990, issued on Sep. 22, 2009, which is a U.S. national stage application under 35 U.S.C. § 371 of International Application No. PCT/JP2005/000526 filed on Jan. 18, 2005, and which claims priority to JP 2004-289967 filed Oct. 1, 2004, JP 2004-148741, filed May 19, 2004, JP 2004-024111, filed Jan. 30, 2004, and JP 2004-014033, filed Jan. 22, 2004, the disclosures of each of which are hereby incorporated by reference in their entirety.*

TECHNICAL FIELD

The present invention relates to a magnetic encoder used for detecting a rotational number of a rotating member, and a bearing therefor.

RELATED ART

In a background art, there is known a rotational number detecting apparatus used for anti-skid used for preventing skidding (a phenomenon in which a wheel is slipped substantially in a stopped state) of an automobile, or a traction control (a control of unnecessary idle rotation of a drive wheel which is liable to be brought about in starting or in accelerating) for effectively transmitting a drive force to a road face or the like, including an encoder in a shape of a circular ring magnetized with N poles and S poles alternately in a circumferential direction, and a sensor for detecting a change in a magnetic field at a vicinity of the encoder for rotating the encoder along with rotation of a wheel by arranging the encoder along with a hermetically sealing apparatus for hermetically sealing a bearing for supporting the wheel and detecting a change in the magnetic field in synchronism with rotation of the wheel by the sensor (refer to, for example, Patent References 1, 2).

As shown by FIG. 47, the sealed rotational number detecting apparatus described in Patent Reference 1 is constituted by a seal member 302 attached to an outer ring 301a, a slinger 303 fitted to an inner ring 301b, an encoder 304 attached to an outer side face of the slinger 303 for generating a magnetic pulse, and a sensor 305 arranged proximately to the encoder 304 for detecting the magnetic pulse. According to a bearing unit attached with the sealed rotational number detecting apparatus, a foreign matter of dust, water or the like is prevented from invading inside of the bearing by the seal member 302 and the slinger 303, and a lubricant filled at inside of the bearing is prevented from leaking to outside of the bearing. Further, the encoder 304 generates the magnetic pulses of a number in correspondence with a number of the poles during a time period in which the inner ring 301b is rotated by one rotation, and detects a rotational number of the inner ring 301b by detecting the magnetic pulses by the sensor 305.

In the background art, a rubber magnet constituted by mixing a magnetic powder to rubber is used for a magnetic encoder used for a bearing for a wheel. The magnetic encoder comprising the rubber magnet is preferably bonded to a slinger by vulcanizing adhesion and therefore, a difference of thermal elongation and contraction produced between the rubber magnet and the slinger under a severe temperature environment (−40° C. through 120° C.) can be absorbed by an elastic deformation thereof. Therefore, even under the above-described temperature environment, a property thereof of fixedly adhering to the slinger is maintained and a problem of exfoliation is difficult to be brought about. Generally, nitrile rubber including ferrite as a magnetic powder is used for the magnetic rubber for the encoder and a state of mechanically orienting the magnetic powder is brought about by being kneaded by a roll.

Patent Reference 1: JP-A-2001-255337

Patent Reference 2: JP-A-2003-57070

DISCLOSURE OF THE INVENTION

Problems that the Invention is to Solve

In recent years, in order to detect a rotational number of a wheel further accurately, a magnet portion of a magnetic encoder tends to be constituted by multipoles further in a circumferential direction. However, according to the ferrite including rubber magnetic encoder by the mechanical orientation method of the background art, a magnetic flux density per pole is reduced, in order to accurately detect the rotational number, it is necessary to reduce a gap (that is, air gap) between the sensor and the magnet and therefore, there is a concern that integration thereof becomes difficult. Therefore, in order to increase the air gap in view of integration performance, it is necessary to promote a magnetic property of the magnet.

However, when an amount of mixing the magnetic power is increased in order to promote the magnetic property of the rubber magnet, an elasticity thereof is reduced with reduction in a strength thereof and therefore, excellent thermal shock resistance is significantly deteriorated. Therefore, operation of absorbing the difference in thermal elongation between the rubber magnet and the slinger is deteriorated and therefore, there is a concern that the rubber magnet is exfoliated to be detached from the slinger, or a crack or a fissure is brought about in the rubber magnet.

The present invention has been carried out in order to resolve the above-described problem and it is an object thereof to provide a highly reliable magnetic encoder having a high magnetic property and capable of highly accurately detecting a rotational number, and a bearing therefor. Further, it is an object of the invention to provide a magnetic encoder capable of preventing a crack from being brought about at a magnet portion and preventing the magnet portion from being detached from a slinger constituting a fixing member even under a severe condition of use.

Means For Solving The Problems

The above-described object of the invention is achieved by following constitutions.

(1) A magnetic encoder including: a magnet portion substantially in a circular ring shape magnetized in multipoles in a circumferential direction, wherein the magnet portion includes a magnetic member and a resin.

(2) The magnetic encoder according to (1), wherein the resin is a thermoplastic resin.

(3) The magnetic encoder according to (2), wherein the thermoplastic resin includes a thermoplastic resin at least having a soft segment in a molecule.

(4) The magnetic encoder according to (1), further including: a fixed member including a magnetic material attached with the magnet portion, wherein the magnet portion and the fixed member are bonded by an adhering agent including at least one of a phenole resin based and an epoxy resin based.

(5) The magnetic encoder according to any one of (2) through (4), wherein the magnet portion is formed by injection molding.

(6) The magnetic encoder according to (5), wherein the injection molding is of a disk gate type.

(7) A bearing including: a fixed ring, a rotating ring, a plurality of rolling members rollably arranged in a circumferential direction between the fixed ring and the rotating ring, and the magnetic encoder according to any one of (1) through (6) in which the fixed member is fixed to the rotating ring.

(8) The bearing according to (7), wherein the bearing is a bearing for a wheel.

Advantage Of The Invention

According to the magnetic encoder of the invention, the magnet portion is constructed by a constitution of including the magnetic member and the resin and therefore, a comparatively large amount of a magnetic powder can be mixed to a rubber magnet, the magnetic encoder having an excellent magnetic property can be provided, further, an anisotropic magnet facilitated to be molded by injection molding in a state of being applied with a magnetic field (magnetic field molding) and indispensable for manifesting an excellent magnetic property can be provided.

Further, according to the magnetic encoder of the invention, the resin is preferably a thermoplastic resin, further preferably includes a thermoplastic resin including a soft segment in a molecule and therefore, a crack can be prevented from being brought about at the magnet portion, and reliability can be promoted.

Further, according to the magnetic encoder of the invention, the magnetic encoder further includes a fixed member comprising a magnetic material, the magnet portion and the fixed member are bonded by an adhering agent including at least one of a phenolic resin based and an epoxy resin based and therefore, exfoliation is difficult to be brought about at an adhering portion and reliability can be promoted.

Further, according to the magnetic encoder of the invention, the magnet portion is molded by injection molding of a disk gate type and therefore, a magnet material is molded by injection molding in a shape of a radial circle, and is provided with a high mechanical strength without producing a weld portion, and is excellent in a magnetic property in which an orientation degree of the magnetic member included in the encoder is high.

DESCRIPTION OF REFERENCE NUMERALS AND SIGNS

Figure 1:
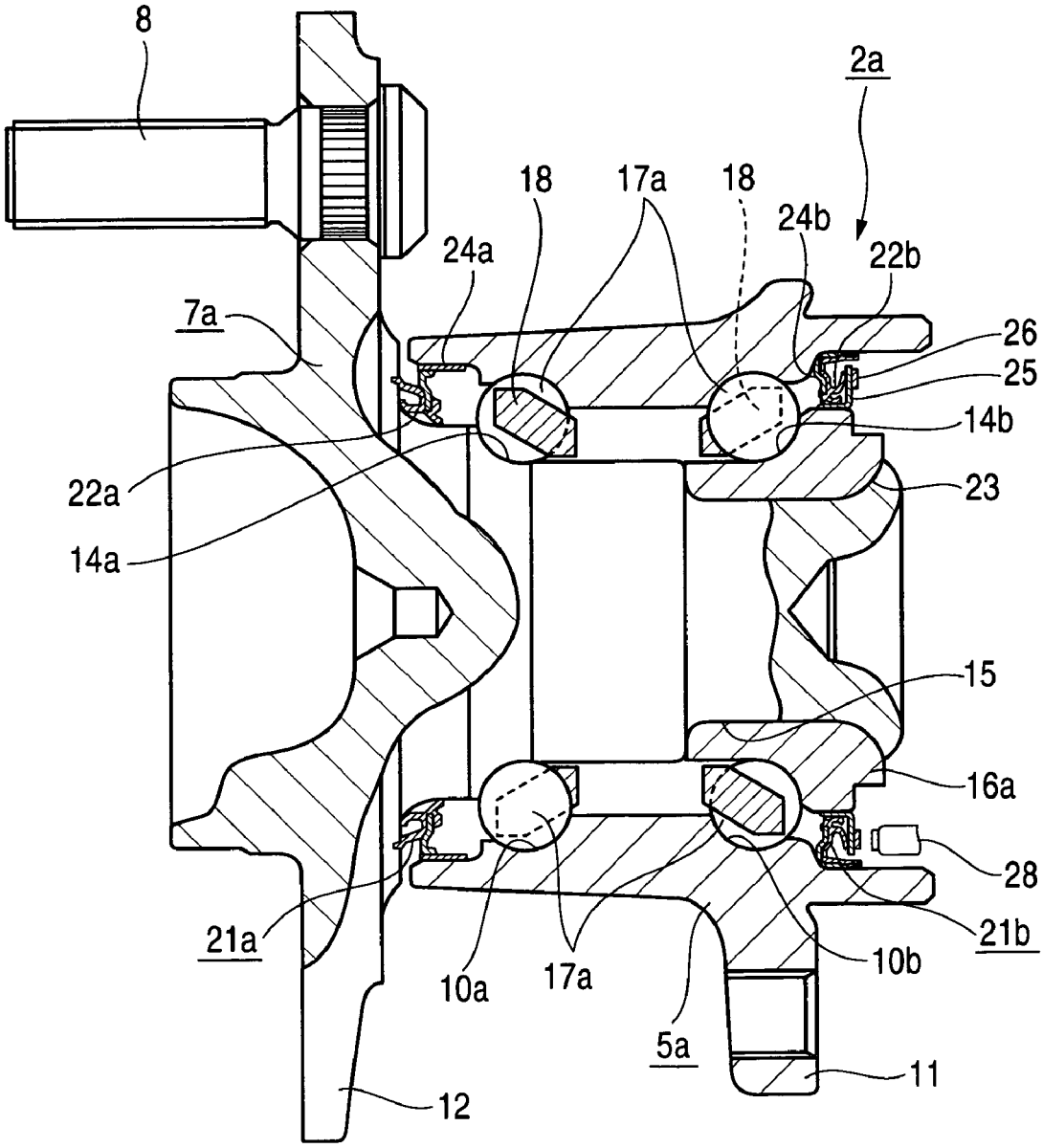
FIG. 1 is a sectional view showing a rolling bearing unit according to a first embodiment of the invention.

2a, 30, 260 hub unit bearings (bearings)
5a outer ring (fixed ring)
7a hub (rotating ring)
11 bonding flange
12 attaching flange
16a inner ring (rotating ring)
17a ball (rolling member)
21a, 21b seal rings
22a, 22b elastic members
24a, 24b core metals
25, 33, 60, 110, 151, 242 slingers (fixed members)
26, 31, 46, 120, 160, 222, 240, 270 magnetic encoders
27, 34 magnetic pole forming ring (magnet portion)
28, 32, 47, 227 sensors
40, 100, 150, 230 rolling bearing units
41 outer ring (fixed ring)
42 inner ring (rotating ring)
43 ball (rolling member)
45 hermetically sealing apparatus
50 seal member
70, 121, 161, 221, 241, 271 magnet portions
200 main shaft apparatus
220, 272 fixed members
242a first slinger member (fixed member)
242b second slinger member (fixed member)

BEST MODE FOR CARRYING OUT THE INVENTION

A detailed explanation will be given of respective embodiments of a magnetic encoder and a bearing of the invention in reference to the drawings as follows.

FIRST EMBODIMENT

FIG. 1 shows a case of applying the invention to the hub unit 2a constituting a bearing for a wheel for supporting a driven wheel supported by a suspension of an independent suspension type of an example of an embodiment of the invention. Further, a constitution and operation other than a characteristic of the invention are equivalent to those of a structure which has widely been known in a background art and therefore, an explanation thereof will be simplified and an explanation will be given centering on a characteristic portion of the invention as follows.

The hub unit bearing 2a includes the outer ring 5a constituting a fixed ring, the hub 7a and the inner ring 16a constituting rotating rings (rotating members) rotated integrally with the attaching flange 12 for fixing a wheel (not illustrated), the balls 17a, 17a constituting a plurality of rolling members rollably arranged in a peripheral direction between the outer ring 5a and the hub 7a and the inner ring 16, and the magnetic encoder 26.

The inner ring 16a outwardly fitted to a small diameter stepped portion 15 formed at an inner end portion of the hub 7a is coupled to be fixed by the hub 7a by pressing an inner end portion thereof by a calked portion 23 formed by calking to widen the inner end portion of the hub 7a to an outer side in a diameter direction. Further, the wheel is made to be able to be coupled to fix to the attaching flange 12 formed at an outer end portion of the hub 7a and a portion projected from an outer end portion of the outer ring 5a constituting a fixed ring by studs 8 implanted in a circumferential direction at predetermined intervals. In contrast thereto, the outer ring 5a is made to be able to be coupled to fix to a knuckle or the like, not illustrated, constituting a suspension apparatus by the bonding flange 11 formed at an outer peripheral face thereof. The plurality of balls 17a, 17a guided by retainers 18 are rollably arranged in a peripheral direction between the outer ring 5a and the hub 7a and the inner ring 16a.

Further, the seal rings 21a, 21b are provided respectively between inner peripheral faces of both end portions of the outer ring 5a, an outer peripheral face of a middle portion of the hub 7a and an outer peripheral face of an inner end portion of the inner ring 16a. The respective seal rings 21a, 21b blocks a space provided with the respective balls 17a, 17a from an outer space between the inner peripheral face of the outer ring 5a and the outer peripheral faces of the hub 7a and the inner ring 16a.

The respective seal rings 21a, 21b are constituted by reinforcing the elastic members 22a, 22b by the core metals 24a, 24b constituting a section thereof by an L-like shape and constituting a total thereof by a shape of a circular ring by bending to form a mild steel plate. According to the respective seal rings 21a, 21b, the respective core metals 24a, 24b are inwardly fitted to both end portions of the outer ring 5a by tight fit, front end portions of seal lips constituted by the respective elastic members 22a, 22b are slidingly provided to the slingers 25 outwardly fitted to fix to the outer peripheral face of the middle portion of the hub 7a, or the outer peripheral face of the inner end portion of the inner ring 16a over entire peripheries thereof.

Figure 2:
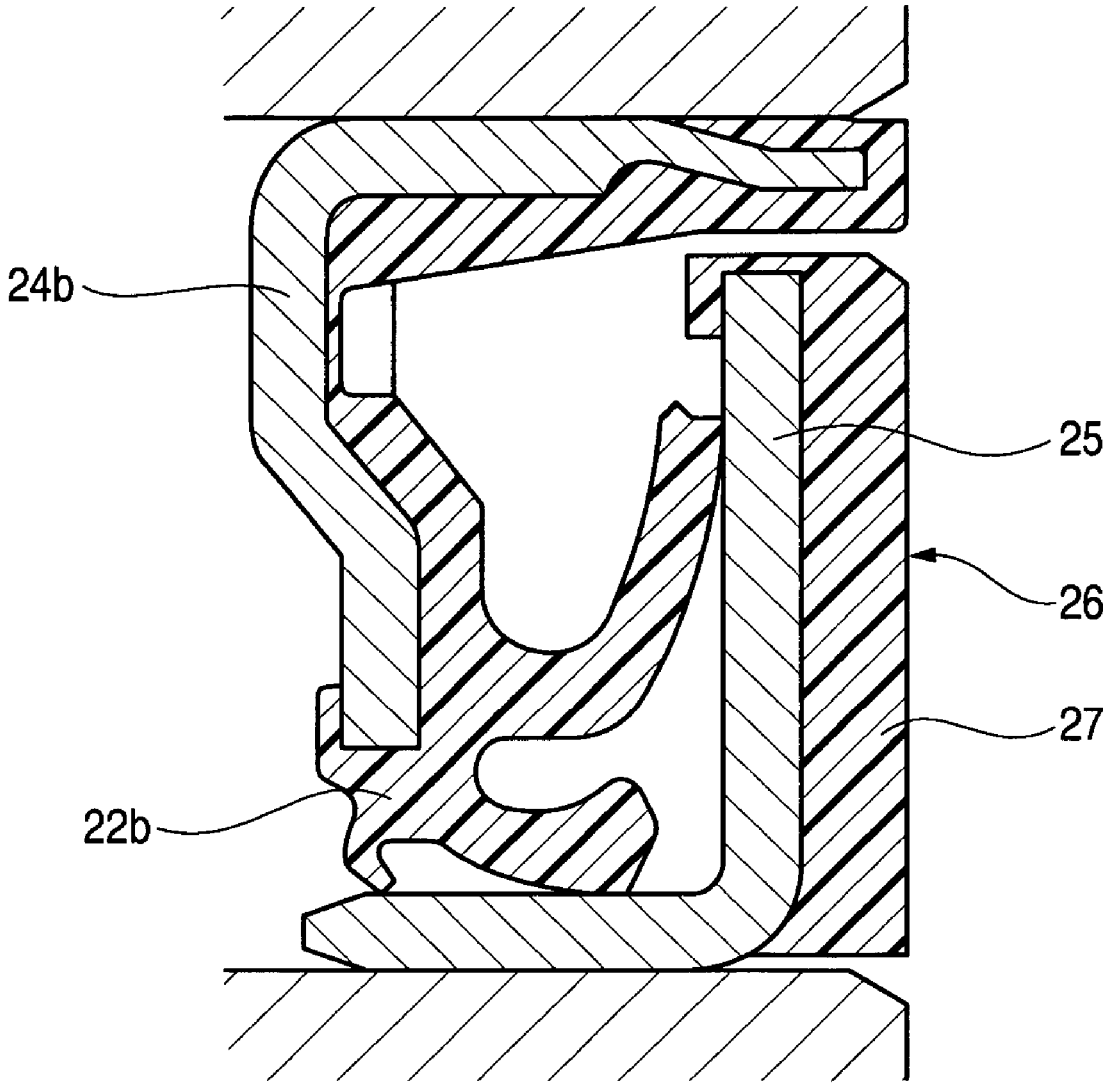
FIG. 2 is a sectional view showing a sealing apparatus including a magnetic encoder according to the first embodiment of the invention.
Figure 3:
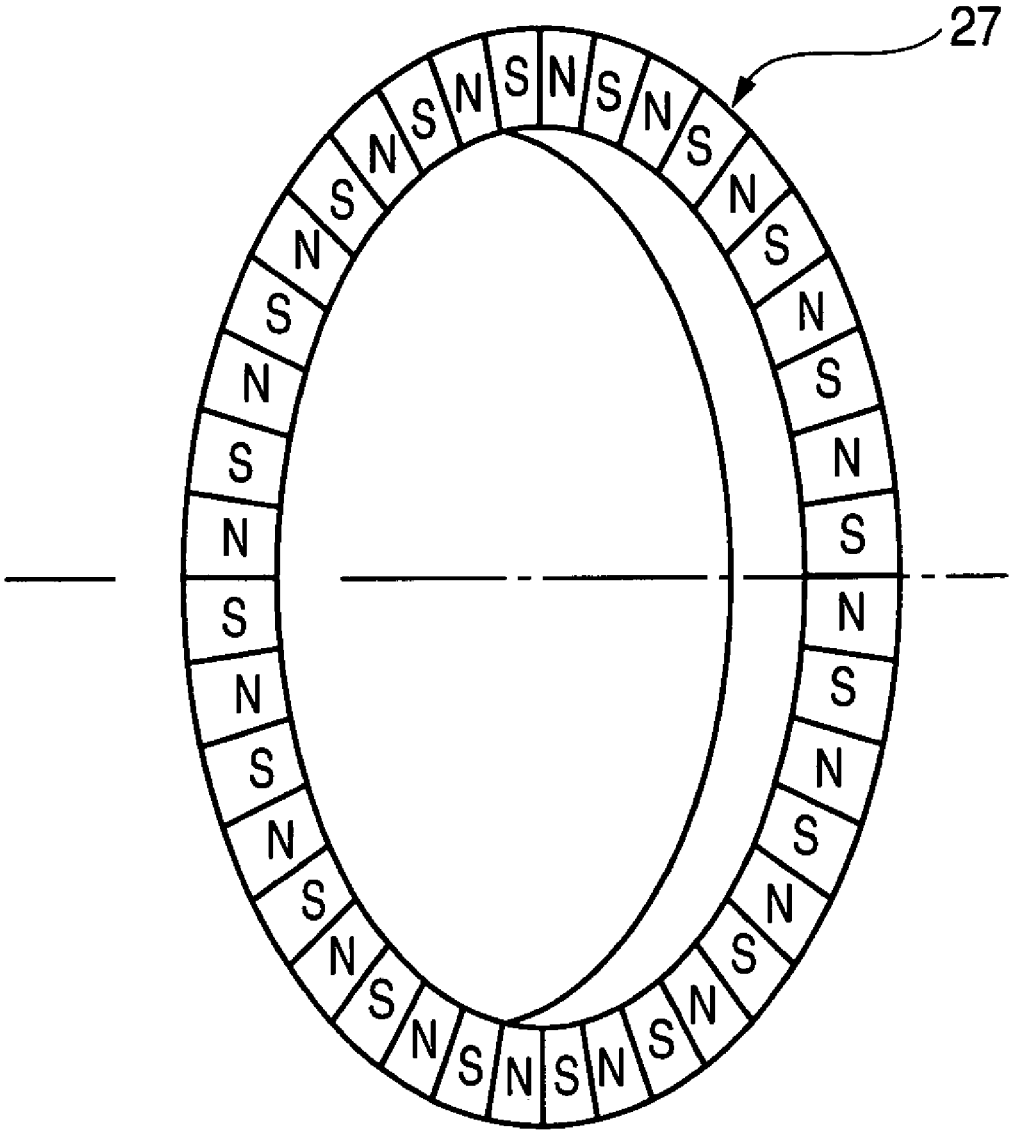
FIG. 3 is a perspective view showing an example of magnetizing multipoles in a circumferential direction of the magnetic encoder.

Further, as shown by FIG. 2, the magnetic encoder 26 is constituted by the slinger 25 constituting the fixed member, and the magnetic pole forming ring 27 constituting the magnet portion integrally coupled to a side face of the slinger 25. As shown by FIG. 3, the magnetic pole forming ring 27 is constituted by magnets of multipoles and alternately formed with N poles and S poles in a peripheral direction thereof. Further, the magnetic sensor 28 is arranged to be opposed to the magnetic pole forming ring 27 (refer to FIG. 1).

According to the invention, as a material of the magnet of the magnetic pole forming ring 27 of the magnetic encoder 26, an anisotropic magnet portion compound including 86 through 92 weight % (60 through 80 volume %) of a magnetic powder for anisotropy and constituting a binder by a thermoplastic resin can preferably be used. As the magnetic powder, ferrite of strontium ferrite, barium ferrite or the like, rare earth magnetic powders of neodymium-iron-boron, samarium-cobalt, samarium-iron or the like can be used. Further, when a rare earth based magnetic powder is used, since oxidization resistance thereof is lower than that of ferrite based and therefore, in order to maintain a stable magnetic property over a long period of time, a surface of the encoder may be provided with a surface treatment layer of electrolytic nickel plating, electroless nickel plating, epoxy resin coating, silicone resin coating, or fluororesin coating or the like.

Further, as the magnetic powder, in consideration of weatherproof, ferrite of strontium ferrite or the like is the most preferable, in order to further promote the magnetic property of ferrite, lanthanum and cobalt or the like may be mixed thereto, or a portion of ferrite may be replaced by a rare earth magnetic powder of neodymium-iron-boron, samarium-cobalt, samarium-iron or the like. When a content of the magnetic powder is less than 86 weight %, a magnetic property equal to or lower than that of a ferrite based rubber magnet which has been used in the background art is constituted, it is difficult to magnetize multipoles in a circumferential direction by a fine pitch, which is not preferable. In contrast thereto, when the content of the magnetic powder exceeds 92 weight %, an amount of the resin binder becomes excessively small, the strength of a total of the magnet is reduced, at the same time, it is difficult to form the magnet, and practical performance is deteriorated.

As the binder, a thermoplastic resin which can be molded by injection molding is preferable, polyamide based resin of polyamide 6, polyamide 12, polyamide 612, polyamide 11 and polyphenylene sulfide (PPS) can be used. Thereby, the encoder can be molded by injection molding in a magnetic field and the magnetic powder in the encoder can be oriented by the magnetic field. Generally, an orientation degree of the magnetic member can be increased in magnetic field orientation rather than mechanical orientation and the magnetic property can be promoted. Further, there is a possibility that the encoder is splashed with calcium chloride used as a snow melting agent along with water and therefore, it is particularly preferable to constitute the resin binder by polyamide 12, polyamide 612, polyamide 11, PPS having inconsiderable water absorbing property.

Further, in order to prevent a crack produced in various environments of a temperature change or the like, there may be constituted a mixture constituting a major constituent by thermoplastic resin having a soft segment in a molecule, specifically, denatured polyamide resin constituting a block copolymer having a hard segment comprising polyamide of polyamide 12 or the like and a soft segment of polyether component and further mixed with at least one kind of normal polyamide selected from a group of polyamide 12, polyamide 11, polyamide 612 in order to maintain a balance with tensile strength, heat resistance or the like.

As denatured polyamide 12 resin constituting a hard segment by polyamide 12, there are pointed out compounds provided by polymerizing aminocarboxylic acid compound represented by formula (A1) and/or lactam compound represented by formula (A2), triblockpolyetherdiamine compound represented by formula (B), and diacarboxylic acid compound represented by formula (C).

[chemical 1]

$$H_2N-R^1-COOH \quad \text{(A1)}$$

(where, $R^1$ represents connecting group including hydrocarbon chain)

[chemical 2]

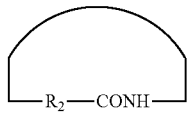

(A2)

(where, $R_2$ represents connecting group including hydrocarbon chain)

[chemical 3]

$$H_2N-\left(CH(CH_3)CH_2O\right)_x-\left(CH_2CH_2CH_2CH_2-O\right)_y-\left(CH_2CH(CH_3)O\right)_z-CH_2CH(CH_3)-NH_2 \quad \text{(B)}$$

(where, x designates numerical values of 1 through 20, y designates numerical values of 4 through 50, and z designates numerical values of 1 through 20)

[chemical 4]

$$HOOC-(R^3)_m-COOH \quad \text{(C)}$$

(where, R3 represents connecting group including hydrocarbon chain, m designates 0 or 1)

Here, it is preferable to use aminocarboxylic acid compound and/or lactam compound by an amount of 10 through 95 mass % relative to a total amount of compound of formula (A), compound of formula (A2), compound of formula (B) and compound of formula (C).

Further, it is preferable to use 15 through 70 mass % of compound of formula (A1) and/or compound of formula (A2), and a total amount of compound of formula (B) and compound of formula (C) by an amount of 30 through 85 mass %.

Further, $R^1$ of formula (A1) may include alkylene group of carbon atom number of 2 through 20, $R^2$ of formula (A2) may include alkylene group of carbon atom number of 3 through 20.

Further, it is preferable that x of formula (B) represents numerical values of 2 through 6, y represents numerical values of 6 through 12, and z represents numerical values of 1 through 5, x of formula (B) represents numerical values 2 through 10, y represents numerical values of 13 through 28, and z represents numerical values of 1 through 9.

Denatured polyamide 12 resin having a melting point in a range of 145 through 176° C., a bending elastic modulus in a range of 60 through 500 MPa can preferably be used. In consideration of heat resistance, prevention of crack generation, further preferably, the melting point is in a range of 150 through 162° C., the bending elastic modulus is in a range of 65 through 250 MPa. When denatured polyamide 12 resin having a melting point less than 145° C., or a bending elastic modulus less than 60 is used, as a total of a magnet material, although flexibility is promoted, heat resistance, strength or the like is conceived to be deteriorated, which is not preferable. In contrast thereto, when the bending elastic modulus exceeds 500 MPa, an effect of improving the flexibility is low, and it is difficult to increase a bending amount to a level of achieving an effect in preventing crack generation.

Further, a plastic magnet material used in the invention subjected to magnetic domain orientation (axial anisotropy) in a thickness direction of a ring-like magnet is preferable, the magnetic property is in a range of 1.3 through 15 MGOe as a maximum energy product (BHmax), further preferably, 1.8 through 12 MGOe. When the maximum energy product is less 1.3 MGOe, the magnetic property is excessively low and therefore, it is necessary to arrange the magnet to be considerably proximate to the sensor as a distance thereto in order to detect a rotational number, the magnet is not considerably different from the ferrite including rubber magnet of the background art and promotion of a function thereof cannot be expected. When the maximum energy product exceeds 15 MGOe, the excessive magnetic property is provided, according to a composition centering on comparatively inexpensive ferrite, the magnetic property cannot be achieved, it is necessary to blend rare earth magnetic powder of neodymium-iron-boron or the like by a large amount and therefore, the composition is very expensive, molderability thereof is poor and practical performance is low.

Further, the magnet material of the magnetic pole forming ring 27 used in the invention is provided with maximum energy product MHmax higher than that of rubber based ferrite magnet, preferably, the high magnetic property is maintained as the ferrite based magnet in a range of 1.63 through 2.38 MGOe (13 through 19 kJ/$m^3$) and at the same time, excellent in flexibility in which a bending amount at 23° C. (thickness t=3.0 mm, ASTM D790; span distance of 50 mm) falls in a range of 2 through 10 mm and having high crack resistance.

In order to achieve the magnetic property, the bending amount or the like, according to the magnet material of the invention, as constitutions of major materials, strontium ferrite for anisotropy is 86 through 92 weight %, denatured polyamide 12 resin is 1 through 7 weight %, polyamide 12 is 1 through 12 weight %. Further, in order to achieve the bending amount and promoting crack resistance, a specific plasticizer of at least one kind selected from bezensulfonic acid alkylamides, toluenesulfonic acid alkyl amides, and hydroxybenzoic acid alkyl ethers may be included by about 0.1 through 4 weight % in a total weight.

As bezensulfonic acid alkylamides, specifically, benzene sulfonic acid propyl amide, benzene sulfonic acid butylamid, and benzene sulfonic acid 2-ethylhexylamide or the like can be pointed out. As toluenesulfonic acid alkyl amides, specifically, N-ethyl-o- or N-ethyl-p-toluenesulfonic acid butylamide, N-ethyl-o- or N-ethyl-p-toluenesulofonic acid 2-ethylhexylamide or the like can be pointed. As hydroxybenzoic acid alkyl ethers, specifically, o- or p-hydroxybezoic acid etherhexyl, o- or p-hydroxybenzoie acid hexyldecil, o- or p-hydroxybenzoic acid ethyldecil, o- or p-hydroxybenzoic acid octyl, o- or p-hydroxybenzoic acid decil dedecil, o- or p-hydroxysulfonic acid dedecil or the like can be pointed out. Among the above-described, benzenesulfonic acid butyl amide, p-hydroxybenzoic acid ethylhexyl, p-hydroxybenzoic acid hyxeldecil are particularly preferable in view of compatibility with resin, low bleed out performance, heat resistance. Further, other than the above-described blending materials, various kinds of additives of silane coupling agent for improving performance of dispersing ferrite, and performance of adhering to polyamides, oxidization preventing agent or the like may be added.

Further, a plastic composition constituting the magnetic encoder according to the invention may pertinently be added with a small particle of, for example, carboxylated styrene-vulcanized butadiene rubber to provide tenacity, further, may pertinently be added with adhering performance improving agent of, for example, a copolymer constituting one component by, for example, glycidyl metacrylate.

Further, thermoplastic resin may be constituted by denatured polyester resin constituting a block copolymer having a hard segment of either one of polybutylene terephthalate, or polybutylene naphthalate, and a soft segment of at least one of polyether component or polyester component, also by using such a binder, a desired bending amount (2 through 15 mm by a thickness of t=3.0 mm, 23° C., ASTMD790; span distance 50 mm) or a desired magnetic property (maximum energy product BHmax: 1.63 through 2.38 MGOe (13 through 19 kJ/$m^3$)) can be achieved.

Further, as a material of the slinger 25, there is used an iron based magnetic material which does not deteriorate the magnetic property of the magnetic encoder and in view of an environment of use, and which can pertinently be selected in view of corrosion resistance, cost depending on a position of attaching the slinger 25. As iron based magnetic material, a magnetic material of ferritic stainless (SUS430 or the like), martensitic stainless steel (SUS410, SUS420 or the like) having a corrosion resistance equal to or higher than a constant level is the most preferable. Further, although a surface of the slinger made of stainless steel subjected to brightness finish of BA5 or the like or finish of No. 2B or the like in which small recesses and projections remain on the surface can be used by selecting an adhering agent, in order to promote a performance of bonding to the magnet material, it is preferable to subject the surface to a mechanical roughening treatment of shot blast or the like, a roughening treatment accompanied by a chemical etching treatment carried out at a step shown below, or a roughening treatment in pressing shown below.

At a first step of a roughening treatment accompanied by a chemical etching treatment, a surface of the slinger 25 is cleaned by an alkaline degreaser, thereafter, pickled by being dipped in diluted hydrochloric acid or the like at normal temperatures for several minutes, thereafter, dipped in an iron oxalate treatment solution including at least oxalic acid ion and fluorine compound for several minutes to thereby form an iron oxalate film at the surface. At a second step, a back yoke made of magnetic stainless steel formed with the iron oxalate film is dipped in an aqueous solution or the like of an acid mixed with nitric acid-hydrofluoric acid at normal temperatures for several minutes, a large portion of the iron oxalate film is removed to a level of not invading stainless steel at a matrix thereof, and the surface of the back yoke is formed with chemically etched recesses and projections. The recesses and projections are formed chemically and therefore, in comparison with mechanical recesses and projections by a shot blast method or the like, the recesses and projections are uniformly formed on an entire surface without shape dependency and becomes recesses and projections in a sharp (angular) recessed shape in which an inner space of the recessed portion is partially widened. An adhering agent is easy to be brought into the recesses and projections of the slinger, and a solid adhered state can be achieved in comparison with a constitution of using a slinger without recesses and projections by subjecting the slinger to insert molding by constituting a core by coating the adhering agent to the slinger to be baked thereafter in a semicured state, and secondarily heating the slinger as necessary.

Further, a third step of promoting rust preventive performance or adherence of the adhering agent may further be carried out. As a specific example of a treatment for promoting rust preventive performance, with regard to the iron oxalate film used in the second step, it is preferable to constitute a thin film formed by fine crystals which do not cover up a total of the surface of the recesses and projections which has been formed at the second step with all the effort. As means for providing the fine crystals, it is effective to carry out method of forming crystal nuclei by treating the surface to dip in a surface conditioning solution for the treatment.

As the treatment for promoting the adherence of the adhering agent, a silane coupling agent treatment is effective. The silane coupling agent film operated as a primer of the adhering agent and having amino group, epoxy group or the like highly reactive to a functional group of the adhering agent at one distal end thereof is preferable, specifically, the agent is γ-aminopropyltriethoxy silane, γ-glycidoxypropyltriethoxy silane or the like, which is formed by being dipped in a diluted solution of alcohol or the like and dried as necessary.

A thickness of the film formed at the third step is 0.01 through 1.0 μm, further preferably, 0.01 through 0.05 μm. When the thickness of the film is less than 0.01 μm, an effect of improving rust preventive performance, adherence of the adhering agent becomes deficient, which is not preferable. In contrast thereto, when the thickness of the film exceeds 1.0 μm, a rate of covering up the total of the surface of the recesses and projections provided at the second step is increased and therefore, the thickness is not preferable. A state of the recesses and projections of the surface of the slinger provided by carrying out the second step, or further carrying out the third step is 0.2 through 2.0 μm by an arithmetic mean height Ra rectified by JIS B0601 (2001) and about 1.5 through 10 μm by a maximum height Rz. When the state of the recesses and projections is less than a lower limit value, it is difficult to manifest a wedge effect. Further, in contrast thereto, when the state of the recesses and projections exceeds an upper limit value, although the wedge effect is promoted by that amount, it is difficult to achieve the state by the chemical etching method, practical performance is deteriorated, sealing performance of the rubber seal lip with which a back face portion of the slinger is brought into contact is deteriorated, which is not preferable.

Further, in a case of an iron based magnetic material other than magnetic stainless steel, for example, a cold-rolled steel sheet of SFCC or the like, the recesses and projections by chemical etching are formed by carrying out other step similarly by changing the surface treatment solution used in the first step to a solution including heavy metal ion of at least one kind selected from the group constituting zinc ion, nickel ion, cobalt ion, calcium ion and manganese ion, and phosphoric acid ion, specifically, zinc phosphate treatment solution, manganese phosphate treatment solution or the like.

Further, when ferritic stainless steel is used for the slinger 25, corrosion resistant ferritic stainless steel (SUS434, SUS444 or the like) including 16 through 20 mass % of Cr, 0.4 through 2.5 mass % of Mo may be used. In this case, a face of the slinger 25 bonded to the magnetic pole forming ring 27 may be subjected to a chemical treatment, or may be subjected to the chemical etching treatment.

Figure 43:
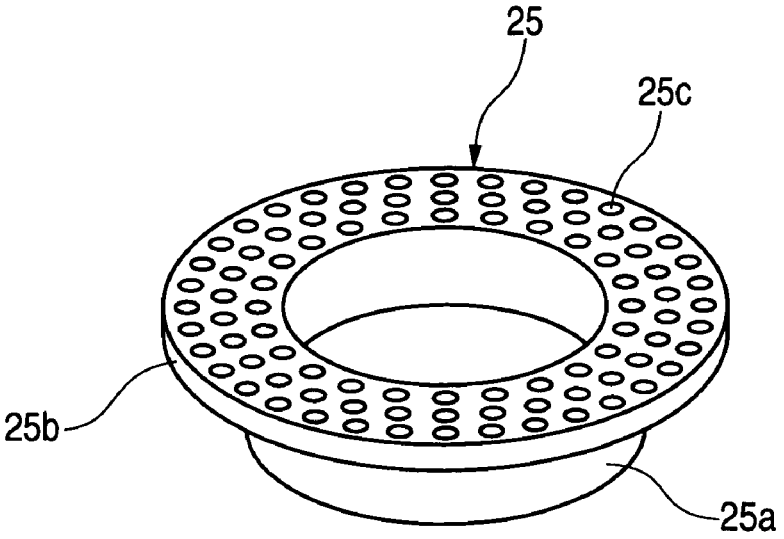
FIG. 43 is a perspective view showing a slinger subjected to a roughening treatment by pressing.

Further, according to the roughening treatment in pressing, when a thin plate of an iron based magnet material is pressed between dies, only the bonding face of the slinger 25 is pressed to small recesses and projections provided at a surface of the die to be transcribed therewith and small recesses and projected portions 25c as shown in FIG. 43 are provided at the bonding face.

Figure 44:
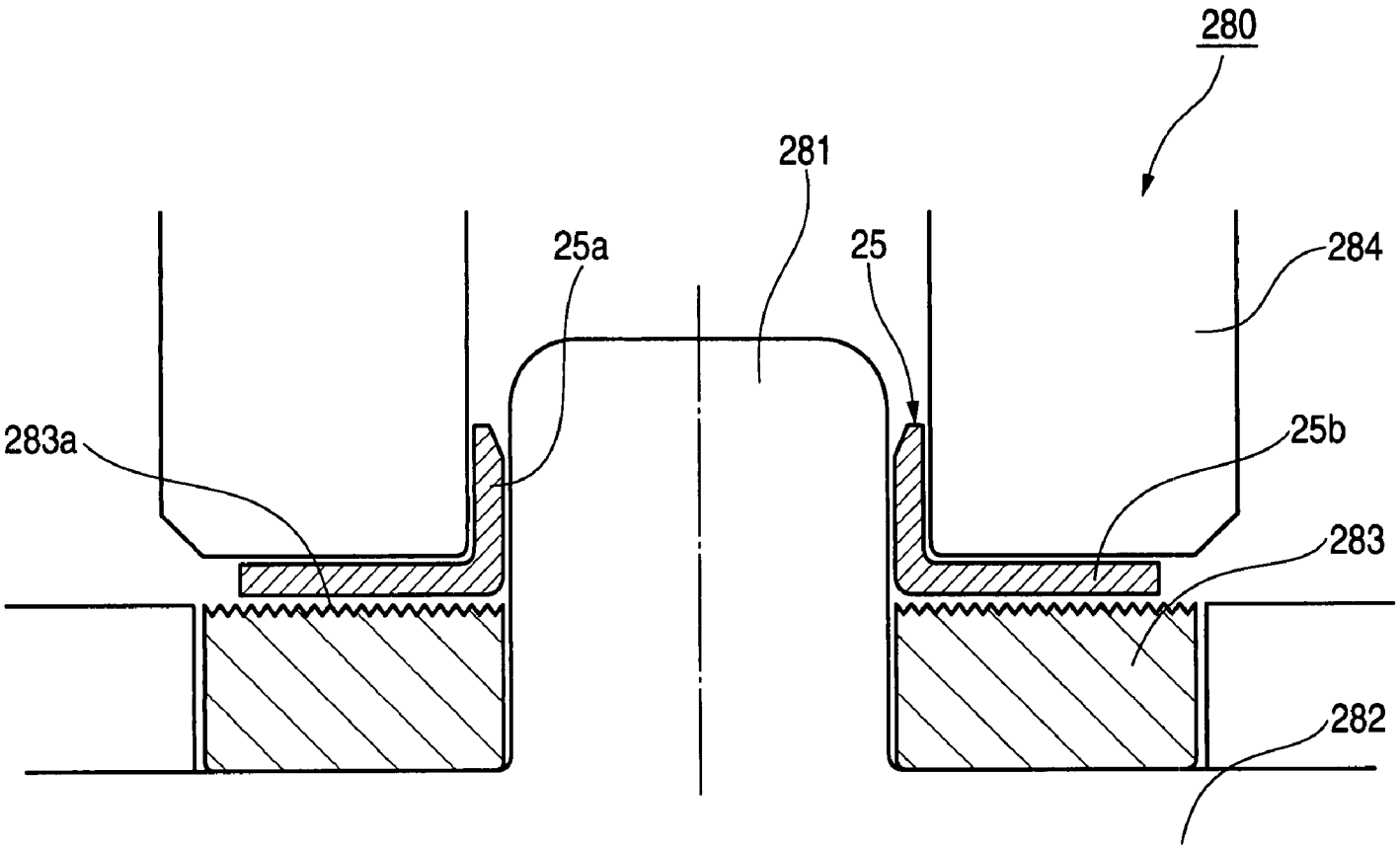
FIG. 44 is a sectional view showing a state of pressing a slinger.

Specifically, as shown by FIG. 44, a pressing machine 280 includes a base 282 having a guide portion 281 in a shape of a cylindrical column having an outer diameter substantially the same as the inner diameter of a cylindrical portion 25a of the slinger 25, a face accuracy rough working die 283 in a ring-like shape outwardly fitted to the guide portion 281 above the base 282, and a press die 284 in a ring-like shape movable in an up and down direction above the rough working die 283 and having an inner diameter substantially the same as an outer diameter of the cylindrical portion 25a. Small recesses and projections 283a are provided at a surface of the rough working die 283. As a method of providing the small recesses and projections 283a, chemical etching, electric discharge machining, forming of rod, or machining type roulette work or the like is preferable.

Further, the cylindrical portion 25a is formed between an outer peripheral face of the guide portion 281 and an inner peripheral face of the press die 284 by pressing the thin plate of the iron based magnet material provided between the rough working die 283 and the press die 284 by driving the press die 284 downward. At this occasion, by pressing the bonding face of the thin plate forming the slinger 25 to the recesses and projections 283a provided at the rough working die 283, actually, comparatively high projected portions of the recesses and projections 283a are predominantly pressed, and recessed and projected portions 25c are formed at a portion thereof which has been flat and smooth.

A depth of the recessed portion of the recessed and projected portion 25c is about 1 through 20 μm, further preferably, about 2 through 10 μm. When the depth of the recess portion is less than 1 μm, in order to manifest an anchor effect of the adhering agent by being brought into the recessed portion, the depth is excessively shallow, an increase in the bonding force is not observed so much, and practical performance is low. When the depth of the recess portion exceeds 20 μm, it is necessary to further deepen the projected portion provided at the die 283 and therefore, when the projected portion is transcribed in pressing, there is a concern of effecting an influence also on a flat face on a back side, which is not preferable.

Further, in the slinger 25 comprising the iron based magnet material, although a surface finished state of a flat face other than the bonding face is not particularly limited, the flat face finished by BA of BA No. 2 (Ra about 0.06), BA No. 5 (Ra about 0.03) or the like, or finished by AP of No. 2B (Ra about 0.06) or the like equal to or smaller than 0.1 μm in Ra is preferable in consideration of performance of attacking the seal lip slidingly brought into contact therewith.

According to the encoder of the embodiment, the adhering agent is coated to a face of the slinger 25 bonded to the magnet, the adhering agent is brought into the recesses and projections provided by chemical etching or the like, and the state of being solidly adhered to the metal side is maintained by the anchor effect. A layer of the adhering agent is constituted by the adhering agent in which curing reaction is progressed in insert molding, which is brought into a semicured state to a degree of not being detached to flow off by the plastic magnet material under high pressure melted in insert molding, and is brought into a completely cured state by heat from melted resin, or by secondary heating after molding in addition thereto. As a usable adhering agent, a phenolic resin based adhering agent, an epoxy resin based adhering agent or the like which can be diluted by solvent and in which a curing reaction is progressed approximately in two stage is preferable in consideration of heat resistance, chemical resistance, handling performance.

The phenolic resin based adhering agent used as a vulcanizing adhering agent of rubber is preferable, although a composition thereof is not particularly limited, novolak type phenolic resin or resol type phenolic resin, and a curing agent of hexamethyltetramine or the like dissolved in methanol or methylethylketone or the like can be used. Further, in order to promote adherence, theses may be mixed with novolak type epoxy resin.

For example, the phenolic resin based adhering agent used in the embodiment includes at least resol type phenolic resin and bisphenol A type epoxy resin, can be baked to a slinger in a semicured state to a degree of not flowing off by the melted plastic magnet material under high temperature and high pressure in insert molding in curing conditions of, for example, 100° C. through 120° C., about several minutes through 30 minutes, and is completely cured by heat from the melted plastic magnet in insert molding, further, by secondary heating (for example, 130° C., about 2 hours) successive thereto. Further, the phenolic resin based adhering agent may further be added with an inorganic filling material (as specific example, for example, melted silica powder, quartz glass powder, crystallized glass powder, glass fiber, alumina powder, talc, aluminum powder, alumina powder, titanium oxide) achieving ah effect of promoting curing strain resistance, a bridging rubber small particle (specifically, vulcanized acrylonitrile-butadiene rubber having a mean particle diameter of about 30 through 200 nm having carboxyl group in molecular chain is the most preferable) or the like in order to promote flexibility.

Further, resol type ferritic resin constituting the phenolic resin based adhering agent is provided by reacting phenols and formaldehyde under presence of a basic catalyst. Further, an arbitrary one of phenols constituting a raw material thereof can be used so far as, for example, phenolic hydroxyl group of phenol, m-crezol, p-crezol, a mixture of m-crezol and o-crezol, p-third butylphenol, p-phenylphenol, bisphenol A or the like includes 2 or 3 of substitutable nucleus hydrogen atoms at o- and/or p-position.

Further, resol type phenolic resin used in the embodiment may be denatured resol introducing, for example, o- or p-alkylphenol to phenolic resin. Normally, by introducing o- or p-alkylphenol, flexibility of phenolic resin is improved. From similar reason, butyl etherificated resol constituted by etherificating resol by butylalcohol or rosin denatured resol provided by a reaction of rosin and resol or the like may be used.

Further, bisphenol A type epoxy resin is added to the phenolic resin based adhering agent according to the embodiment to be used for promoting an adhering function and a curing characteristic as the adhering agent. Further, as bisphenol A type epoxy resin, there are a liquid state or a solid state thereof under room temperature condition, and these are used by a rate of about 1 through 20 weight parts per 100 weight parts of phenolic resin included in the adhering agent according to the invention in a case of a liquid state resin, or by a rate of about 5 through 30 weight parts in a case of a solid state resin. Although the larger the rate of the bisphenol A type epoxy resin used, the more promoted in the adhering characteristic, when a performance of an antifreeze liquid is requested, the function tends to be deteriorated.

Further, the phenolic resin adhering agent according to the embodiment may be added with novolak type epoxy resin or novolak type phenolic resin with an object of providing tenacity. These resins react with resol type phenolic resin in a heating step and therefore, the more increased is the content, the more promoted is the tenacity. However, it is preferable that the content is equal to or smaller than 30 weight parts per 100 weight parts of resol type phenolic resin. This is because when novolak type epoxy resin or novolak type phenolic resin is used by a larger rate, there is a concern of effecting an adverse influence on a performance of adhering to the plastic magnet.

Further, the phenolic resin based adhering agent according to the embodiment is adjusted and used as an organic solvent solution dissolving an adhering agent composition including at least resol type phenolic resin and bisphenol A type epoxy resin in an organic solvent in which ketones of acetone, methylethylketone or the like, alcohols of methanol, ethanol or the like are generally used by a concentration of a solid portion of about 5 through 40 weight %.

In fabricating the magnetic encoder by using the phenolic resin based adhering agent, the adhering agent is coated on the slinger made of stainless steel, dried by wind by being left for 20 through 60 minutes under room temperature condition, thereafter, subjected to a heating treatment (baking treatment) under conditions of about 30 minutes at about 120° C. The slinger baked with the adhering agent by carrying out the heating treatment is set to dies, and the plastic magnet material is subjected to insert molding by constituting a core thereby. Thereafter, a provided molded product is heated (secondary curing) for about 2 hours at about 130° C. Further, by magnetizing a product of adhering the plastic magnet and the slinger provided by carrying out the heating treatment by using the yoke coil, the magnetic encoder is fabricated.

As the epoxy resin based adhering agent, one solution type epoxy based adhering agent capable of being diluted to a solvent is preferable as a raw liquid. The one solution type epoxy based adhering agent is brought into a semicured state to a degree of not flowing off by melted resin under high temperature and high pressure in insert molding at a surface of the slinger by pertinent temperature and time after evaporating the solvent and is brought into a completely cured state by heat from resin in insert molding and by secondary heating.

The one solution type epoxy based adhering agent used in the embodiment comprises at least epoxy resin and a curing agent, according to the curing agent, a curing reaction is hardly progressed at a vicinity of a room temperature, the curing agent is brought into a semicured state at, for example, about 80 through 120° C., and the heat curing reaction is progressed completely by applying heat at high temperatures of 120 through 180° C. The adhering agent may be added with other epoxy compound used as a reactive diluting agent, a curing accelerator for increasing a heat curing speed, an inorganic filling member achieving an effect of promoting heat resistance or curing strain resistance, bridged rubber small particles promoting flexibility of being deformed when applied with a stress.

The epoxy resin having 2 or more of a number of epoxy groups included in the molecule is preferable in view of the fact that a bridge structure capable of achieving sufficient heat resistance can be formed or the like. Further, the epoxy resin having 4 or less, further 3 or less of the number is preferable in view of the fact that a resin composition having a low viscosity can be provided. Because when the number of epoxy groups included in the molecule is excessively small, heat resistance of the cured product tends to be deteriorated and strength thereof tends to be weakened, on the other hand, when the number of epoxy groups included in the molecule is excessively large, the viscosity of the resin composition tends to be increased and shrinkage by curing tends to be increased.

Further, a number mean molecular weight of the epoxy resin is preferably 200 through 5500, particularly, 200 through 1000 in view of a balance with a physical property. Because when the number mean molecular weight is excessively small, the strength of the cured product tends to be weakened and moisture resistance tends to be reduced, on the other hand, when the number mean molecular weight is excessively large, the viscosity of the resin composition tends to be increased and use of a reactive diluting agent for adjusting operability tends to be increased or the like.

Further, the epoxy equivalent of the epoxy resin is preferably 100 through 2800, particularly, 100 through 500 in view of the fact that an amount of blending the curing agent is brought into a proper range or the like. Because when the epoxy equivalent is excessively small, an amount of blending the curing agent tends to be excessively large and the physical property of the cured product tends to be deteriorated, on the other hand, when the epoxy equivalent is excessively larger the amount of blending the curing agent tends to be reduced and the viscosity of the resin composition tends to be increased by increasing a molecular amount of the epoxy resin per se.

As the epoxy resin, for example, there are pointed out copolymers of other polymers of bisphenol A type epoxy resin, bisphenol F type epoxy resin, bisphenol AD type epoxy resin, naphthalene epoxy resin, biphenyl type epoxy resin, glycidylamine type epoxy resin, alicyclic epoxy resin, dicyclopentadiene type epoxy resin, phenol novolak type epoxy resin, polyester denatured epoxy resin, silicone denatured epoxy resin. Among them, bisphenol A type epoxy resin, bisphenol F type epoxy resin, bisphenol AD type epoxy resin, naphthalene type epoxy resin, phenol novolak type epoxy resin and the like are preferable since the resins are provided with comparatively low viscosities and excellent in heat resistance and moisture resistance.

As the curing agent, an amine based curing agent, a polyamide based curing agent, an acid anhydride curing agent, a latent curing agent or the like can be used.

The amine based curing agent is an amine compound and does not form ester bonding by a curing reaction and therefore, is provided with excellent moisture resistance in comparison with a case of using the anhydride based curing agent, which is preferable. Although amine compound may be any of aliphalic amine, alicyclic amine, aromatic amine, aromatic amine is the most preferable since storing stability at room temperature is high and heat resistance of a cured product is high.

As aromatic amine, 3,3'-diethyl-4,4'-diaminophenyl methane, 3,5-diethyl-2,6-tolouenediamine, 3,5-diethyl-2,4-toluenediamine, a mixture of 3,5-diethyl 2,6-toluenediamine and 3,5-diethyl-2,4-toluenediamine or the like can be exemplified.

The polyamide based curing agent is also referred to as polyamideamine and is a compound having a plurality of active amino groups in the molecule and having one or more of amide groups similarly. The polyamide based curing agent synthesized from polyethylene polyamine is preferable since imidaziline ring is formed by secondary heating, compatibility with epoxy resin and mechanical property are promoted. The polyamide based curing agent may be of an adductive type previously reacted with a small amount of epoxy resin and by constituting the polyamide based curing agent by adductive type, compatibility with epoxy resin is excellent, curing dry performance and waterproof and chemical resistance are promoted, which is preferable. By using the polyamide based curing agent, tenacious cured resin particularly rich in flexibility is produced by being bridged with epoxy resin and therefore, the resin is excellent in thermal shock resistance requested for the magnetic encoder of the invention, which is preferable.

A cured product constituted by being cured by the acid anhydride based curing agent is excellent in heat resistance and excellent in mechanical and electrical properties at high temperatures, on the other hand, tends to be slightly fragile, the cured product can be improved by being combined with a curing accelerator of tertiary amine or the like. As the acid anhydride based curing agent, phthalic anhydride, methyltetrahydrophthalic anhydride, endmethylenetetrahydrophthalic anhydride, methyleneendmethylenehydropthalic anhydride, methylhexahydrophthalic anhydride, trimellitic anhydride or the like can be exemplified.

The latent curing agent is excellent in storing stability at normal temperature and is swiftly cured under a condition equal to or higher than a constant temperature in a system mixed with epoxy resin, according to the embodiment, there are a latent curing agent activated in heating by a neutral salt or a complex of an acidic or basic compound which can be a curing agent of epoxy resin, a latent curing agent in which the curing agent is sealed in a microcapsule and destructed by a pressure, a latent curing agent which is heated and dissolved by a substance which is crystalline, having a high melting point and is not provided with compatibility with epoxy resin at room temperature and the like.

As the latent curing agent, 1,3-bis(hydrazinocarboxylethyl)-5-isopropylhydantoine, eicosanediacid dihydrazide, adipic acid dihydrazide, dicyandiamide, 7, 11-octadecadiene-1, 18-dicarboxylhydrazide or the like can be exemplified. Among them, 7, 11-octadecadiene-1, 18-dicarboxylhydrazide becomes tenacious cured resin particularly rich in flexibility by being bridged with epoxy resin by being used as the curing agent and therefore, the resin is excellent in thermal shock resistance requested for the magnetic encoder of the invention, which is preferable.

As the reactive diluting agent, t-butylphenylglycidylether, 2-ethylhexylglycidylether, allylglycidylether, phenylglicidylether or the like can be used and pertinent flexibility can be provided to a cured product by adding the reactive diluting agent. However, when the reactive diluting agent is used by a large amount, moisture resistance or heat resistance of the cured product is deteriorated and therefore, the reactive diluting agent is added by a rate preferably equal to or smaller than 30%, further preferably equal to or smaller than 20% relative to a weight of epoxy resin constituting a main substance.

As the curing accelerator having sufficient holding stability without accelerating the curing reaction at normal temperature, and progressing the curing reaction swiftly when temperature becomes as high as 100° C. or higher is preferable, for example, there is a compound having one or more of ester bonding formed by reacting 1-alcoxylethanol and carboxylic acid or the like. A compound is a compound represented by, for example, general formula (I):

$$R^3[COO—CH(OR^2)—CH_3]_n \quad (I)$$

(In the formula, $R^3$ designates hydrocarbon group of n values having a carbon number of 2 through 10, and including one kind or more of nitrogen atom, oxygen atom and the like, $R^2$ designates hydrocarbon group of one value hating a carbon number of 1 through 6 and which may include one kind or more of nitrogen atom, oxygen atom and the like, n designates integer of 1 through 6). And a specific example thereof is shown in formula 5.

resin and amino group of the curing agent are reacted and provided cured product includes flexibility as an amount of adding adipic acid increases. In order to manifest flexibility, the amount of adding adipic acid is 10 through 40 weight %, further preferably 20 through 30 weight % relative to a total amount of the adhering agent. When the adding amount is less than 10 weight %, sufficient flexibility is not manifested. In contrast thereto, when the adding amount exceeds 40 weight %, an amount of a total of epoxy resin in the adhering agent is reduced by that amount, an adhering force, mechanical strength are reduced, which is not preferable. Further, adipic acid is also a starting raw material of polyamide resin and therefore, when a binder of a magnetic powder is constituted by polyamide based resin of polyamide 12, polyamide 6 or the like, adipic acid is provided with also reactivity with monomer or oligomer component remaining in the binder material per se by an extremely small amount and further solid adherence can be carried out by constituting the adhering agent composition including adipic acid.

Further, as the curing accelerator, tertiary amine of dimethylbenzylamine or the like, quaternary ammonium salt of tetrabutylammoniumbromide or the like, alkyl urea of 3-(3', 4'-dichlorophenyl)-1,1-dimethyl urea or the like operated as a catalyst for accelerating a ring opening reaction of epoxy group may be added.

OH group formed by the ring opening reaction including the amines or the like, forms hydrogen bonding with hydroxyl group at a surface of a metal constituting a coated member, further, can maintain a solid adhered state by being operated with amide bonding of nylon constituting a binder material.

The inorganic filling member can be used without being particularly limited so far as the inorganic filling member is used in the background art. For example, melted silica

[chemical 5]

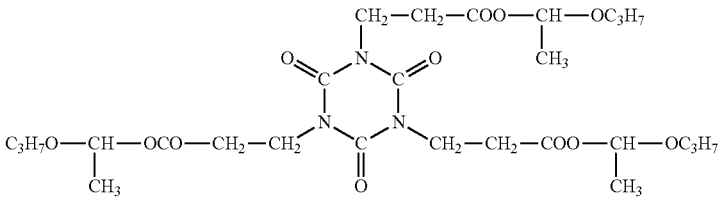

As other specific examples, there are pointed out a compound in which $R^3$ designates phenyl group of 2 values and $R^2$ designates propyl group, a compound in which $R^3$ designates phenyl group of 3 values and $R^2$ designates propyl group, a compound in which $R^3$ designates phenyl group of 4 values and $R^2$ designates propyl group. These may be used by themselves or may be used by combining 2 kinds or more thereof. Among them, a compound represented by chemical 1 is the most preferable in view of a balance between curing reactivity and storing stability.

Further, other than the above-described compounds, imidazole compounds of 2-methylimidazole, 2-ethyl-4-methylimidazole, 2-undecylimidazole, 2-phnelimidazole or the like may be used as curing accelerators.

Further, as the curing accelerator, carboxylic acids of, for example, adipic acid or the like, which are compounds having active hydrogen for causing a ring opening reaction by being reacted with epoxy group may be used. By using adipic acid as the curing accelerator, epoxy group of epoxy powder, quartz glass powder, crystallized glass powder, glass fiber, alumina powder, talc, aluminum powder, titanium oxide or the like is pointed out.

As the bridged rubber small particle having a functional group capable of being reacted with epoxy group is preferable, specifically, vulkanized acrylonitrilebutadiene rubber having carboxyl group in a molecular chain is the most preferable. The smaller the particle diameter, the more preferable, an ultra small particle having about 30 through 200 nm by a mean particle diameter is the most preferable for manifesting a dispersing property and stable flexibility.

According to the one solution type epoxy adhering agent explained above, the curing reaction is hardly progressed at normal temperature, the adhering agent is brought into a semicured state at, for example, about 80 through 120° C. and a heat curing reaction is completely progressed by applying heat at high temperatures of 120 through 180° C. Further preferably, the adhering agent progressing the curing reaction by comparatively short time at 150 through 180° C.

is preferable and the adhering agent capable of being adhered by high frequency heating at 180° C. is the most preferable.

According to a cured product after heat curing of the phenolic resin based adhering agent, epoxy resin based adhering agent explained above, as physical properties, it is preferable the bending elastic modulus or Young's modulus falls in a range of 0.02 through 5 GPa, further preferably, 0.03 through 4 GPa, or a hardness (duarometer D scale; HDD) falls in a range of 40 through 90, further preferably, 60 through 85. When the bending elastic modulus or Young's modulus is less than 0.02 GPa, or the hardness (HDD) is less than 40, the adhering agent per se is excessively soft and is easy to be deformed by vibration in running an automobile or the like, the magnet portion is easy to be moved thereby and therefore, there is a concern of deteriorating accuracy of detecting the rotational number, which is not preferable. On the other hand, when the bending elastic modulus or Young' modulus exceeds 5 GPa, or the hardness (HDD) exceeds 90, the adhering agent per se is excessively hard, it is difficult to be deformed to absorb the difference of thermal elongation and contraction between the magnet of the magnetic encoder and a fixed member (that is, a difference of elongation and contraction amount by a difference between linear expansion coefficients of the both members), in the worst case, there is a concern of producing a crack or the like in the magnet, which is not preferable. Heat shock resistance is requested for the one solution type epoxy based adhering agent of the invention when a premise is constituted by using the adhering agent in an automobile, and the adhering agent having flexibility in a cured state (deformed when a stress is applied) is further preferable.

A detailed explanation will be given of a method of fabricating a magnetic encoder according to the invention using the above-described material as follows. First, the roughening treatment accompanied by the chemical etching treatment is carried out on a surface of the slinger by the above-described steps, as shown by photographs of sections of FIGS. 4(a) through (c) by an electron microscope, the surface is roughened. Further, injection molding (insert molding) of the plastic magnet material constituting the core by the slinger baked with the adhering agent at the surface in the semicured state is carried out by using the magnetic field injection molding machine 80.

Figure 5:
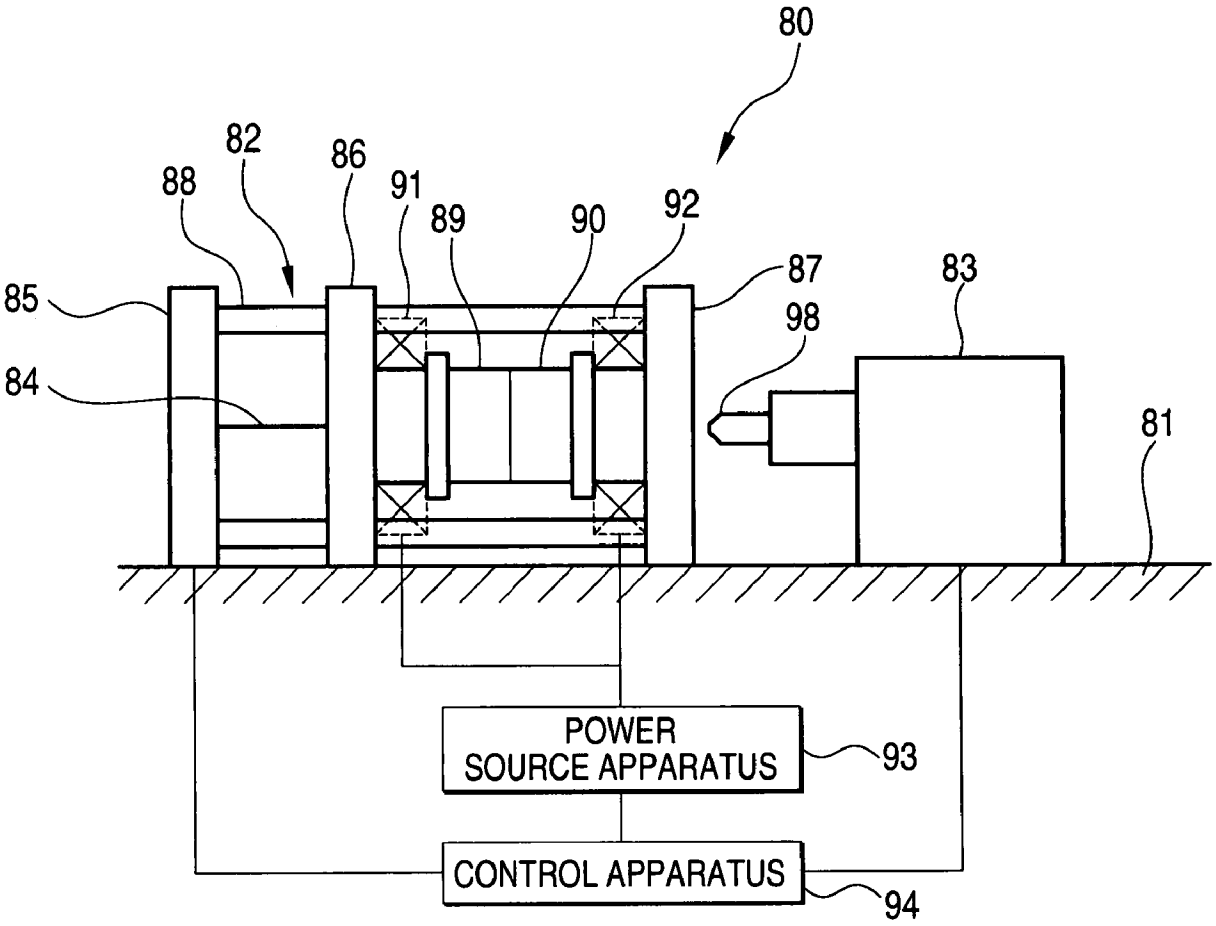
FIG. 5 is a schematic view showing a magnetic filed injection molding machine.

As shown by FIG. 5, a magnetic field injection molding machine 80 includes a die fastening apparatus 82 and an injection apparatus 83 on a support base 81. The die fastening apparatus 82 includes a movable portion 86 which is made movable relative to a housing 85 fixed to the support base 81 by a movable mechanism 84 of a toggle mechanism or the like, a fixed portion 87 fixed to the support base 81, and 4 pieces of tie bars 88 for guiding the movable portion 86 between the housing 85 and the fixed portion 87. The movable portion 86 and the fixed portion 87 respectively include a movable side die 89 and a fixed side die 90. Further, side faces of the movable portion 86 and the fixed portion 87 are arranged with coils 91, 92 to which electricity is conducted by a power source apparatus 93. A control apparatus 94 is connected to the movable mechanism 84, a power source apparatus 91, the injection apparatus 83 and is constituted to control these.

Figure 6:
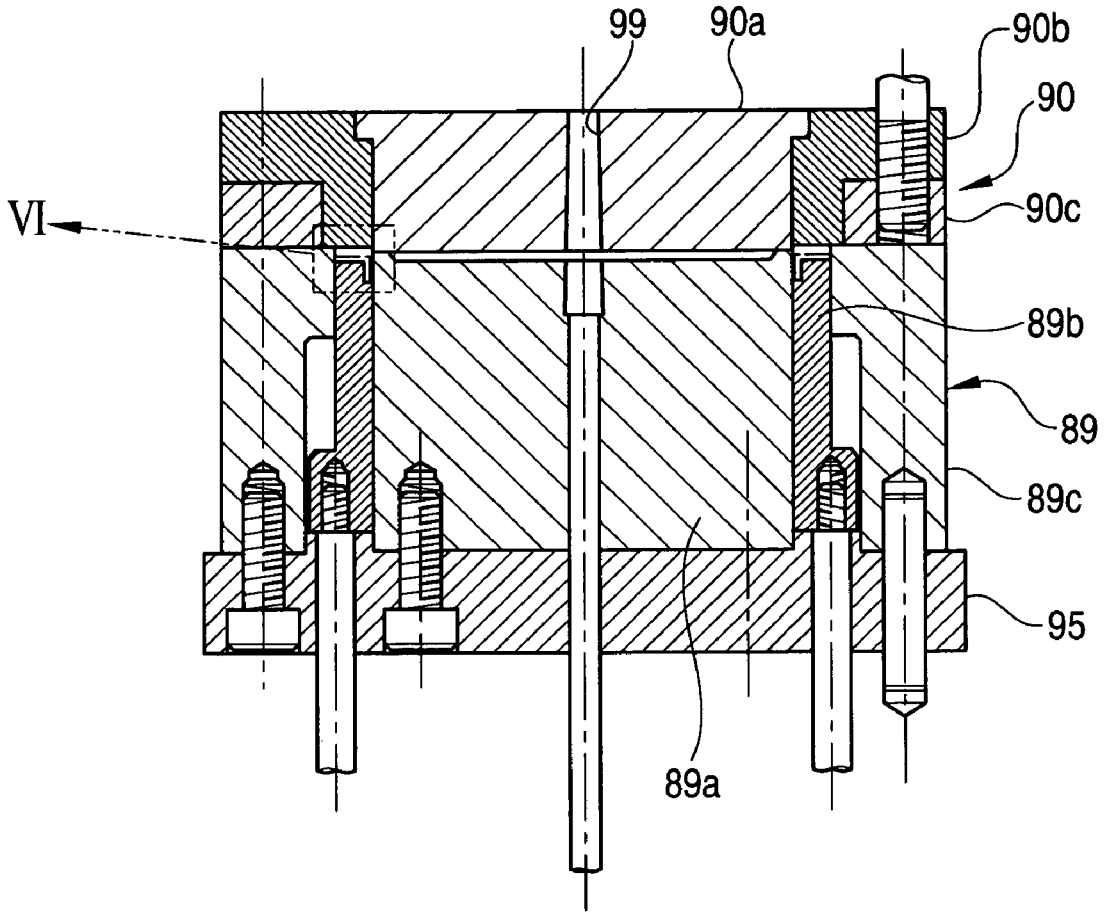
FIG. 6(a) is a sectional view of a movable side die and a fixed side die for forming a cavity.
FIG. 6(b) is a sectional view enlarging a portion VI of FIG. 6(a).
Figure 6:
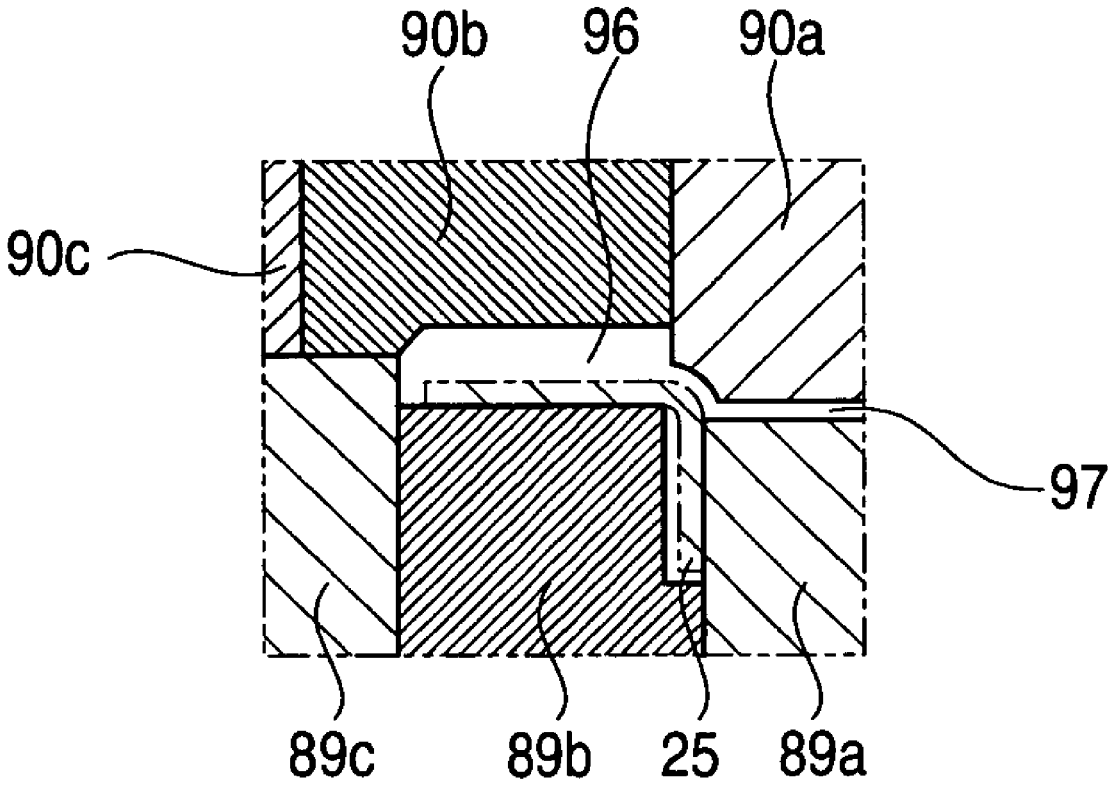

As shown by FIG. 6(a), the movable side die 89 comprises a plurality of movable side die pieces 89a through 89c fixed to a holding plate 95 by bolts, and also the fixed side die 90 comprises a plurality of fixed side die pieces 90a through 90c. Further, a cavity 96 and a disk gate 97 are formed between faces of the movable side die 89 and the fixed side die 90 opposed to each other. Thereby, a melted plastic magnet material injected from a nozzle 98 of the injection apparatus 83 is filled into the cavity 96 from a sprue portion 99 by way of the disk gate 97. As shown by FIG. 6(b), a ring-like space for containing a fitting portion in a cylindrical shape of the slinger 25 is constituted between the movable side die pieces 89a, 89b, the fixed side die piece 90a disposed at a center is projected to the movable side die 89 more than the fixed side die piece 90b disposed on an outer diameter side thereof, and the fixed side die piece 90a is disposed to overlap the contained slinger 25 in a diameter direction.

Further, in synchronism with injection of the melted plastic magnet material into the dies 89, 90 attached to the magnetic field injection molding machine 80, coil currents are applied to the coils 91, 92 at both ends of the dies 89, 90 to thereby magnetize the plastic magnet material by a generated magnetic field in one direction (same polarity) to orient the magnetic powder. Thereafter, demagnetization is carried out by at least one of steps of demagnetization for demagnetizing by a magnetic field in a direction reverse to a magnetizing direction and reversing demagnetization for demagnetizing by applying a plurality of pulse currents polarities of which are alternately reversed and amplitudes of which are gradually reduced to the coils 91, 92 at the both ends of the dies starting from an initial coil current higher than a coil current in magnetizing in cooling. Next, after removing the gate portion, the adhering agent is completely cured by being heated at constant temperature for constant time in a thermostat or the like. Further, depending on cases, the adhering agent may be completely cured by being heated at high temperature for short time by high frequency heating or the like. Thereafter, the material is further demagnetized to a magnetic flux density equal to or smaller than 2 mT, further preferably, 1 mT by using a demagnetizer of a well-known oil condenser type or the like. At a step thereafter, the material is overlapped on a well-known magnetizing yoke to magnetize the multipoles to thereby finish fabricating the magnet portion. A number of poles of the magnet portion is about 70 through 130 poles, preferably, 90 through 120 poles. When the number of poles is less than 70 poles, the number poles is excessively small and it is difficult to accurately detect a rotational number. In contrast thereto, when the number of poles exceeds 130 poles, respective pitches become excessively small, it is difficult to restrain a single pitch error to be small, and practical performance is low.

Further, in molding the encoder portion, as described above, injection molding (insert molding) in which the melted plastic magnet material flows from an inner diameter thick portion simultaneously into the dies, rapidly cooled in the dies to solidify is preferable. The melted resin is widened in a disk-like shape and flows to the dies of portions in correspondence with the inner diameter thick portion, thereby, the magnetic powder in a scale-like shape included therein is oriented in parallel with the face. Particularly, a portion between an inner diameter portion and an outer diameter portion at a vicinity of the inner diameter thickness portion detected by the rotation sensor is provided with higher orientation and is very near to axial anisotropy oriented in a thickness direction. When then magnetic field is applied in the thickness direction of the dies in molding, the anisotropy becomes further near to complete anisotropy.

Further, even when magnetic field molding is carried out, in a case in which the gate is constituted by other than the disk gate, for example, a side gate, in a procedure of gradually increasing a viscosity of the resin to solidification, it is difficult to completely make orientation at a weld portion anisotropic, thereby, there is a possibility of bringing about a crack or the like at the weld portion by which the magnetic property is deteriorated and the mechanical strength is deteriorated by a long period of use, which is not preferable. Therefore, according to the embodiment, insert molding by the disk gate is carried out in a state of applying the magnetic field in the thickness direction by constituting the core by the slinger.

Further, although a color of the molded magnetic pole forming ring 27 of the magnetic encoder 26 is black color since the ferrite powder is included, the color is more or less changed by an additive. Further, as shown by FIG. 2, the magnet material flows also around to an outer peripheral portion of a flange portion of the slinger 25 and is bonded thereto also mechanically.

According to the magnetic encoder of the embodiment, the magnet portion is constructed by the constitution of including the magnetic member and the resin and therefore, a comparatively large amount of the magnetic powder can be mixed to the rubber magnet, the magnetic encoder having an excellent magnetic property can be provided, further, injection molding (magnetic field molding) in a state of applying the magnetic field is facilitated and the anisotropic magnet indispensable for manifesting the excellent magnetic property can be provided.

Further, according to the magnetic encoder of the embodiment, the magnet portion comprises the plastic magnet material constituting the binder by the thermoplastic resin including 86 through 92 weight % of the magnetic powder, the magnet portion is chemically bonded to the slinger comprising the magnetic material by the adhering agent in which the curing reaction is progressed in insert molding and therefore, the magnet portion can carry out multipoles magnetization in a circumferential direction by a fine pitch having an excellent magnetic property and can ensure the strength of a total of the magnet.

Further, according to the magnetic encoder of the embodiment, the magnet portion comprises the magnet material including the ferritic magnetic powder and the thermoplastic resin, the magnet portion is integrally bonded to the slinger comprising the magnetic material, according to the magnet portion, the thickness is 3.0 mm and the bending amount at 23° C. falls in a range of 2 through 10 mm and therefore, crack resistance is promoted by increasing the bending amount. Therefore, even in the structure in which the magnet portion is mechanically bonded to the slinger by insert molding by constituting the core by the slinger, when the magnet portion is applied with a stress of heat shock or the like at high temperatures, low temperatures to which a downward portion of an automobile is exposed, in shifting between high temperatures and low temperatures, a crack can effectively be prevented from being brought about at the magnet portion and reliability can significantly be promoted. Further, the bending amount is provided by including denatured polyamide 12 resin as the binder.

Further, according to the magnetic encoder of the embodiment, the slinger comprises the iron based magnetic material roughened in accordance with the chemical etching treatment and therefore, adherence between the slinger and the magnet portion is promoted by the wedge effect of the adhering agent.

Further, by using the phenolic based adhering agent or the epoxy based adhering agent as the adhering agent, there is a low possibility of exfoliating the adhering portion by high temperatures, low temperatures, the heat shock in shifting between high temperatures and low temperatures to which the downward portion of the automobile is exposed, various chemicals of grease, oil or the like and the reliability is promoted. Further, by carrying out insert molding in the state of making the adhering agent in the semicured state by using the adhering agent capable of being cured in two stages, the slinger and the magnet portion can be bonded mechanically and chemically and productivity and reliability are also promoted.

Further, according to the method of fabricating the magnetic encoder according to the invention, there can be fabricated the highly reliable magnetic encoder which is not exfoliated to be detached from the slinger even under a severe condition of use. Further, the magnetic powder in the plastic magnet provided by the fabricating method of the embodiment is highly oriented in the thickness direction of the magnet in the ring-like shape and therefore, the magnetic property of the encoder provided by magnetizing the magnetic powder is extremely improved. Therefore, depending on the content of the magnetic powder in the magnet, the magnetic flux density which has been about 20 mT in the background art can be promoted to be equal to or higher than 26 mT. Therefore, when a gap between the magnetic encoder and the sensor is made to be 1 mm similar to that of the background art, the plastic magnet which has been magnetized in multipoles of 96 poles in the background art can be magnetized in multipoles to be equal to or larger than 120 poles while maintaining the magnetic flux per pole. At this occasion, the single pitch error can be made to be equal to or smaller than ±2%. That is, according to the magnetic encoder according to the embodiment, when an air gap equivalent to that of the background art is constituted, the accuracy of detecting the rotational speed of the wheel can be promoted by increasing a number of poles. Further, when the plastic magnet according to the embodiment is constituted by the number of poles the same as that of the background art, the air gap can be increased and a degree of freedom in arranging the sensor can be promoted.

Figure 7:
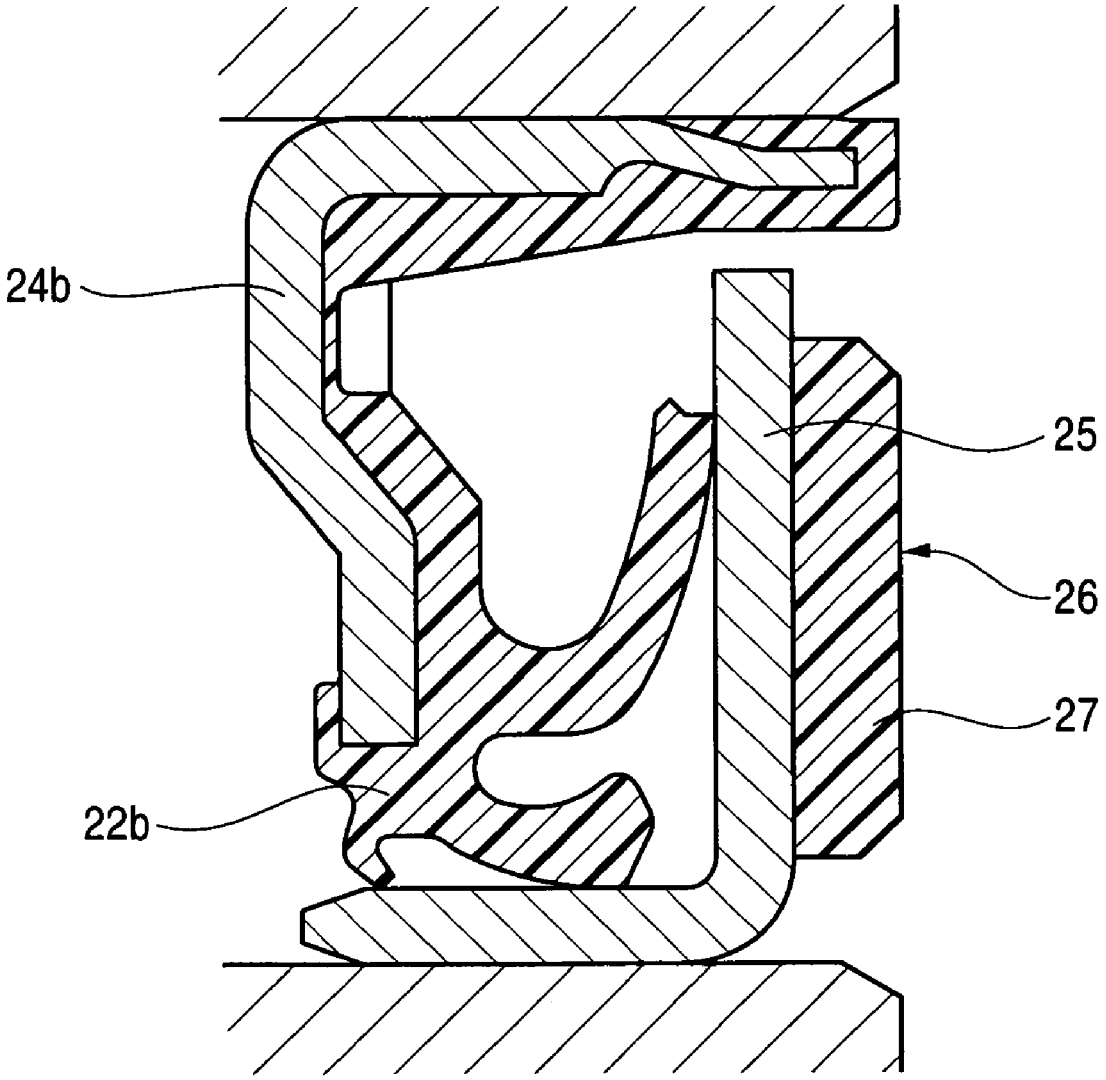
FIG. 7 is a sectional view showing a sealing apparatus including a magnetic encoder of a modified example of the first embodiment having a different shape of a magnet portion.

Further, according a hub unit bearing of the embodiment, the magnetic pole forming ring 27 may be prevented from being exfoliated from the slinger 25, as shown by FIG. 2, the magnetic pole forming ring 27 may be bonded to the surface of the flange portion and the outer peripheral portion of the flange portion of the slinger 25, or as shown by FIG. 7, may be bonded only to the surface of the flange portion.

Figure 45:
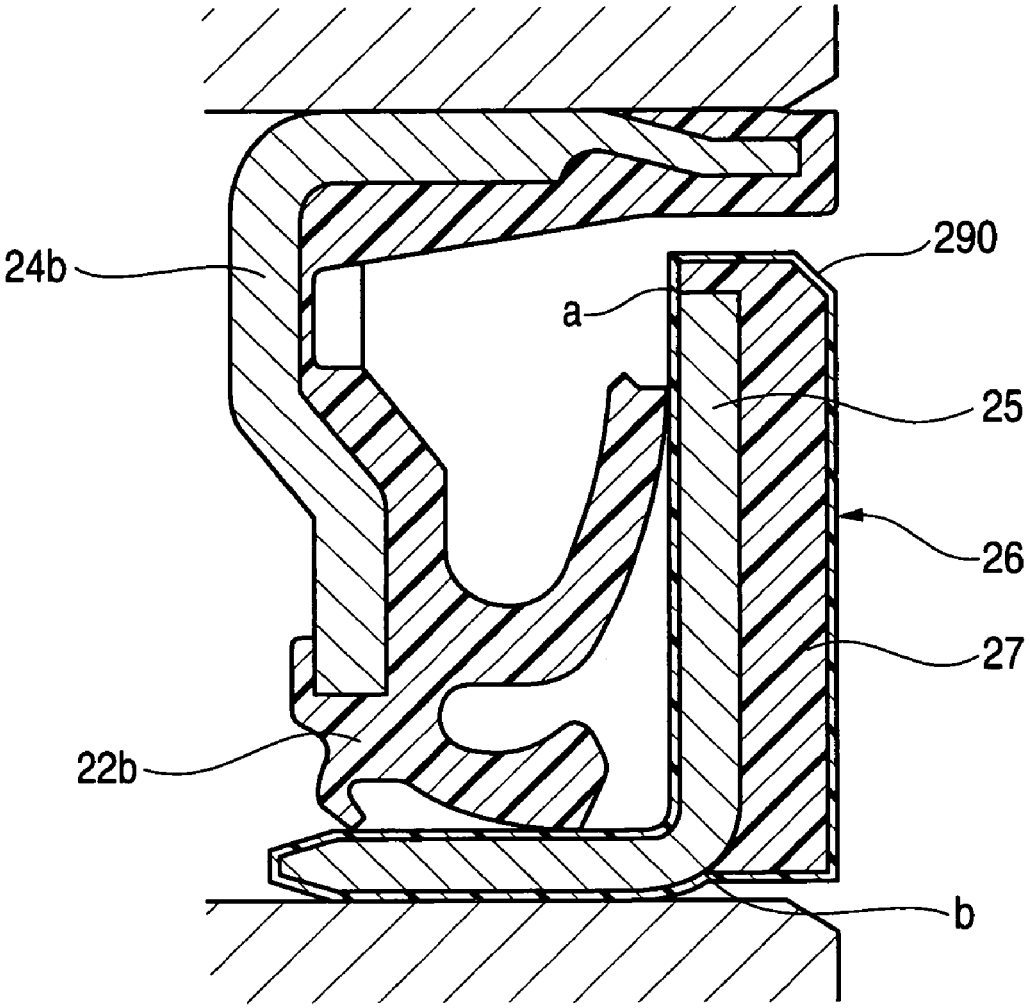
FIG. 45 is a sectional view showing a sealing apparatus including a magnetic encoder of other modified example of the first embodiment including a moisture proof film.

Further, as shown by FIG. 45, a moisture resistant film 290 may be provided to the slinger 25 and the magnetic pole forming ring 27 bonded to each other to cover at least bonding boundary portions a, b thereof to minimally restrain moisture from permeating to the adhering agent layer. Further, as materials of forming the moisture resistant film 290, there are noncrystalline fluororesin, curing type urethane resin, curing type acrylic resin, curing type epoxy resin, polyparaxylene derivative and the like. Among them, particularly noncrystalline fluororesin film, polyparaxylene derivative having water repellency in the resins per se are provided with a high effect of restraining moisture from permeating the resins, which is particularly preferable. Further, although in FIG. 45, the moisture resistant film 290 covers a total of the slinger 25 and the magnetic pole forming ring 27, at least the bonding boundary portions a, b thereof may be covered in view of cost, particularly, it is preferable that the moisture resistant film is not present at a portion at which the seal lip is slidingly moved.

Figure 8:
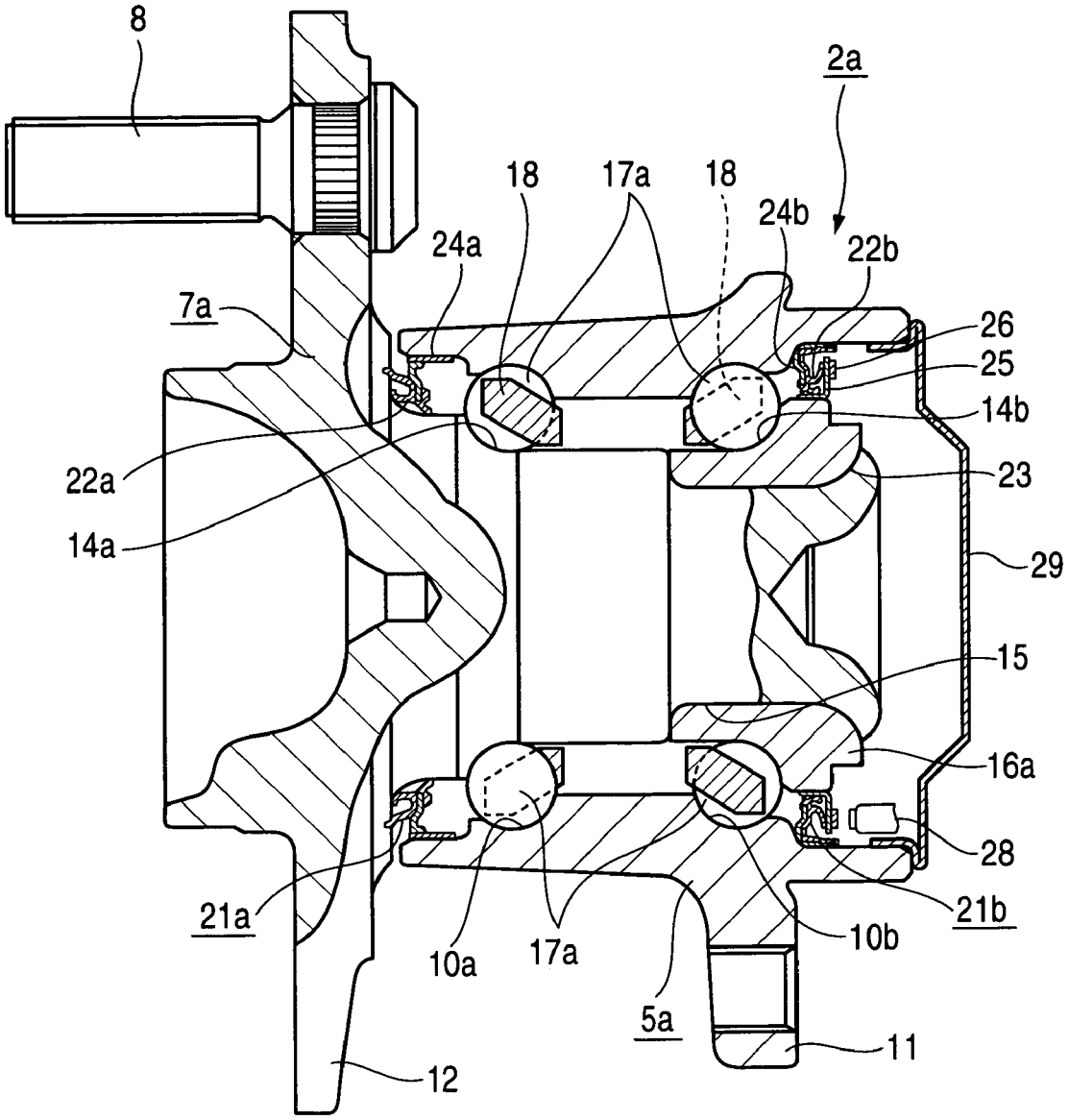
FIG. 8 is a sectional view showing a modified example of a hub unit bearing including the magnetic encoder according to the first embodiment.

Further, as shown by FIG. 8, an opening end portion (opening end portion on vehicle side) on a side of being provided with the magnetic encoder 26 is hermitically sealed by a hub cap 29 inwardly fitted to the outer ring 5a and therefore, it is not necessary to separately provide a seal member brought into sliding contact with the slinger 25 and the slinger 25 used by itself may constitute a member of fixing the magnetic pole forming ring 27. Further, since the opening end portion is hermetically sealed by the hub cap 29, a function of the slinger for preventing oil from flowing out and preventing dust from invading by being operated as a pump by splashing oil or dust by a centrifugal force is not necessarily needed. Therefore, the member of fixing the magnetic pole forming ring 27 is not limited to the slinger.

SECOND EMBODIMENT

Next, a detailed explanation will be given of a hub unit bearing constituting a bearing for a wheel for supporting a nondriven wheel supported by a suspension of an independent suspension type according to a second embodiment of the invention. Further, portions equivalent to those of the first embodiment are attached with the same notations and an explanation thereof will be omitted or simplified.

Figure 9:
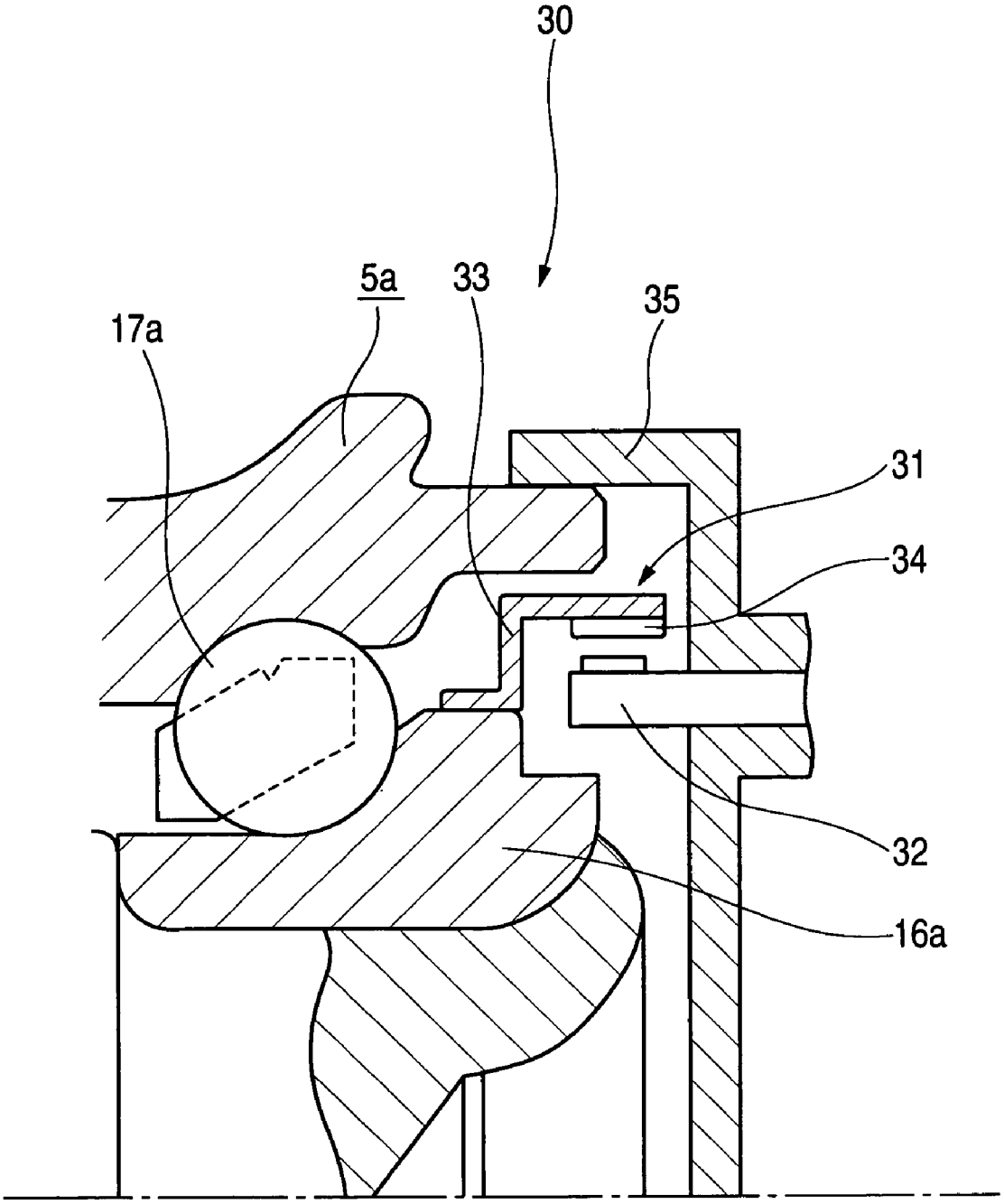
FIG. 9 is an enlarged sectional view showing a rolling bearing unit according to a second embodiment of the invention.

Although according to the first embodiment, the magnetic encoder 26 and the sensor 28 are of a type of being opposed to each other in an axial direction, according to hub unit bearing 30 of the embodiment, as shown by FIG. 9, a magnetic encoder 31 and a sensor 32 are opposed to each other in a radial direction.

According the magnetic encoder 31 of the embodiment, a slinger 33 in a circular ring shape constituting a fixed member is outwardly fitted to be fixed to an outer peripheral portion of an inner end portion of the inner ring 16a, and a magnetic pole forming ring 34 constituting a magnet portion is attached to an inner peripheral face of the slinger 33 extended from the inner ring 16a in an axial direction. Further, an outer peripheral face of the outer ring 5a is fixed with a cover member 35 constituting a stationary member to cover an end portion in the axial direction of the hub unit bearing 2a, and an opening portion formed at the cover member is attached with the sensor 32 to be opposed to the magnetic pole forming ring 34 in the radial direction.

Further, a composition, a molding method of the magnetic encoder 31 are similar to those of the first embodiment.

Therefore, according to the magnetic encoder 31 of the embodiment, in comparison with a magnetic encoder opposed thereto in an axial direction, a diameter of a detected face can be increased with regard to the same space and therefore, when the pitch number stays the same, respective pitch widths can be increased and the magnetic encoder 31 is easy to be fabricated.

THIRD EMBODIMENT

Next, a detailed explanation will be given of a rolling bearing unit attached with a sealing apparatus attached with a magnetic encoder according to a third embodiment of the invention.

Figure 10:
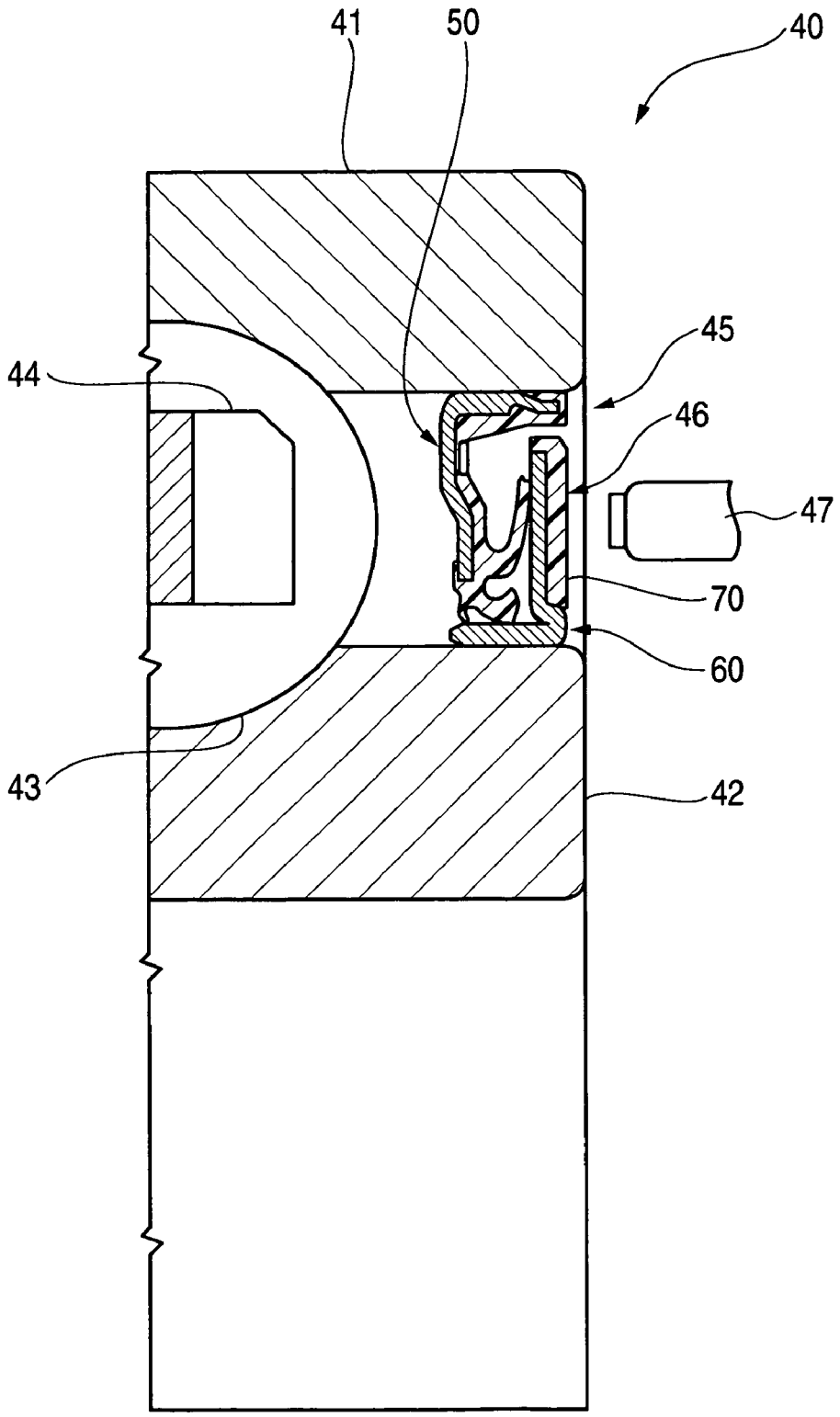
FIG. 10 is a sectional view showing a rolling bearing unit according to a third embodiment of the invention.
Figure 11:
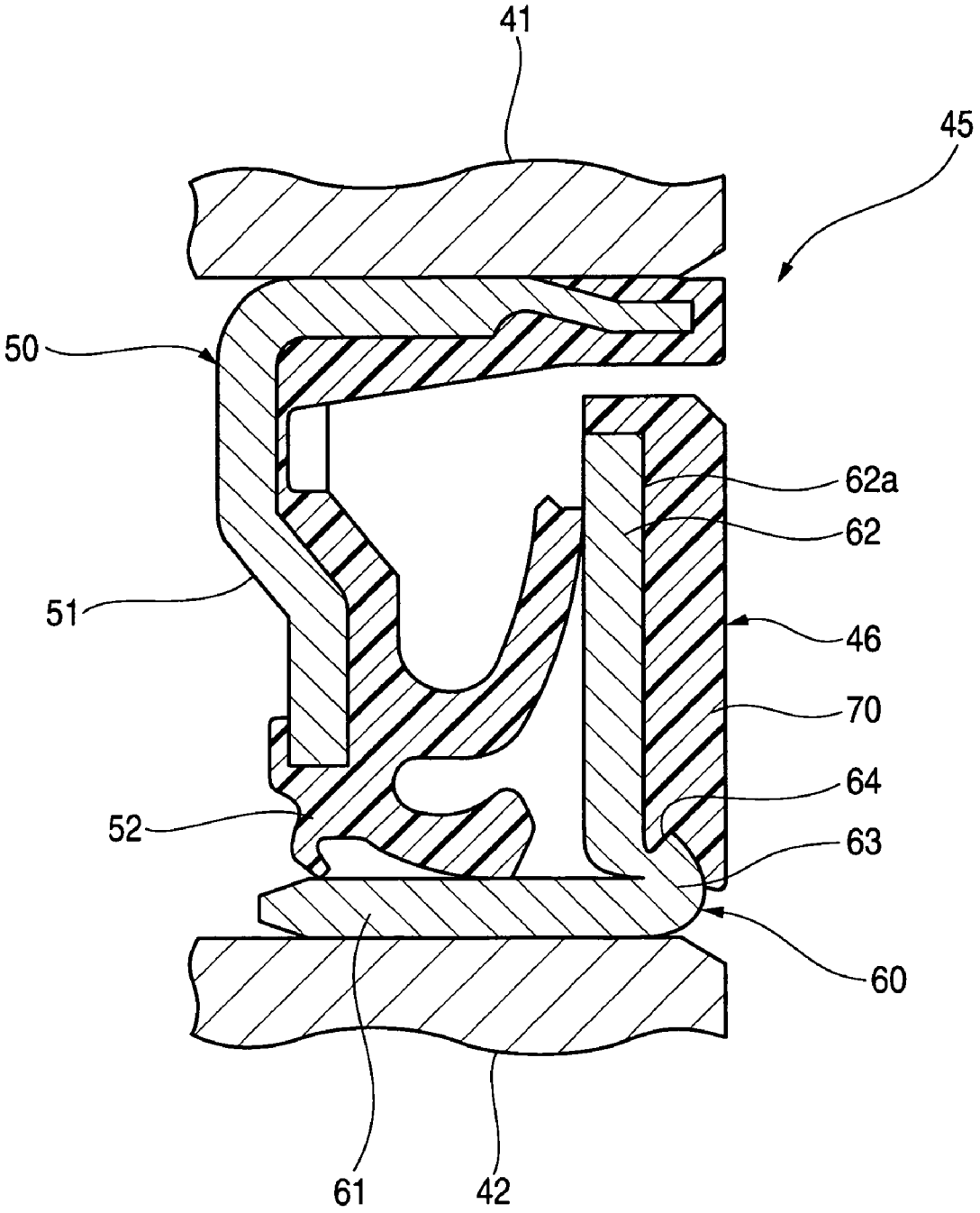
FIG. 11 is a sectional view showing a sealing apparatus including the magnetic encoder according to the third embodiment of the invention.
Figure 12:
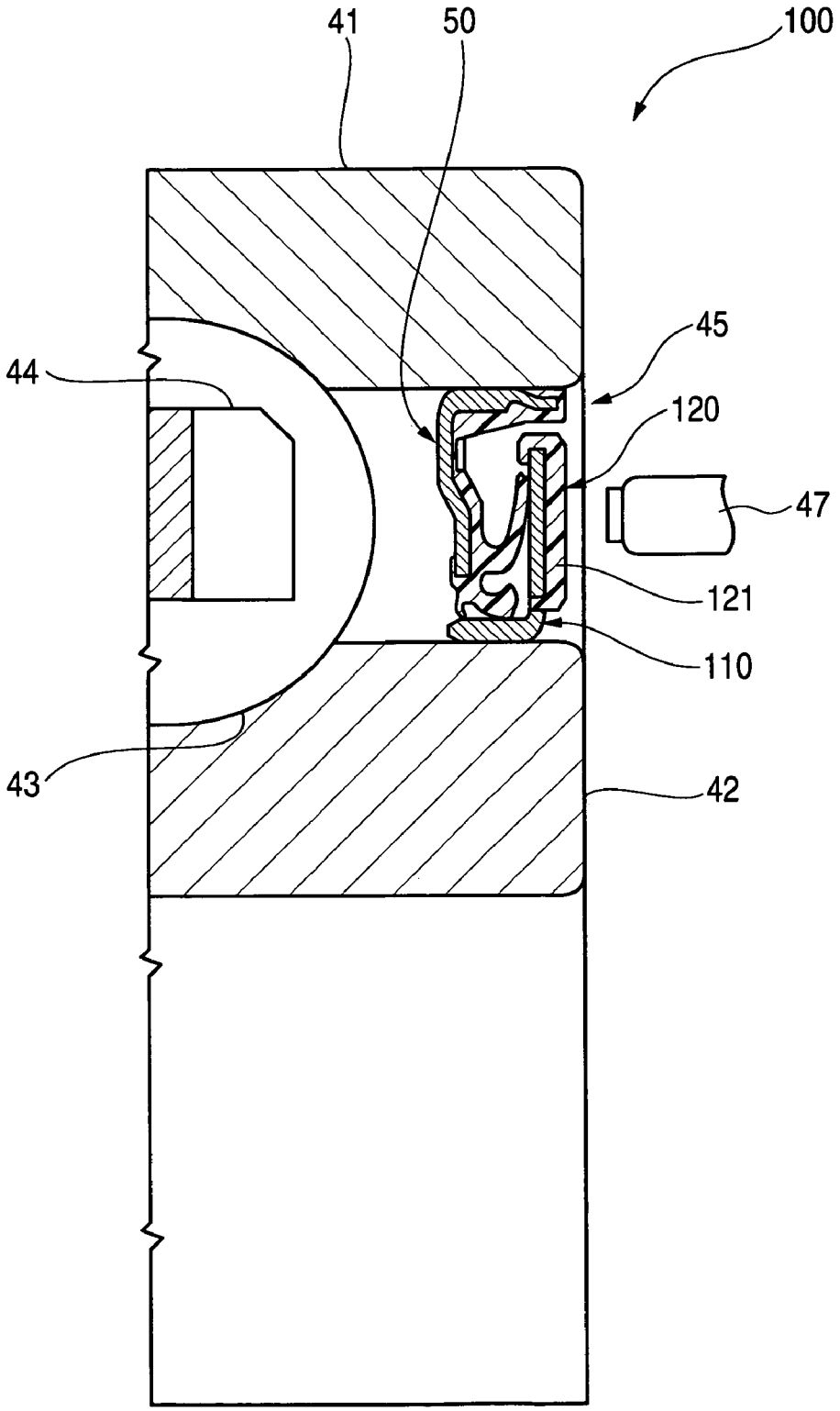
FIG. 12 is a sectional view of a rolling bearing unit integrated with a magnetic encoder according to a fourth embodiment of the invention.

As shown by FIG. 10 and FIG. 11, a rolling bearing unit 40 including a magnetic encoder according to the embodiment includes the outer ring 41 constituting a fixed ring, an inner ring 42 constituting a rotating ring (rotating member), the balls 43 constituting a plurality of rolling members rollably arranged between a ring-like gap partitioned by the outer ring 41 and the inner ring 42 and held at equal intervals in a circumferential direction by a retainer 44, a hermetically sealing apparatus 45 arranged at an opening end portion of the ring-like gap, a magnetic encoder 46, and a sensor 47.

The hermetically sealing apparatus 45 includes the sealing member 50 mounted to an inner peripheral face of the outer ring 41, and a slinger 60 arranged on an outer side of the bearing rather than a sealing member 50 and fixed to an outer peripheral face of the inner ring 42, an opening end portion of the ring-like gap is closed by the seal member 50 and the slinger 60, a foreign matter of dust or the like is prevented from invading inside of the bearing and a lubricant filled at inside of the bearing is prevented from being leaked. Further, the magnetic encoder 46 is constituted by the slinger 60 and the magnet portion 70 attached to the slinger 60, the magnet portion 70 is fixed to the inner ring 42 by constituting a fixed member by the slinger 60.

The sealing member 50 is constituted by reinforcing an elastic member 52 formed in a circular ring shape having a section substantially in an L-like shape by a core metal 51 similarly formed in a circular ring shape having a section substantially in an L-like shape and is mounted by being inwardly fitted to the outer ring 41. A front end portion of the elastic member 52 is branched to a plurality of sliding contact portions, the respective sliding contact portions are brought into sliding contact with an end face of a flange portion 62 of the slinger 60 facing inside of the bearing, or to an outer peripheral face of a fitting portion 61 over an entire periphery thereof. A high hermetically sealing force is provided thereby.

The slinger 60 is formed in a circular ring shape having a section in an L-like shape and includes the fitting portion 61 substantially in a cylindrical shape outwardly fitted to the outer peripheral face of the inner ring 42, the flange portion in a flange-like shape developed in a radius direction from one side end portion of the fitting portion 61, a projected portion 63 projected to an outer side in the axial direction from the flange portion 62 on an inner diameter side of the flange portion 62 by folding to bend the one side end portion of the fitting portion 61. Further, an outer peripheral face of the projected portion 63 is provided with notch portions 64 formed at a plurality of locations in a peripheral direction. An end face (hereinafter, referred to as bonding face) 62a facing an outer side of the bearing of the flange portion 62 is bonded with the magnet portion 70 for changing a magnetic field (for example, magnetic flux density) at a vicinity thereof in synchronism with rotation of the inner ring 42. Further, at the same time, the magnet portion 70 is also mechanically bonded to the notch portion 64 and the outer peripheral portion of the flange portion 62.

Further, a composition, a molding method of the magnetic encoder 46 are similar to those of the first embodiment.

Therefore, according to the magnetic encoder of the embodiment, the melted magnet material flows also to the notch portions 64 provided by a plurality thereof in the peripheral direction of the projected portion 63 provided on the inner diameter side in addition to the outer diameter portion of the flange portion 62 and is mechanically bonded thereto. Thereby, shrinkage of the magnet material is received not only by the outer diameter portion of the flange portion 62 but by the projected portion 630 on the inner diameter side, and a frequency of bringing about the crack of the magnet portion produced by heat shock or the like can further be reduced.

Further, the magnetic encoder 46 according to the embodiment can be integrated to be used by the hub unit bearing as shown by FIG. 1.

FOURTH EMBODIMENT

Next, a detailed explanation will be given of a rolling bearing unit integrated with a magnetic encoders according to a fourth embodiment of the invention. Further, portions equivalent to those of the rolling bearing unit according to the third embodiment are attached with the same notations and an explanation thereof will be omitted or simplified.

As shown by FIG. 12 through FIG. 15, the rolling bearing unit 100 includes the outer ring 41 constituting the fixed ring, the inner ring 42 constituting the rotating ring, the balls 43 constituting a plurality of rolling members rollably arranged in the ring-like gap partitioned by the outer ring 41 and the inner ring 42 and held at equal intervals in the circumferential direction by the retainers 44, the hermetically sealing apparatus 45 arranged at the opening end portion of the ring-like gap, the magnetic encoder 120 for detecting the rotational number of the inner ring 42 and the sensor 47.

The hermetically sealing apparatus 45 includes the sealing member 50 fixed to the inner peripheral face of the outer ring 41 and having the core metal 51 and the elastic member 52, and a slinger 110 arranged on the outer side of the opening end portion more than the sealing member 50 and fixed to the outer peripheral face of the inner ring 42, the opening end portion of the ring-like gap is closed by the sealing member 50 and the slinger 110, a foreign matter of dust or the like is prevented from invading inside of the bearing and a lubricant filled at inside of the bearing is prevented from being leaked to outside of the bearing. Further, the magnetic encoder 120 is constituted by bonding the magnet portion 121 in the circular ring shape to the slinger 110 constituting the fixed member and is rotated along with the inner ring 42.

The slinger 110 is constituted by forming the magnet material in the circular ring shape having the section in the L-like shape and includes the fitting portion 112 substantially in the cylindrical shape outwardly fitted to the outer peripheral face of the inner ring 42, and the flange portion 111 substantially in a shape of a circular plate extended in the radius direction from one end on the side of the opening end portion of the fitting portion 112. Further, an outer peripheral edge portion of the flange portion 111 is provided with a plurality of locking portions 113 notched in a recessed shape at equal intervals in a circumferential direction, and the flange portion 111 is formed with through holes 114 at equal intervals in a peripheral direction. An end face on an outer side of an opening end portion of the flange portion 111 is bonded with the magnetic encoder 120 for changing a magnetic field (for example, magnetic flux density or the like) at a vicinity thereof in synchronism with rotation of the inner ring 42.

A magnet portion 121 is provided with a magnetizing portion 122 in a circular ring shape having a section substantially in a rectangular shape, a plurality of locking pieces engaged with the locking portions 113 of the slinger 110, and a connecting portion 123 for connecting the plurality of locking pieces. Therefore, by engaging the locking portion 113 and the locking piece and pinching the flange portion 111 by the magnetizing portion 122 of the encoder 120 and the connecting portion 123, the magnet portion 121 and the slinger 110 are mechanically bonded. Further, the melted magnet material is filled also to the through hole 114 of the flange portion 111 and the magnet portion 121 and the slinger 110 are mechanically bonded.

The magnet portion 121 is formed by subjecting the magnet material including the magnet powder pertinently in a range of 86 through 92 weight % and constituting the binder by the thermoplastic resin to injection molding and molded by insert molding by constituting the core by the slinger 110 in the dies. By carrying out insert molding, the melted magnet material is filled to the locking portion 113 of the slinger 110 to form the locking piece, and is filled also to a space in a circular ring shape in the dies provided to connect the locking pieces contiguously to the end face on the inner side of the opening end portion of the flange portion 111 to form the connecting portion 123. By engaging the locking portion 113 and the locking piece and pinching the flange portion 111 by the magnetizing portion 122 and the connecting portion 123 of the magnet portion 121, the magnet portion 121 and the slinger 110 are mechanically bonded.

The magnetizing portion 122 is magnetized with S poles and N poles alternately (that is, in multipoles) at equal intervals in the circumferential direction similar to the magnetic pole forming ring 27 shown in FIG. 3 of the first embodiment. During a time period of rotating the inner ring 42 by one rotation, a magnetic flux density at one point at a vicinity of the magnetic encoder 120 is periodically changed by including a number of peaks in correspondence with a number of poles of the magnetizing portion 122. Further, a change in the magnetic flux density is detected by the sensor 47 arranged opposedly to the end face in the axial direction of the magnet portion 121 facing outer side of the bearing to thereby detect the rotational number of the inner ring 42.

Figure 16:
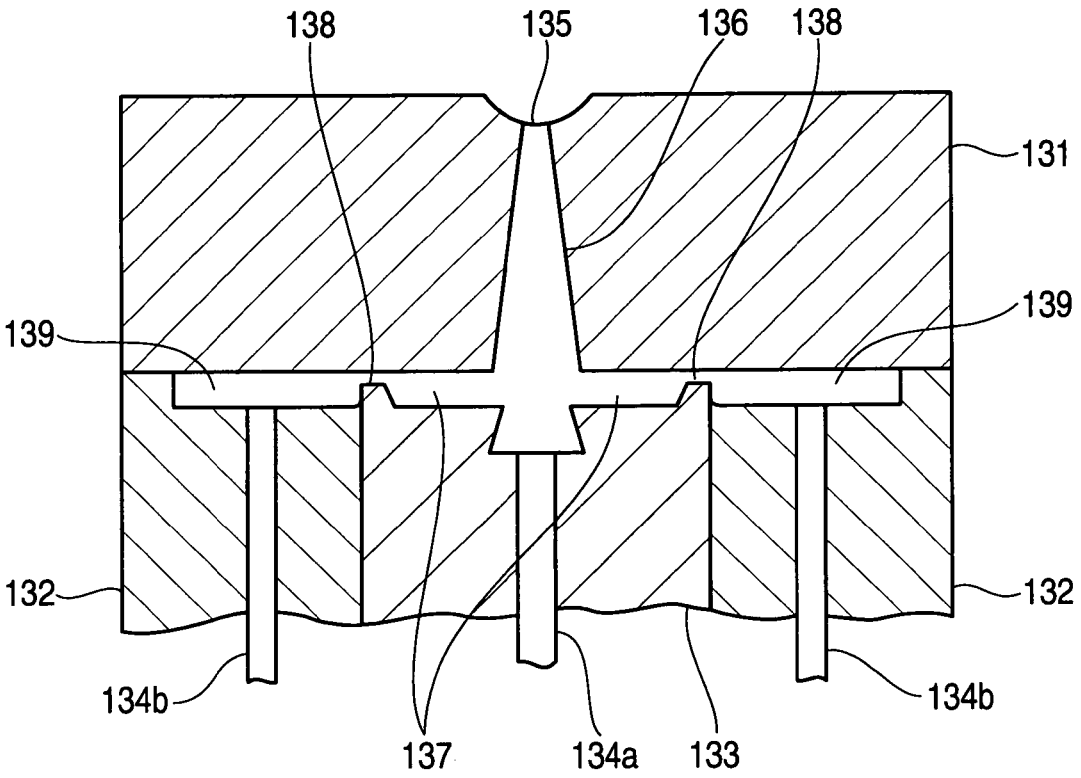
FIG. 16 is a sectional view of a die used in injection molding of an encoder shown in FIG. 13.

In reference to FIG. 16, the magnet portion 121 of the magnetic encoder 120 is molded by using an injection molding machine including a movable side die plate 131, a core 132, a fixed side die plate 133, an ejector pin 134a, and an ejector pin 134b for sprues. The movable side die plate 131 is formed with a nozzle port 135 injected with the melted magnetic material by being connected to a nozzle of the injection molding machine at a center portion of an upper side face, a sprue 136 having a section substantially in a circular shape is formed by being penetrated to a lower side face thereof continuously from the nozzle portion 135. The sprue 136 is a flow path of the magnet material reaching a runner 137 from the nozzle of the injection molding machine and is formed in a taper shape constituting a large diameter by a side of the runner 134 rather than the nozzle port 135. Thereby, the magnet material (molded member) solidified at the sprue 136 is facilitated to be drawn. The runner 137 is a flow path of the resin reaching a gate 138 from the sprue 136 and is a space partitioned by a recessed portion substantially in a shape of a circular disk provided at the fixed side die plate 133 and a lower side face of the movable side die plate 131. Further, a center portion of a bottom face of the runner 137 is provided with a sprue lock in an inverse taper shape constituting a stopper against a direction of taking out the molded member, and after injection molding, when the movable side die plate 131 is taken out, the movable side die plate 131 and the molded member can smoothly be separated. Further, the ejector pin 134a for the sprue is provided on the lower side of the sprue lock, and the molded member is separated from the fixed side die plate 133 by pushing up the molded member from a lower side.

The gate 138 is a flow inlet by which the magnet material flows from the runner 137 to a cavity 139, and the cavity 139 is a space for molding a shape of the magnet portion 121. The cavity 139 is a space partitioned by a recessed portion in a circular ring shape, a peripheral face of the fixed side die plate 133 and the lower side face of the movable side die plate 131 in correspondence with the shape of the magnet portion 121 provided at the core 132 for holding the slinger, not illustrated. Further, a bottom face of the cavity 139 is provided with a plurality of the ejector pins 134b in the peripheral direction, after injection molding, the magnet portion 121 is separated from the core 132 by pushing up the magnet portion 121 from the lower side. The gate 138 is a space in a circular ring shape connecting the outer peripheral portion of the runner 137 and the inner peripheral portion of the cavity 139 over an entire periphery thereof to communicate the runner 137 and the cavity 139 and is a so-to-speak disk gate.

In the above-described injection molding machine, the magnet portion 121 is molded by making the melted magnet material flow to the runner 137 from the nozzle port 135 by way of the sprue 136, injecting the magnet material to the cavity 139 under high pressure from the disk gate 138 and rapidly cooling the magnet material to solidify. The magnet material injected from the disk gate 138 under high pressure is widened with a shape of a radial circle from the inner peripheral portion of the cavity 139 to be uniformly filled in the cavity 139 and therefore, the melted magnet materials do not collide with each other, the respective magnetic powders in the scale-like shape (plate-like crystal) included in the magnet material are oriented by aligning a normal line direction of a face (that is, axis of easy magnetization) in parallel with the thickness direction (in other words, axial direction) of the magnetic encoder 120. Particularly, an orientation degree of a vicinity of the inner peripheral portion (that is, magnetizing portion) scanned by the sensor is high and a magnetic property very near to axial anisotropy is shown. Further, by carrying out injection molding in a state of applying a magnetic field in the thickness direction, the magnetic powder in the magnet material can completely be oriented.

According to the rolling bearing unit 100 integrated to the magnetic encoder 120, the magnet material including the magnetic powder pertinently in a range of 86 through 92 weight % by constituting the binder by the thermoplastic resin is subjected to injection molding in the shape of the radial circle from the inner peripheral portion by the disk gate type to mold the magnet portion 121 in the circular ring shape and therefore, the orientation degree of the magnetic powder included in the magnet portion 121 can be promoted and the magnetic property of the magnetic encoder 120 can be promoted. Thereby, the gap between the magnetic encoder 120 and the sensor can be increased, further, the magnetizing portion 122 of the magnet portion 121 can be magnetized further in multipoles and therefore, the magnet portion can be facilitated to be integrated to the sensor and the rotational number of the inner ring 42 can highly accurately be detected. Further, the magnet portion 121 is not provided with the weld portion at which the magnet materials collide with each other to solidify, the mechanical strength is high and a crack or the like is difficult to be brought about. Further, the magnet portion 121 is subjected to insert molding by constituting the core by the slinger 110 and therefore, the encoder 120 at the magnet portion 121 can mechanically be bonded, the magnet portion 121 can firmly be prevented from being detached from the slinger 120 to thereby promote reliability.

Further, the composition explained in the first embodiment is applicable to the composition of the magnetic encoder 120 according to the embodiment.

Further, polyamide resin of polyamide 6, polyamide 12 or the like is used, by coating a silane coupling agent having epoxy group of γ-glycydoxypropyltriethoxy silane or the like to the face of bonding the slinger and the magnet portion and thereafter carrying high frequency heating, silanol group (Si—OH) formed by hydrolysis of methoxy group included in the silane coupling agent carries out a hydrating condensation reaction with hydroxyl group (OH) on the surface of the slinger to form a new bond, and epoxy group reacts with amide bond of the binder to form a new bond. Thereby, the magnet portion of the slinger is chemically bonded completely and reliability can be promoted by firmly preventing the magnet portion from being detached from the slinger.

Figure 13:
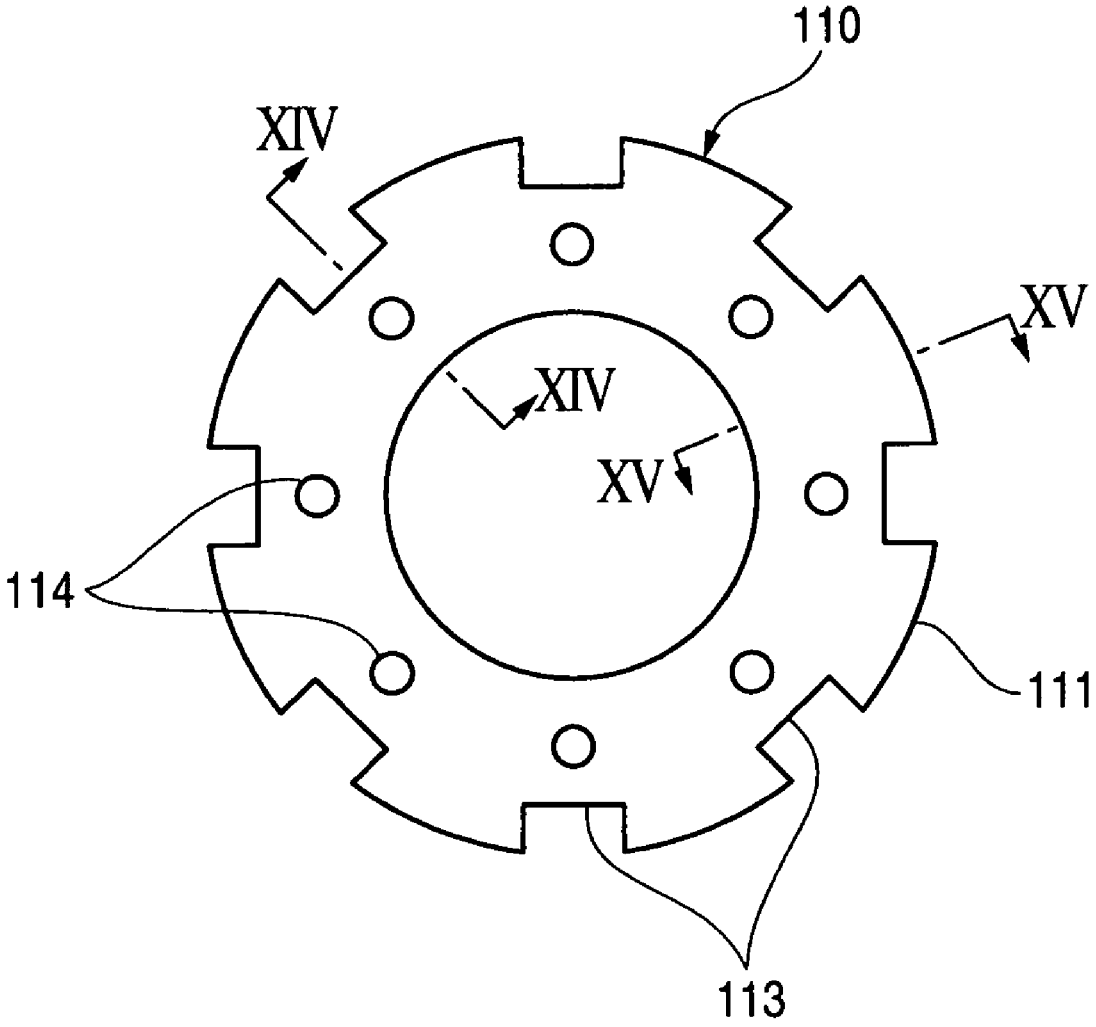
FIG. 13 is a front view of a slinger shown in FIG. 12.
Figure 14:
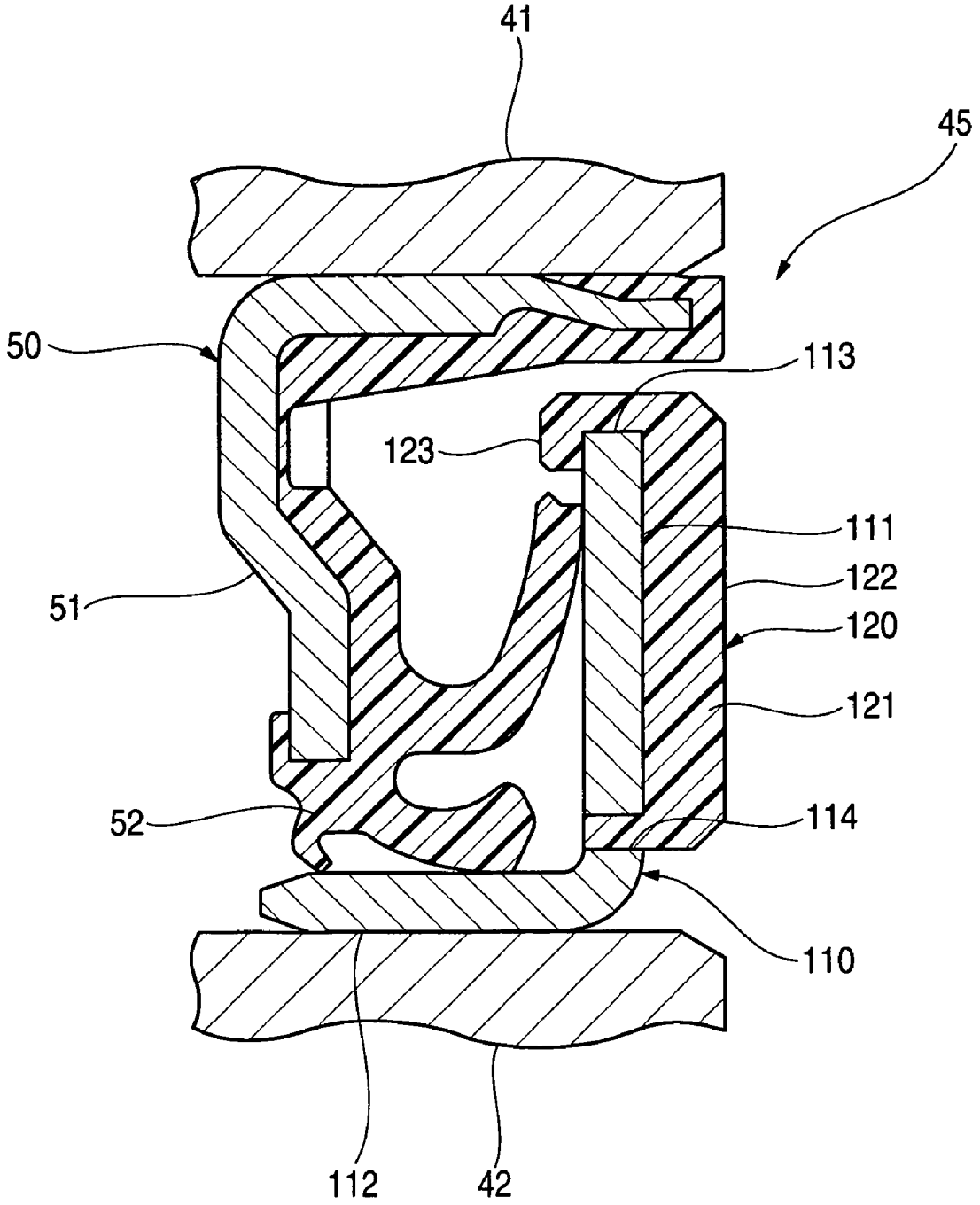
FIG. 14 is a sectional view of an essential portion of a rolling bearing unit shown in FIG. 12 on a plane the same as that of a section in an arrow mark XIV-XIV direction of the slinger shown in FIG. 13.
Figure 15:
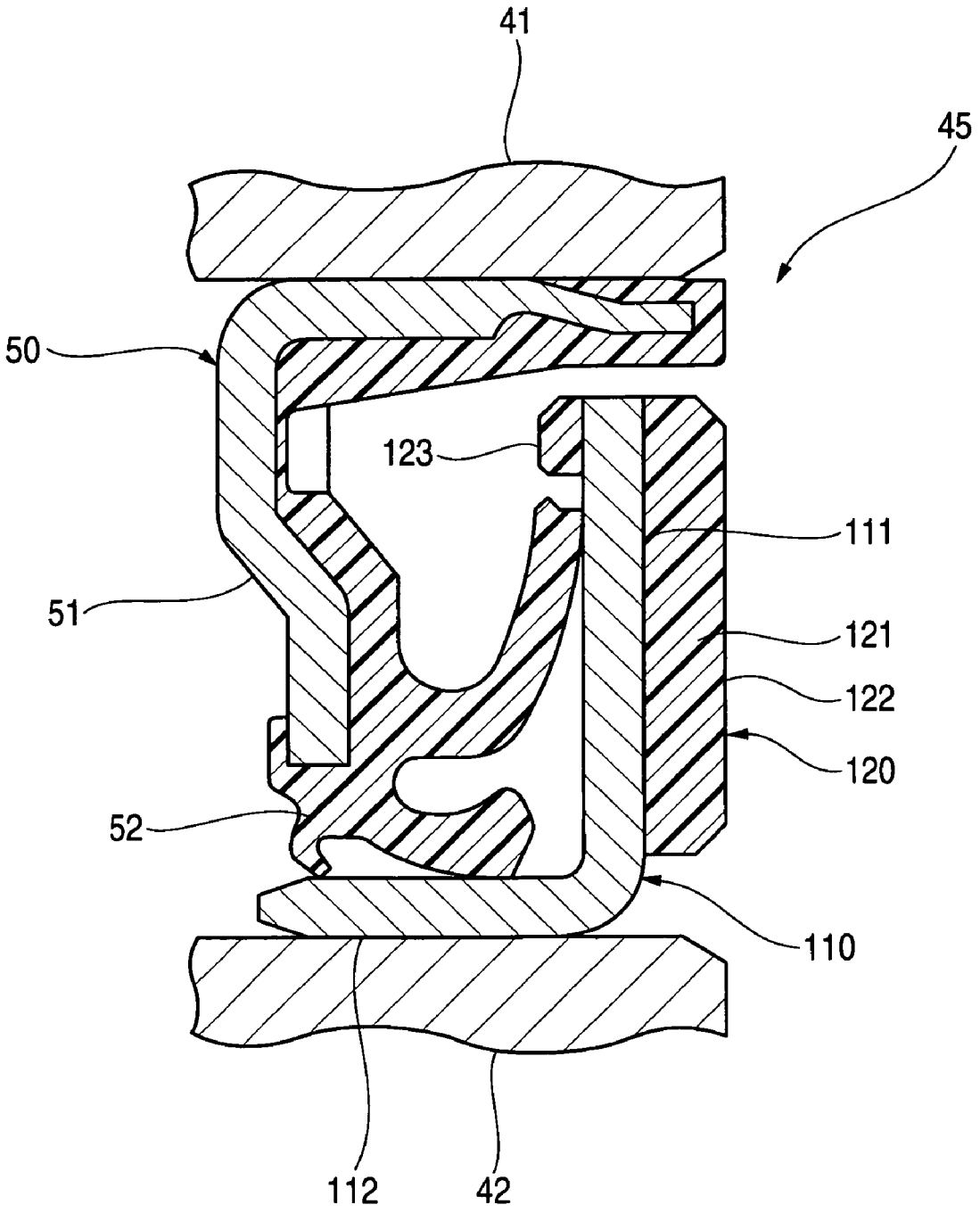
FIG. 15 is a sectional view of an essential portion of the rolling bearing unit shown in FIG. 12 on a plane the same as that of a section in an arrow mark XV-XV direction of the slinger shown in FIG. 13.

Further, the structure of the flange portion 111 of the slinger 110 is not limited to the structure shown in FIG. 13 but, for example, on a circumference of a center portion in a radius direction, pluralities of through holes and engaging recess portions may be provided at equal intervals in a circumferential direction. In this case, the magnet portion 121 is subjected to insert molding such that the melted magnet material is filled to the through hole or the engaging recess portion and is mechanically bonded to the slinger 110. Further, in order to promote adherence between the magnet portion 121 of a comparatively hard resin based and the flange portion 111, an elastic member in a film-like shape of rubber or the like may be interposed therebetween.

Further, also the magnetic encoder 120 according to the embodiment is applicable to a hub unit bearing, the magnet portion 121 may be bonded to the slinger constituting the hermetically sealing apparatus similar to the first embodiment, or may be arranged between two rows of inner ring track faces in parallel with each other and fixed to the rotating member by way of an attaching member as mentioned later. In this case, the sensor is arranged to be opposed to the outer peripheral face of the magnet portion 121 and is held by the outer ring. Further, the slinger and the attaching member may be constituted by a simple circular ring shape without a flange portion. Further, the magnet portion 121 may be formed separately from the slinger or the attaching member and bonded to the slinger or the attaching member by using an adhering agent. Further, the magnet portion 121 may be fixed by being press-fitted to the slinger or the attaching member, or the rotating member, or the magnet portion 121 may be fixed by using both of adhering by an adhering agent and fixing by press-fitting.

FIFTH EMBODIMENT

Next, a detailed explanation will be given of a rolling bearing unit integrated with a magnetic encoder according to a fifth embodiment of the invention. Further, portions equivalent to those of the rolling bearing unit according to the third embodiment are attached with the same notations and an explanation thereof will be omitted or simplified.

Figure 17:
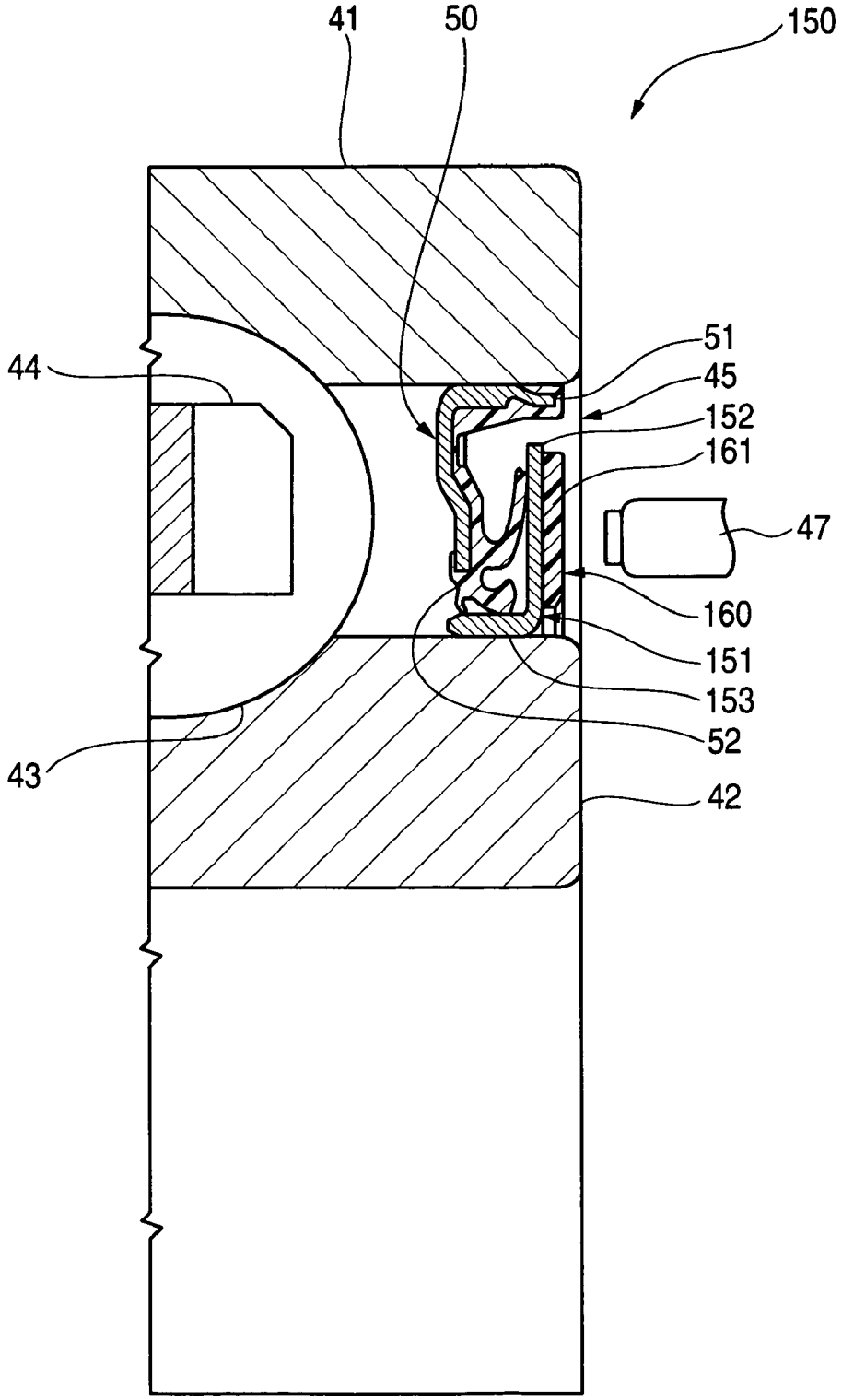
FIG. 17 is a sectional view of a rolling bearing unit integrated with a magnetic encoder constituting a fifth embodiment according to the invention.

As shown by FIG. 17, a rolling bearing 150 integrated with the magnetic encoder according to the fifth embodiment of the invention includes the outer ring 41 constituting the fixed ring, the inner ring 42 constituting the rotating member, a plurality of balls 43 arranged rollably at the ring-like gap partitioned by the outer ring 41 and the inner ring 42 and held by the retainers 44 at equal intervals in the circumferential direction, the hermetically sealing apparatus 45 arranged at the opening end portion of the ring-like gap, the magnetic encoder 160 for detecting the rotational number of the inner ring 42 and the sensor 47. The hermetically sealing apparatus 45 includes the sealing member 50 fixed to the inner peripheral face of the outer ring 41 and including the core metal 51 and the elastic member 52, and the slinger 151 arranged on the outer side of the opening end portion rather than the seal member 50 and fixed to the outer peripheral face of the inner ring 42, the opening end portion of the ring-like gap is closed by the sealing member 50 and the slinger 51, a foreign matter of dust or the like is prevented from invading inside of the bearing and a lubricant filled at inside of the bearing is prevented from being leaked to outside of the bearing.

The slinger 151 is constituted by forming the magnetic metal material in the circular ring shape having the section in the L-like shape and includes the fitting portion 153 substantially in the cylindrical shape outwardly fitted to the outer peripheral face of the inner ring 42 and the flange portion 152 substantially in the circular disk shape extended in the radius direction from one end on a side of the opening end portion of the fitting portion 153. The end face of the flange portion 152 facing outside of the bearing is adhered with the magnet portion 161 in the circular ring shape for changing a magnetic field (for example, magnetic flux density or the like) of a vicinity thereof in synchronism with rotation of the inner ring 42, and the magnetic encoder 160 is constituted by the slinger 151 and the magnet portion 161. Further, by forming the slinger 158 constituting the member of fixing the magnet portion 161 by the magnetic material, the magnetic property of the magnet portion 161 can be prevented from being deteriorated, thereby, the accuracy of detecting the rotational number of the inner ring 42 can be promoted.

Figure 18:
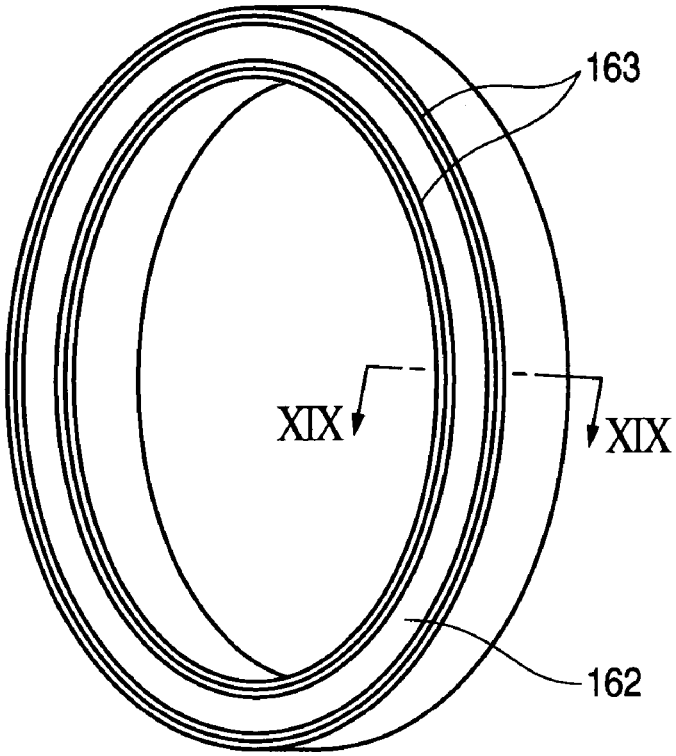
FIG. 18 is a perspective view showing an adhering face of a magnet portion of a magnetic encoder.
Figure 19:
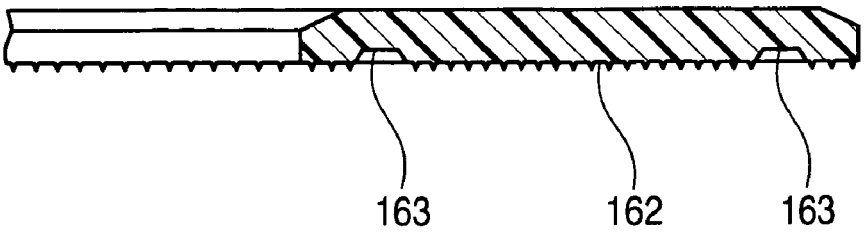
FIG. 19 is a sectional view in an arrow mark XIX-XIX direction of FIG. 18.

Further in reference to FIG. 18 and FIG. 19, the magnet portion 161 is a plastic magnet subjected to injection molding in a circular ring shape having a section substantially in a rectangular shape. One side end face (hereinafter, referred to as magnetizing face) in an axial direction of the magnet portion 161 is alternately (that is, in multipoles) magnetized with S poles and N poles at equal intervals in a circumferential direction similar to the magnetic pole forming ring 27 of FIG. 3 according to the first embodiment. An end face in the axial direction of the magnet portion 161 other than the magnetizing face is provided with an adhering face 162 adhered with the flange portion 152 of the slinger 151, and grooves 163, 163 for preventing the adhering agent coated to the adhering face 162 from overflowing to outside. Further, when a magnetic field is applied (that is, subjected to orientation by magnetic field) in the axial direction of the magnet portion 161, the orientation degree of the magnetic powder can be promoted, the magnetic property of the magnet portion 161 can be promoted, thereby, the accuracy of detecting the rotational number of the inner ring 42 can be promoted.

The grooves 163, 163 of the magnet portion 161 are respectively formed in a circular ring shape having a section substantially in a trapezoidal shape over entire peripheries thereof at peripheral edge portions on an outer diameter side and an inner diameter side of the adhering face 162. Further, the adhering face 162 is formed with recessed and projected portions over an entire face thereof to provide a pertinent surface roughness in a range of 0.8 through 5.0 μmRa. A middle portion of the grooves 163, 163 of the adhering face 162 (that is, a circumference at a center portion in a diameter direction of the adhering face 162) is coated with the adhering agent, and the adhering face 162 and the end face of the flange portion 152 are adhered to each other. Therefore, the magnet portion 161 is fixed to the slinger 151 in a state of directing the magnetizing face to outside of the bearing and is rotated along with the inner ring 162. During a time period of rotating the inner ring 162 by one rotation, a magnetic flux density at one point at a vicinity of the magnet portion 161 is periodically changed to provide a number of peaks in correspondence with a number of poles of the magnet portion 161. Further, the rotational number of the inner ring 42 is detected by detecting a change in the magnet flux density by the sensor 47 arranged opposedly the magnetizing face of the magnet portion 161.

Figure 20:
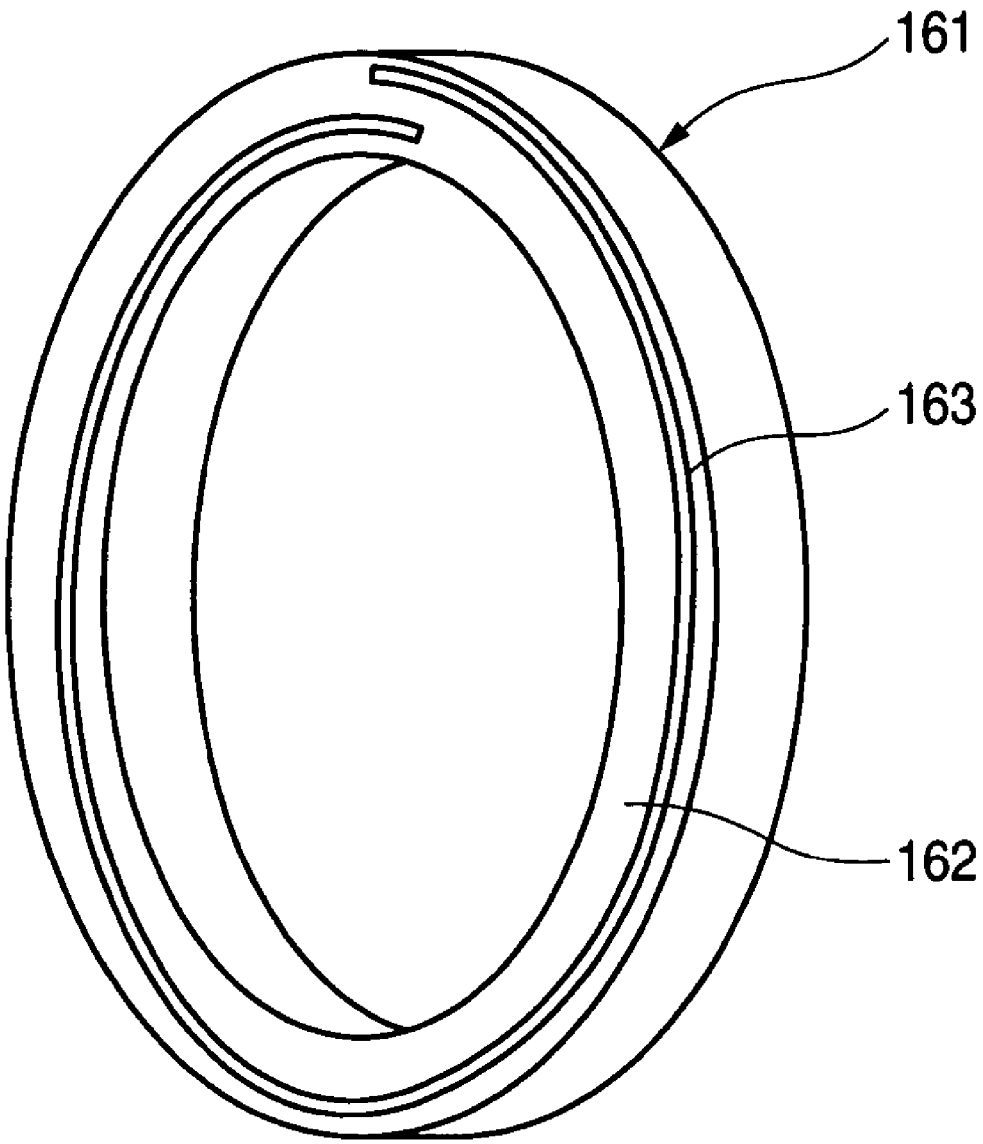
FIG. 20 is a perspective view showing a magnet portion of a magnetic encoder according to a modified example of the fifth embodiment.

Further, although in the above-described fifth embodiment, according to the magnet portion 161, the adhering face 162 is formed by a pertinent surface roughness in a range of 0.8 through 5.0 μmRa and the grooves 163, 163 are respectively formed at the peripheral edge portions on the inner diameter side and the outer diameter side of the adhering face 162, the embodiment is not limited thereto but, for example, the adhering face 162 may only be formed by the pertinent surface roughness in the range of 0.8 through 5.0 μmRa without providing the grooves 163, or, the grooves 163, 163 may be formed respectively at the peripheral edge portions of the inner diameter and the outer diameter of the adhering face 162 by constituting the adhering face 162 by a smooth face (about 0.4 μmRa achieved by normally finishing a die face). Further, as shown by FIG. 20, an entire face of the adhering face 162 may be covered by a single piece of the groove 163 by forming the groove 163 spirally. Further, although the recessed and projected portions formed at the adhering face 162 are preferably formed on the entire face of the adhering face 162, the recessed and projected portions may be formed at least at a portion of the adhering face 162. For example, the recessed and the projected portions may be formed to be scattered uniformly over an entire face of the adhering face 162 or may be formed over an entire periphery of the outer peripheral portion on the inner diameter side and/or the outer diameter side of the adhering face 162.

Further, also the magnetic encoder 160 of the embodiment is applicable to a hub unit bearing similar to the fourth embodiment, the magnet portion 161 may be bonded to the slinger constituting the hermetically sealing apparatus as in the first embodiment, or, as mentioned later, may be arranged between two rows of inner ring tracks in parallel with each other and fixed to a rotating member by way of a fixing member.

Further, according to the magnetic encoder 160 of the embodiment, the method of bonding the magnet portion 161 and the slinger 151 differs from those of the above-described embodiments and therefore, the adhering agent is not limited to that of the first embodiment but various adhering agents are applicable thereto, and also compositions of the magnet portion 161 and the slinger 151 can pertinently be changed in accordance therewith.

SIXTH EMBODIMENT

Figure 21:
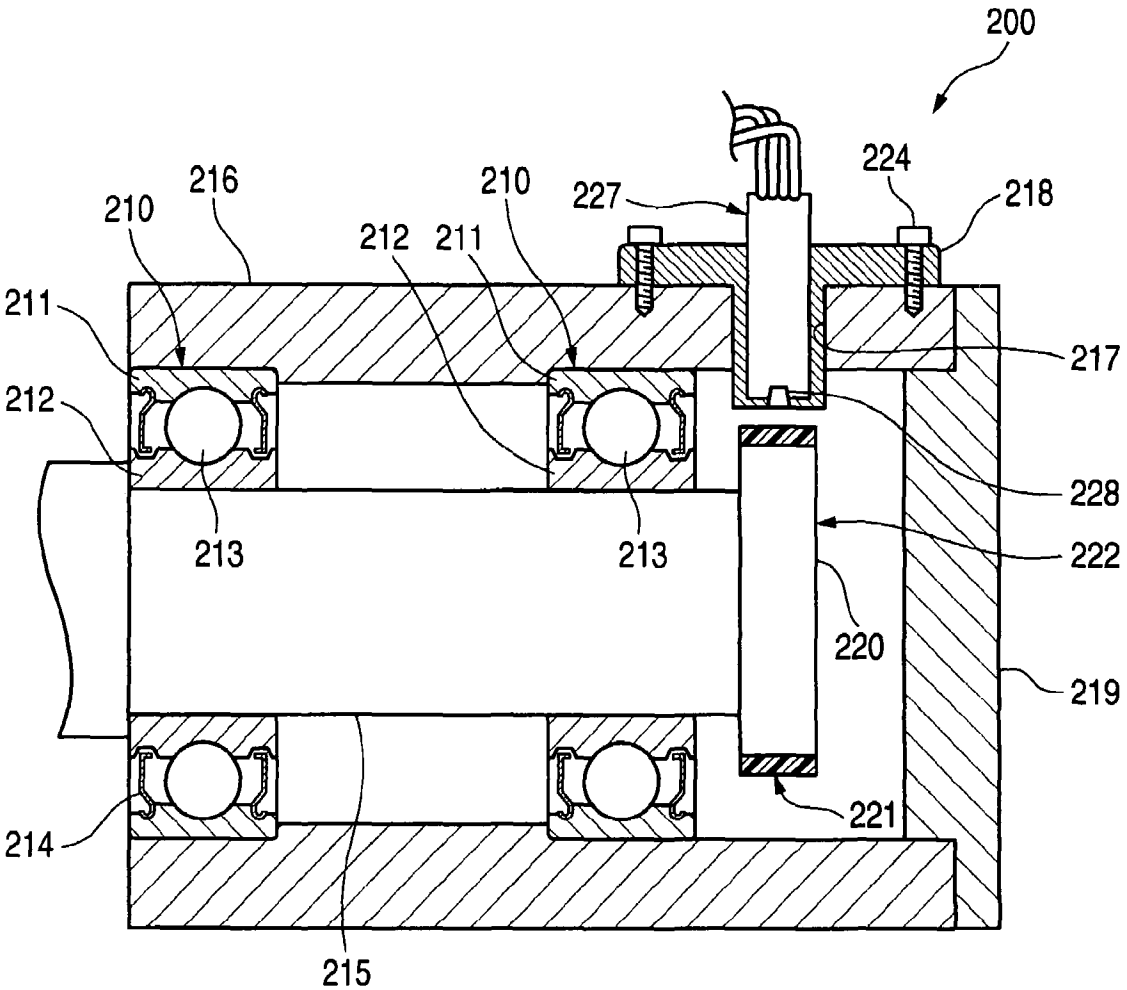
FIG. 21 is a sectional view of a main shaft apparatus integrated with a magnetic encoder constituting a sixth embodiment of the invention.

Next, an explanation will be given of a main shaft apparatus integrated with a magnetic encoder according to a sixth embodiment of the invention in reference to FIG. 21.

The main shaft apparatus 200 contains a main shaft 215 constituting a rotating member at inside of a housing 216, the main shaft 215 is rotatably supported by rolling bearings 210, 210 arranged in parallel with each other in an axial direction at a gap between the housing 216 and the main shaft 215. The rolling bearing 210 is constituted by an outer ring 211, an inner ring 212, a plurality of balls 213 arranged rollably at a ring-like gap partitioned by the outer ring 211 and the inner ring 212, and sealing members 214, 214 for closing opening end portions on both sides in the axial direction of the ring-like gap respectively. A base end portion of the main shaft 215 is formed to project in the axial direction from the rolling bearing 210, a projected end thereof is provided with a fixed member 220 for fixing the magnet portion 221 to the main shaft 215, and the magnetic encoder 222 is constituted by the fixed member 222 and the magnet portion 221. The fixed member 220 may integrally be formed with the main shaft 215 substantially in a shape of a circular column, or, may be formed in a shape of a circular ring as a member separate from the main shaft 215 and outwardly fitted to the main shaft 215 to be fixed thereby. Further, an outer peripheral face of the fixed member 220 is outwardly fitted to be adhered with the magnet portion 221 formed in the shape of the circular ring for changing a magnetic field (for example, magnetic flux density or the like) of a vicinity thereof in synchronism with rotation of the main shaft 215.

Figure 22:
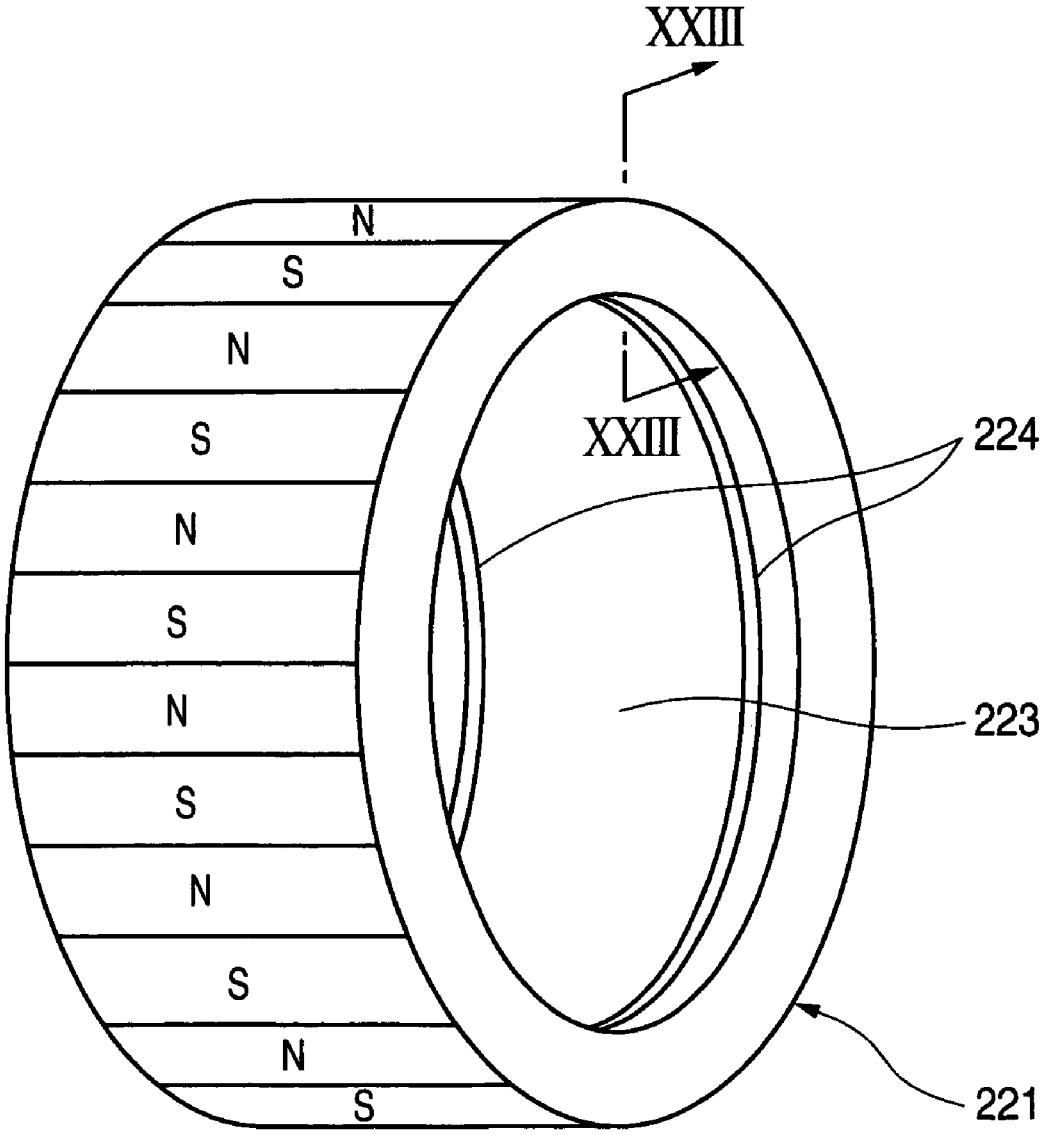
FIG. 22 is a perspective view of a magnet portion of the magnetic encoder shown in FIG. 21 and is a schematic view showing a magnetizing pattern of the magnetic portion.
Figure 23:
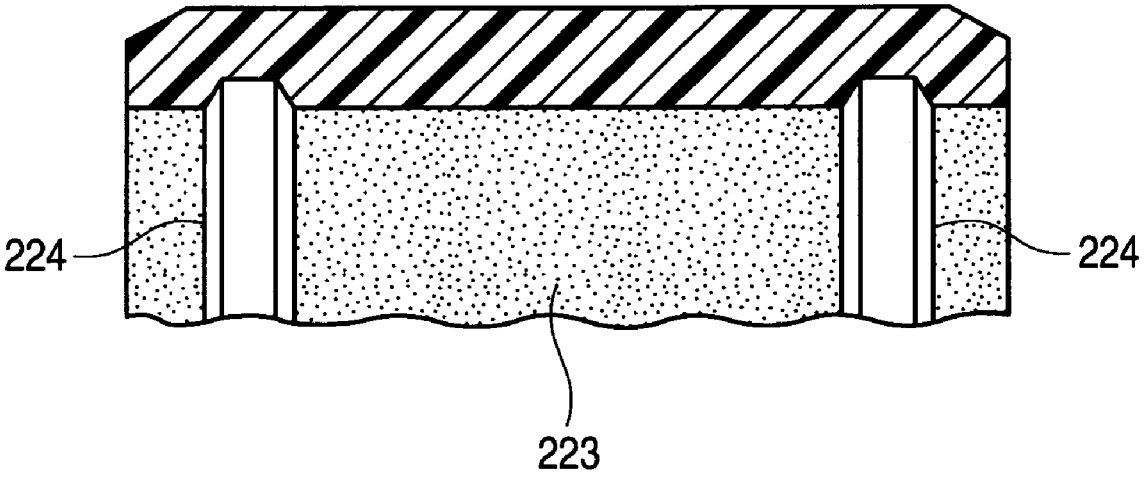
FIG. 23 is a sectional view in an arrow mark XXIII-XXIII direction of FIG. 22.

Further, in reference to FIG. 22 and FIG. 23, the magnet portion 221 is a plastic magnet subjected to injection molding in a circular ring shape having a section substantially in a rectangular shape, an outer peripheral face of the magnet portion 221 is alternately (that is, in multipoles) magnetized with S poles and N poles at equal intervals in a circumferential direction. An inner peripheral face of the magnet portion 221 is provided with an adhering face 223 adhered to an outer peripheral face of the fixed member 220, and grooves 224, 224 for preventing the adhering agent coated to the adhering face 223 in the adhering step from overflowing to outside. Further, the grooves 224, 224 of the magnet portion 221 are formed in a circular ring shape having a section substantially in a trapezoidal shape respectively over entire peripheries thereof at peripheral edge portions of both ends in the axial direction of the adhering face 223. Further, the adhering face 223 is formed by a pertinent surface roughness in a range of 0.8 through 5.0 μmRa. The adhering agent is coated to a total of a middle portion of the grooves 224, 224 of the adhering face 223, and the outer peripheral face of the fixing member 220 and the adhering face 223 are adhered to each other. Thereby, the magnet portion 221 is fixed to the fixed member 220 and rotated along with the main shaft 215.

Further, the composition of the magnetic encoder 222 is similar to that of the above-described fifth embodiment.

Further, a sensor 227 is held by a through hole 217 of the housing 216 provided on an extension to an outer side in the diameter direction of the magnetic encoder 222 by way of a holding member 218, and is arranged to make a Hall element 228 provided at a front end thereof opposed to the outer peripheral face of the magnetic encoder 222 by a small gap therebetween. The rotational number of the main shaft 215 is detected by detecting a change in the magnetic flux density by the sensor 227.

Further, in the above-described sixth embodiment, the fixed member 220 and the magnet portion 221 may be fixed to the main shaft 215 by being arranged between the rolling bearings 210, 210 arranged in parallel with each other. Further, the magnetic encoder 222 of the embodiment may be applied to the hub unit bearing.

SEVENTH EMBODIMENT

Next, a detailed explanation will be given of a rolling bearing unit integrated with a magnetic encoder according to a seventh embodiment of the invention in reference to FIG. 24 through FIG. 36. Further, portions equivalent to those of the rolling bearing unit according to the third embodiment are attached with the same notations and an explanation thereof will be omitted or simplified.

Figure 24:
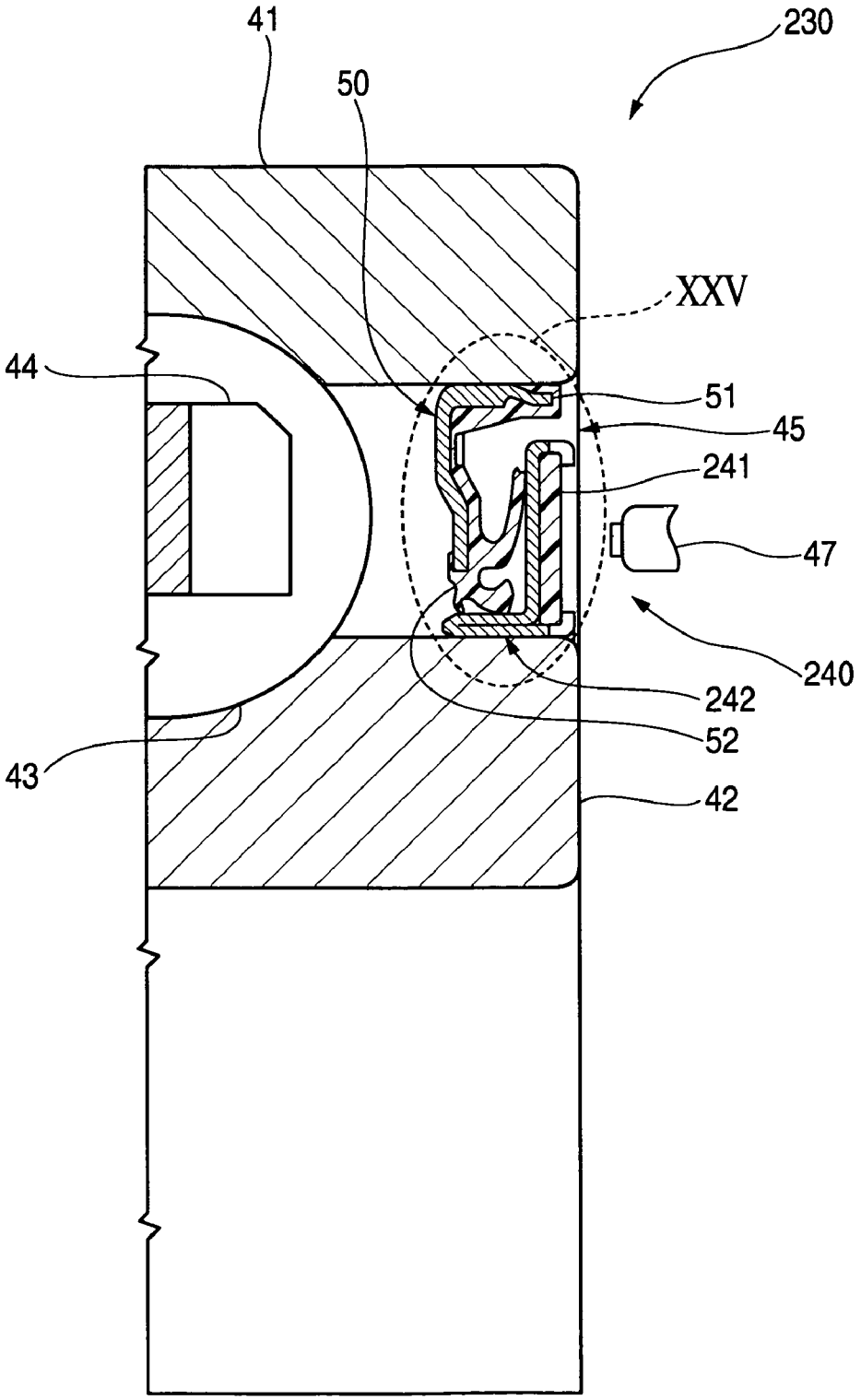
FIG. 24 is a sectional view of a rolling bearing unit including a magnetic encoder constituting a seventh embodiment according to the invention.
Figure 25:
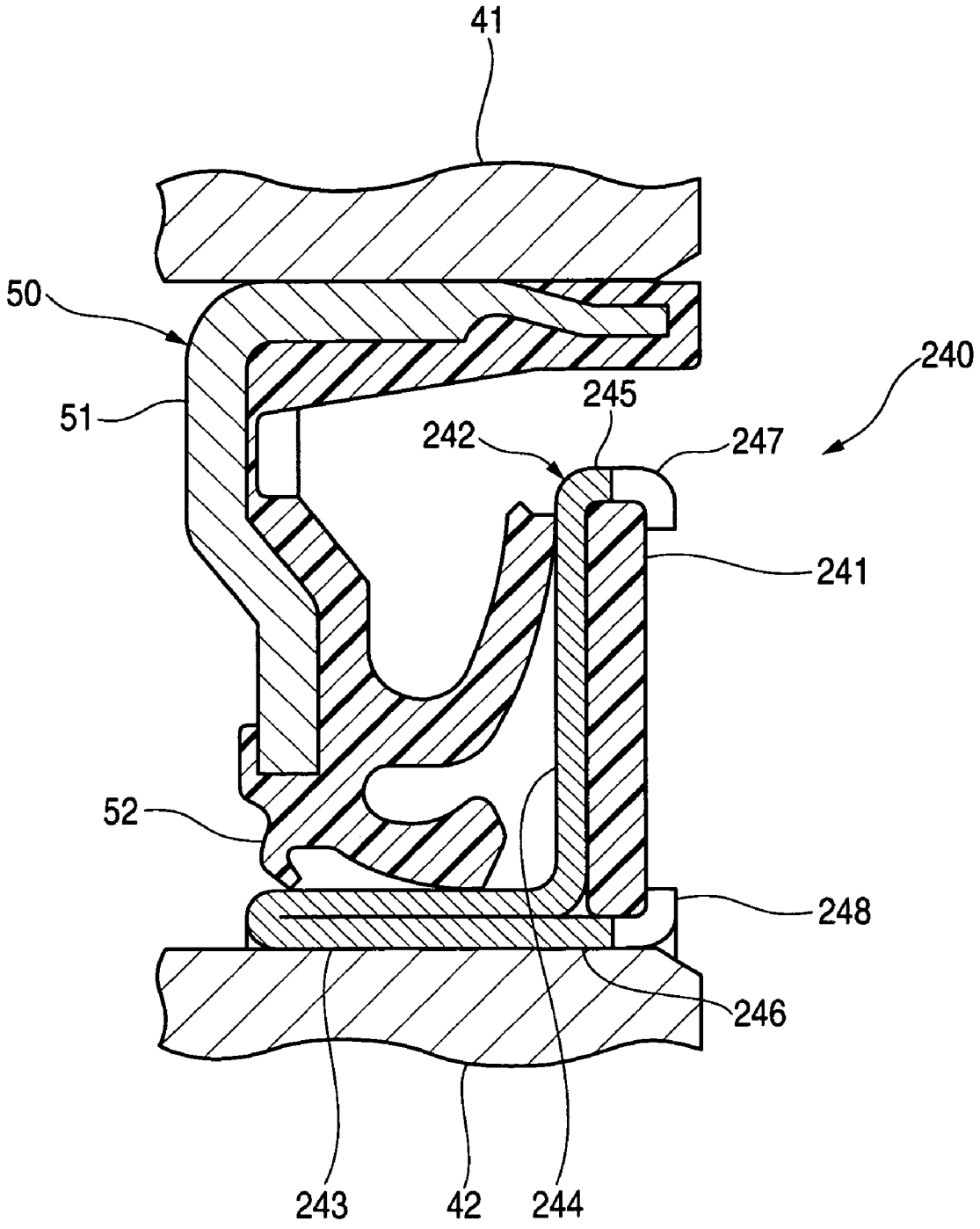
FIG. 25 is a sectional view enlarging a portion of FIG. 24 surrounded by a dotted line circle XXV.

As shown by FIG. 24 and FIG. 25, the rolling bearing unit 230 including the magnetic encoder according to the seventh embodiment of the invention includes the outer ring 41 constituting the fixed ring, the inner ring 42 constituting the rotating ring, a ball row 43 constituting a plurality of roiling members arranged at a gap in a circular ring shape partitioned by the outer ring 41 and the inner ring 42 at equal intervals in the circumferential direction and rollably held by the retainers 44, the hermetically sealing apparatus 45 arranged at the opening end portion of the gap in the circular ring shape, and the magnetic encoder 240 for detecting the rotational number of the inner ring 12. The hermetically sealing apparatus 45 is constituted by a slinger 242, and the sealing member 50 arranged on the inner side of the bearing of the slinger 242 and including the core metal 51 and the elastic member 52, the opening end portion of the gap in the circular ring shape is closed by bringing the seal member into sliding contact with the slinger 242, a foreign matter of dust or the like is prevented from invading inside of the bearing and a lubricant filled at inside of the bearing is prevented from being leaked to outside of the bearing.

Figure 26:
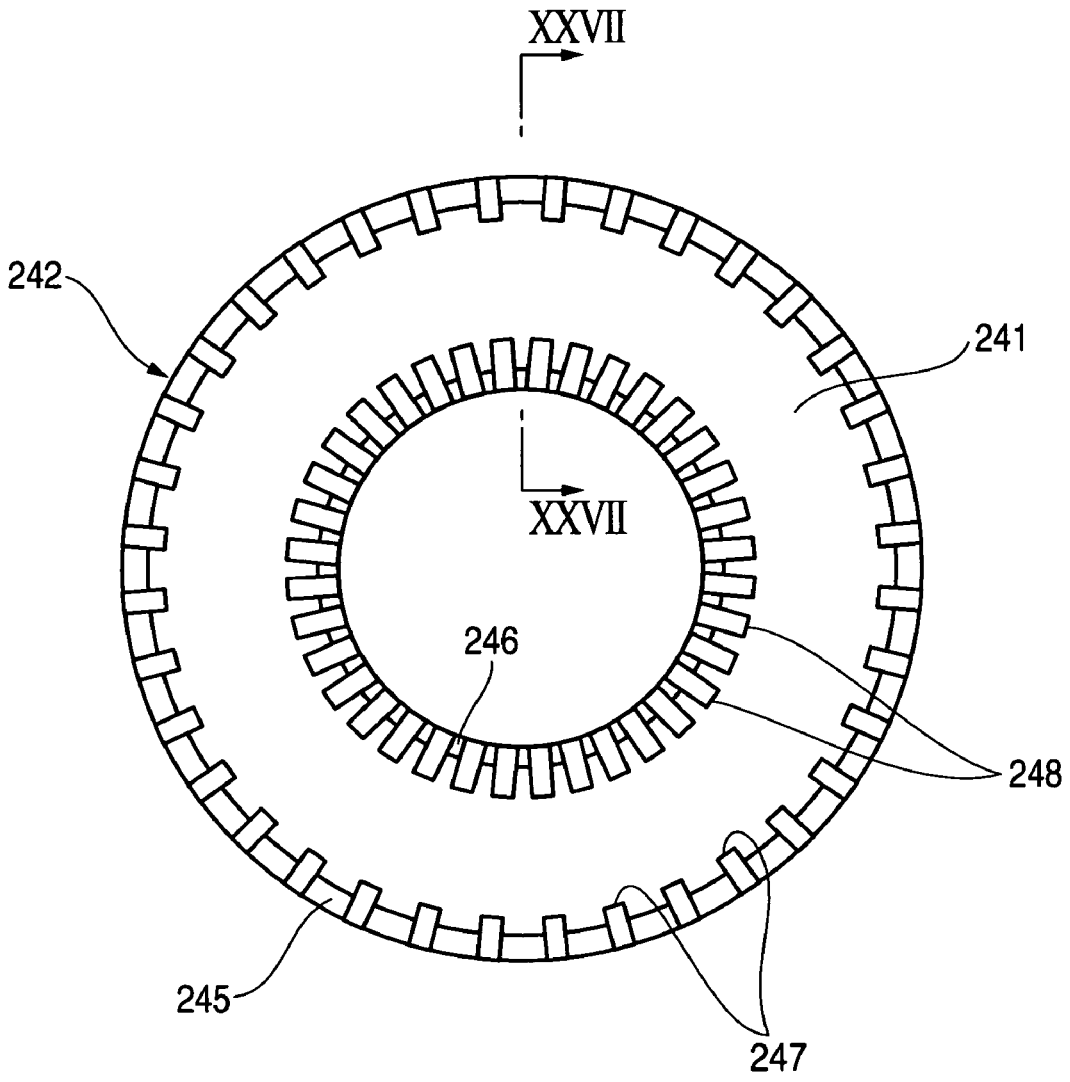
FIG. 26 is a plane view of the magnetic encoder shown in FIG. 24.
Figure 27:
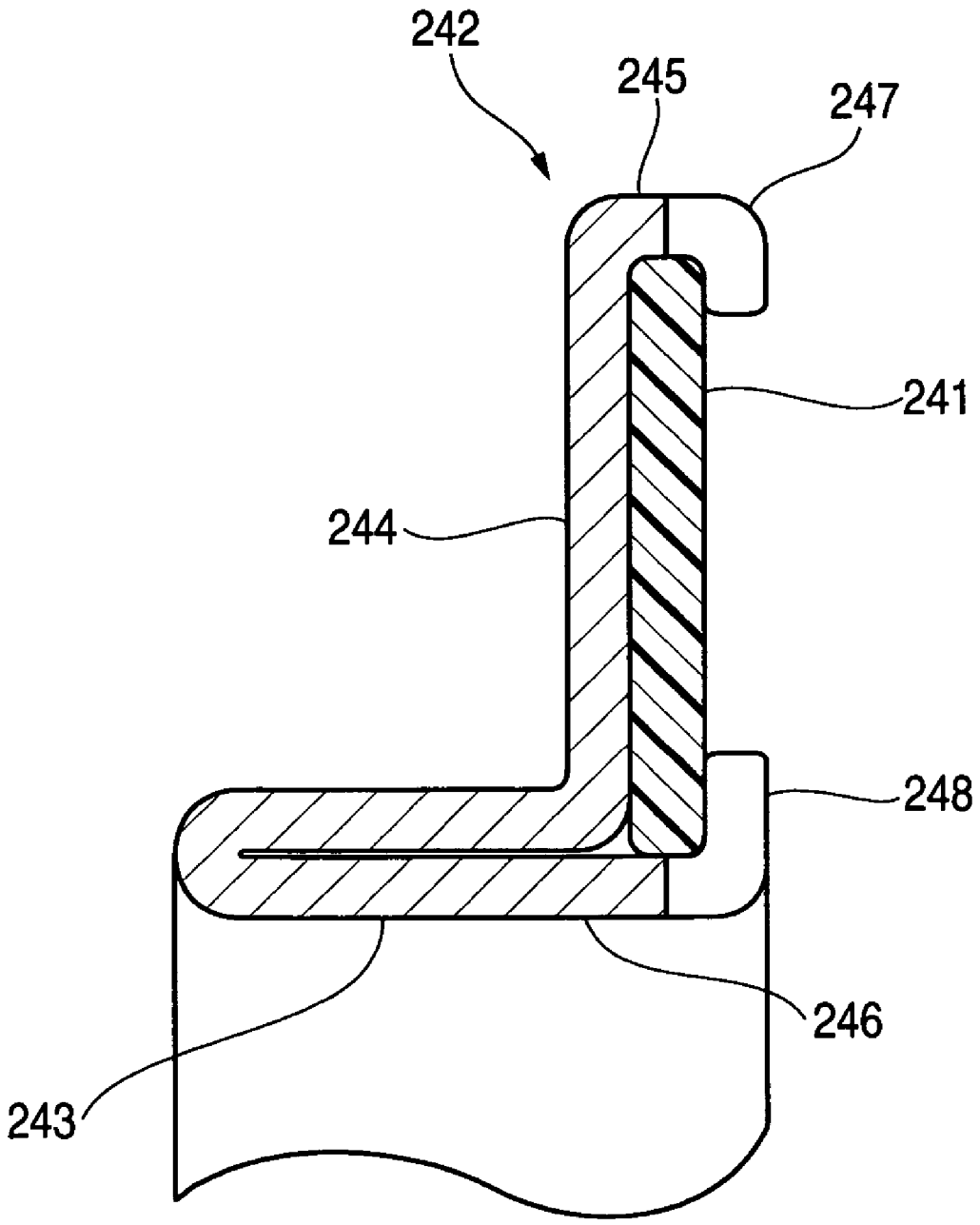
FIG. 27 is a sectional view in an arrow mark XXVII-XXVII direction of FIG. 26.
Figure 28:
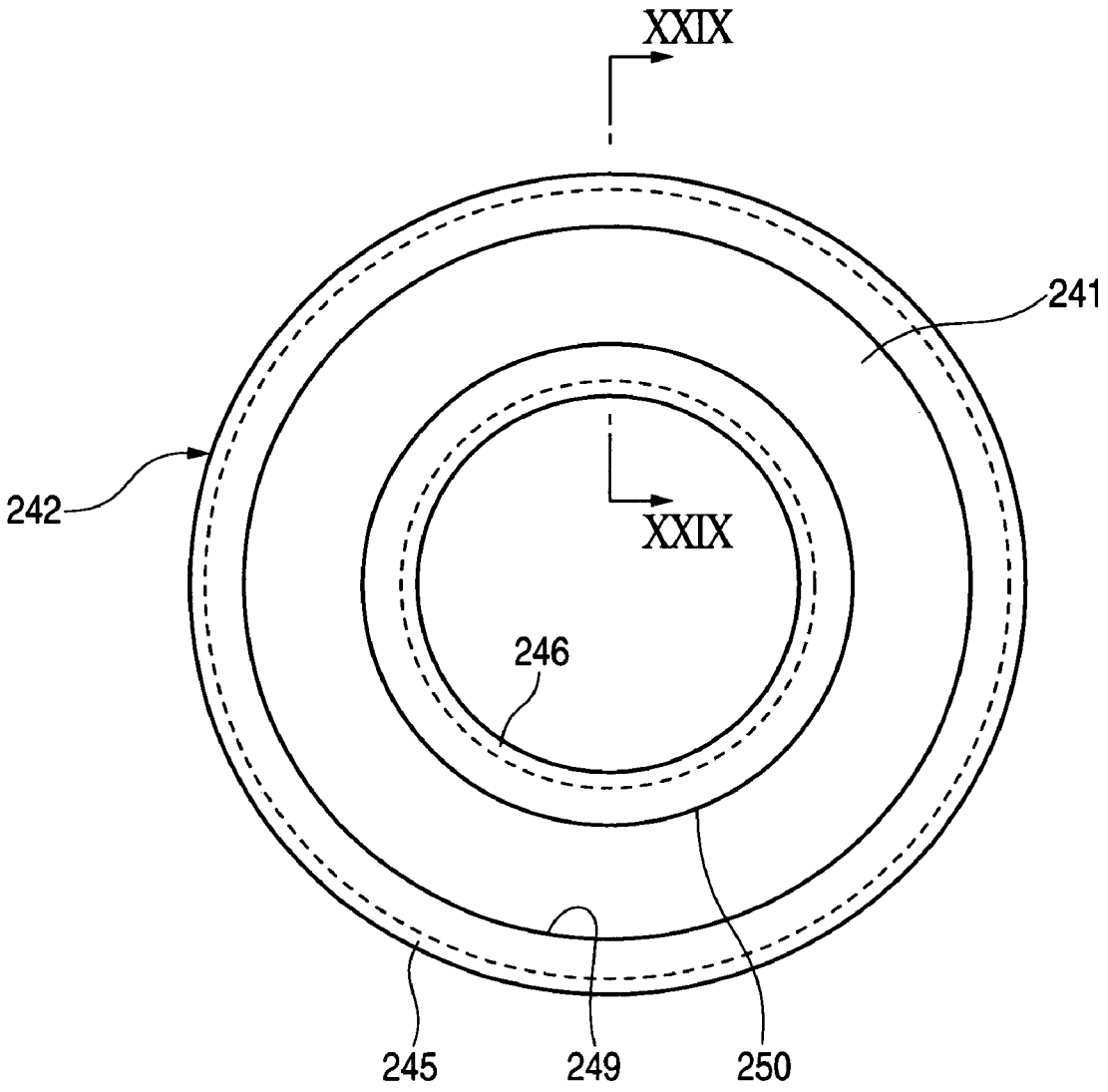
FIG. 28 is a plane view of a magnetic encoder of a first modified example of the seventh embodiment.

Further in reference to FIG. 26 through FIG. 28, the magnetic encoder 240 is constituted by including the magnet portion 241 and the slinger 242 constituting the fixed member. The magnet portion 241 is constituted by subjecting the magnet material including the magnetic powder and the thermoplastic resin as the binder of the magnetic powder and pertinently including the magnetic powder by a range of 86 through 92 weight % into injection molding in a cylindrical shape, and magnetized with N poles and S poles alternately (that is, in multipoles) in a circumferential direction. In injection molding of the magnet portion 241, a magnetic field is applied in a thickness direction (axial direction) and the magnetic powder in the magnet portion 241 is oriented in the axial direction. Therefore, the magnet portion 241 is provided with axial anisotropy and includes a pair of magnetic pole faces at both end faces in the axial direction.

The slinger 242 is constituted by forming the magnet material in a circular ring shape having a section in an L-like shape as a whole, and is constituted by a flange portion 244 in a flange-like shape developed in a radius direction from a side of the inner ring 42 to a side of the outer ring 41 at a gap in the circular ring shape, a cylindrical portion extended in the axial direction by being bent substantially by right angle from a peripheral edge portion on an inner diameter side of the flange portion 244, and a fitting portion 243 in a cylindrical shape extended in the axial direction by being bent substantially by 180 degrees from the end portion of the cylindrical portion to a side of the inner ring 42. Further, a peripheral edge portion on an outer diameter side of the flange portion 244 is provided with an outer frame 245 in a cylindrical shape extended in the axial direction by being bent substantially by right angle in a direction reverse to that of the cylindrical portion, further, an end portion of the outer frame 245 is provided with a plurality of notches at equal intervals in a circumferential direction, and a plurality of locking claws 247 are formed to be projected in the axial direction. Further, an end portion (hereinafter, referred to as inner frame) 246 of the fitting portion 243 opposed to the outer frame 245 in a radius direction are provided with a plurality of notches at equal intervals in a circumferential direction, and a plurality of locking claws 248 are formed to be projected in the axial direction. An inner diameter of the outer frame 245 is constituted by a diameter substantially equal to an outer diameter of the magnet portion 241 and an outer diameter of the inner frame 246 is constituted by a diameter substantially equal to an inner diameter of the magnet portion 241.

The magnet portion 241 is fitted to a recessed portion in a cylindrical shape partitioned by the flange portion 244, the outer frame 245 and the inner frame 246, and is tackedly supported in a state of bringing one magnetic pole face of the pair of magnetic pole faces into close contact with the flange portion 244 (that is, support portion). Further, the locking claw 247 of the outer frame 245 and the locking claw 248 of the inner frame 246 are folded to bend to be respectively engaged with peripheral edge portions of other magnetic pole face of the pair of magnetic pole faces, and fastened. Thereby, the magnet portion 241 is pinched by the flange portion 244 and the locking claws 247, 248 of the slinger 242 and the magnet portion 241 and the slinger 242 are mechanically bonded.

The slinger 242 integrated with the magnet portion 241 is fixed to an outer peripheral face of the inner ring 42 at the opening end portion of the gap in the ring-like shape to expose the magnetic pole face of the magnet portion 241 engaged with the locking claws 247, 248 to an outer side of the bearing, and is rotated along with the inner ring 42. Therefore, during a time period of rotating the inner ring 42 by one rotation, a magnetic flux density at one point of a vicinity of the magnet portion 241 is periodically changed by including a number of peaks in correspondence with a number of poles of the magnet portion 241. Further, a change in the magnetic flux density is detected by the sensor 47 arranged to be opposed to the magnetic pole face of the magnet portion 241 to thereby detect a rotational number of the inner ring 42.

According to the rolling bearing 240, the magnet portion 241 is fastened to be pinched by the flange portion 244 and the locking claws 247, 248 of the slinger 242 to be mechanically bonded to the slinger 242 and therefore, the magnet portion 241 can easily and firmly be prevented from being detached and reliability of the encoder 240 can be promoted. Further, by also using adherence between the magnet portion 241 and the flange portion 244, a degree of adhering the magnetic pole face of the magnet portion 241 and the flange portion 244 may be promoted and a strength of holding by the slinger 242 may be promoted. By constituting the fixed member of the magnet portion 241 by the slinger 242 constituting the hermetically sealing apparatus, a fixed member for rotating the magnet portion 241 along with the inner ring 42 is not separately needed, further, by forming the slinger 242 by the magnet material, the magnetic property of the magnet portion 241 can be prevented from being deteriorated, and the rotational number (rotational speed) of the inner ring 42 can highly accurately be detected.

Figure 29:
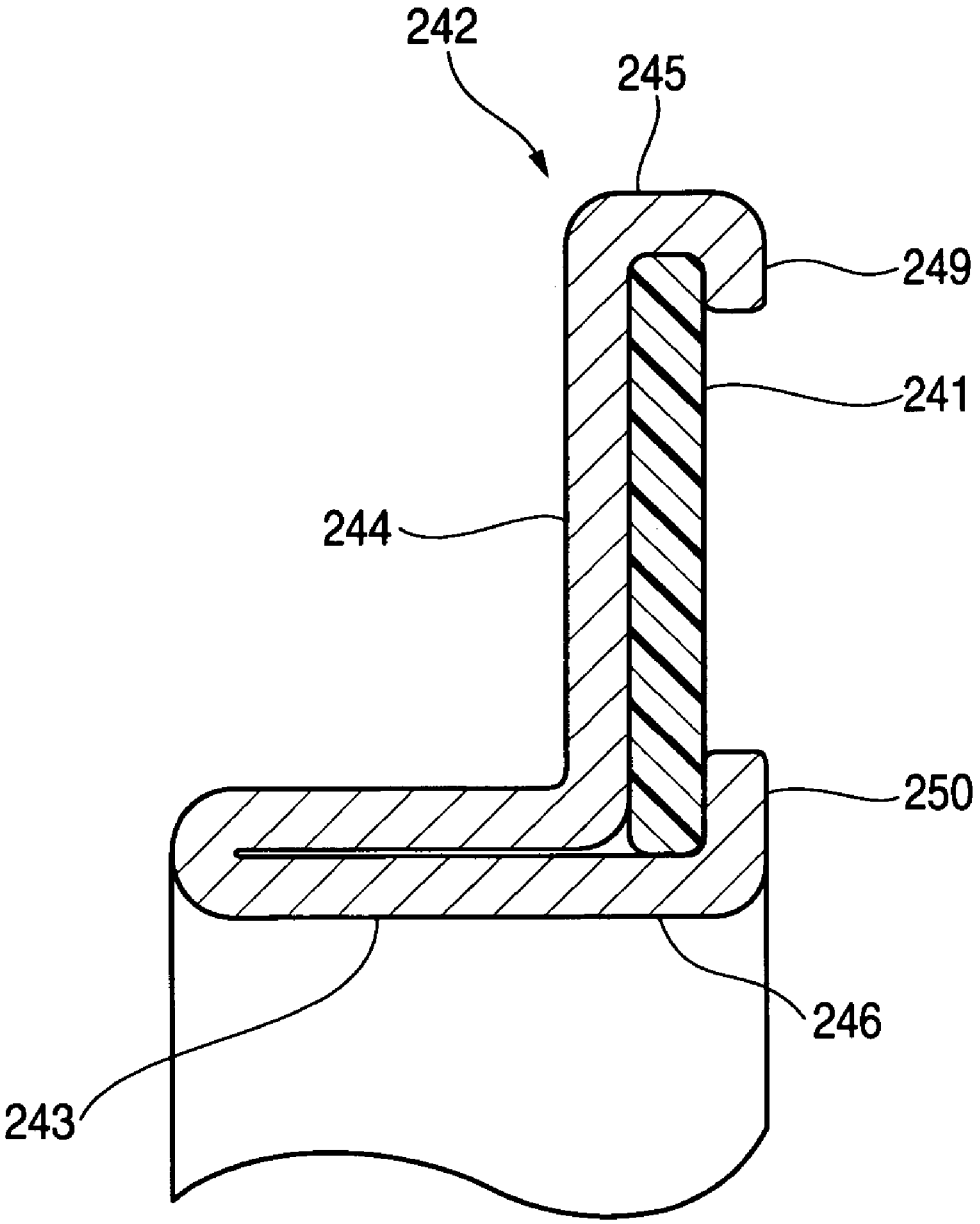
FIG. 29 is a sectional view in an arrow mark XXIX-XXIX direction of FIG. 28.

Further, although according to the above-described rolling bearing 240, there is constructed a constitution of forming the pluralities of the locking claws 247, 248 at the outer frame 245 and the inner frame 246 in the cylindrical shape by respectively providing the notches at equal intervals in respective circumferential directions and folding to bend the locking claws 247, 248 to fasten, the embodiment is not limited thereto. For example, as a first modified example of the seventh embodiment, as shown by FIG. 28 and FIG. 29, there may be constructed a constitution in which the outer frame 245 and the inner frame 246 are constituted by a simple cylindrical shape without providing notches and projected ends thereof are plastically deformed by a method of fastening by rocking or the like to be folded to a side of the permanent magnet over entire peripheries thereof. In this case, locking portions 249, 250 formed at the projected ends of the outer frame 245 and the inner frame 246 are engaged with the peripheral edge portions of the magnetic pole face of the magnet portion 241 over entire peripheries thereof and fastened to pinch the magnet portion 241 in cooperation with the flange portion 244 and therefore, the magnet portion 241 and the slinger 242 can mechanically be bonded further solidly.

Figure 30:
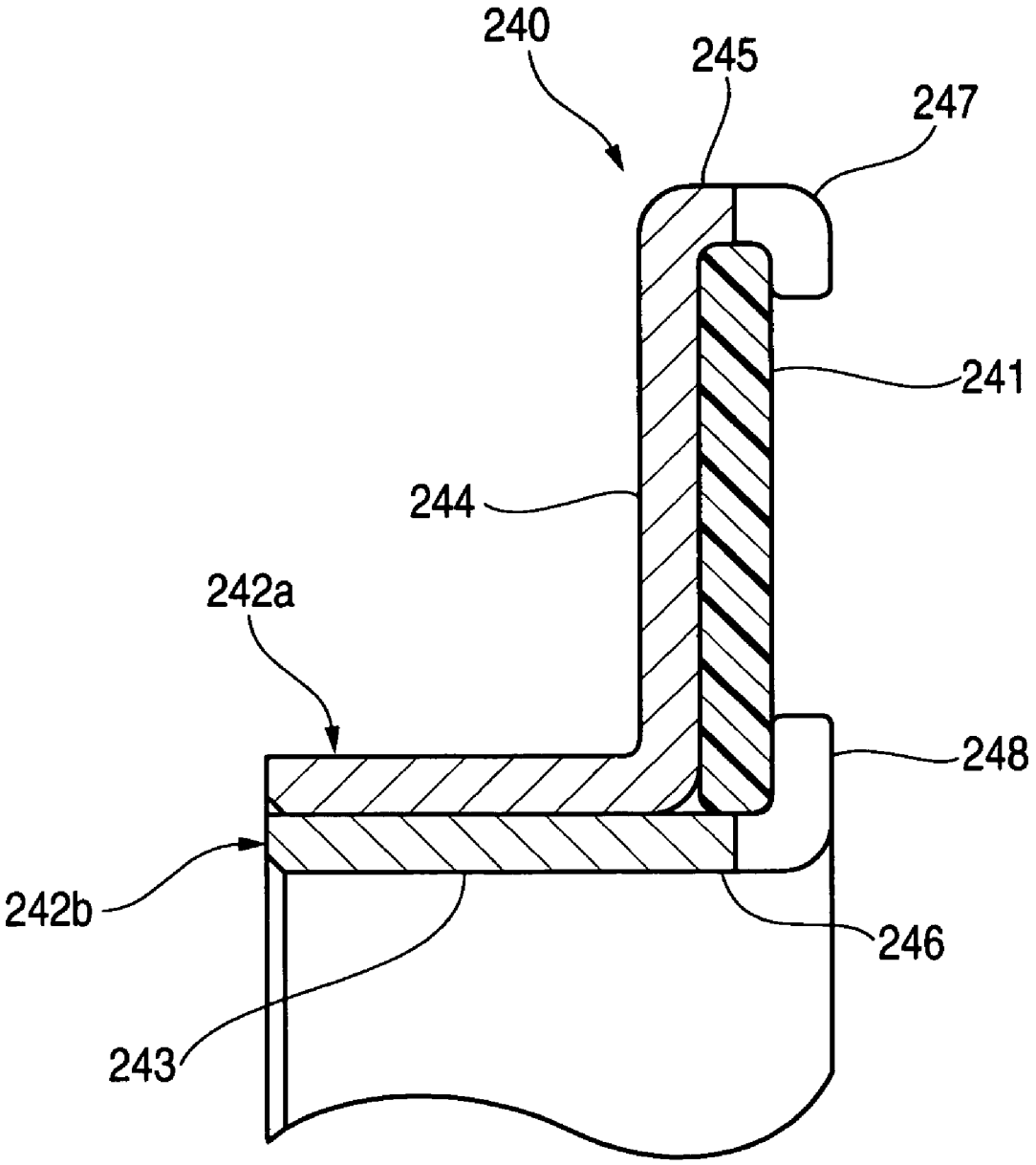
FIG. 30 is a sectional view of a magnetic encoder of a second modified example of the seventh embodiment.

Further, also according to the above-described rolling bearing 240, the slinger 242 constituting the fixed member is constituted as a single piece member, at a second modified example of a seventh embodiment, as shown by FIG. 30, the slinger 242 may be constituted by separate members of the first slinger member 242a including the flange portion 244, the outer frame 245, the locking claw 247 and the cylindrical portion, and the second slinger member 242b including the fitting portion 243, the inner frame 246 and the locking claw 248. Thereby, a perpendicularity relative to axes of the flange portion 244 and the magnet portion 241 can easily be ensured by eliminating a bent portion of the slinger 242 at which the fitting portion 243 and the cylindrical portion are continuous. Therefore, molderability of the fixed member can be promoted and a rotational number (rotational speed) of the inner ring 42 can highly accurately be detected.

Figure 31:
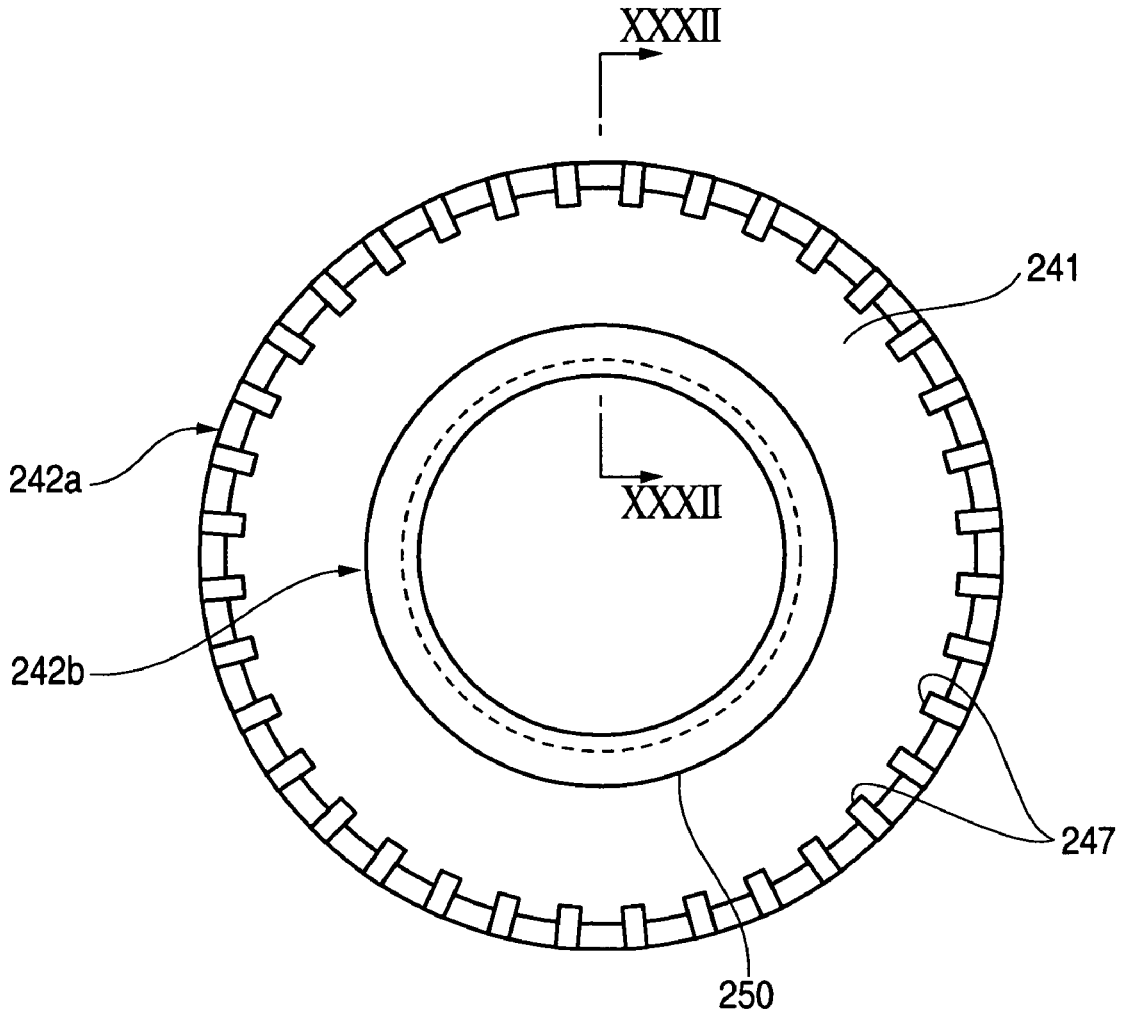
FIG. 31 is a sectional view of a magnetic encoder of a third modified example of the seventh embodiment.
Figure 32:
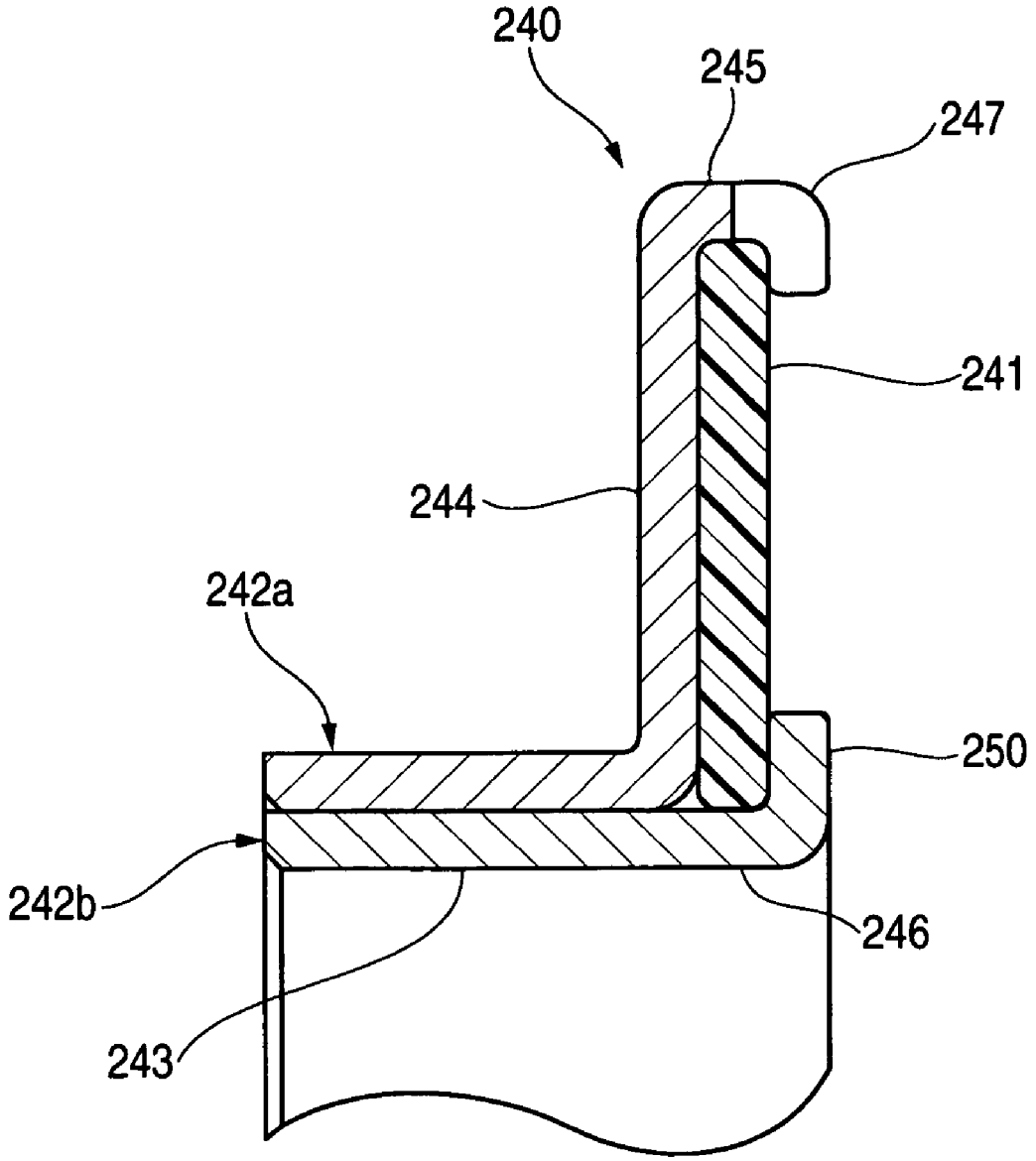
FIG. 32 is a sectional view in an arrow mark XXXII-XXXII direction of FIG. 31.

Further, as a third modified example of the seventh embodiment, as shown by FIG. 31 and FIG. 32, as a substitute for the locking claw 248 of the second slinger member 242b, there may be formed a locking portion 250 in a flange-like shape developed to an outer side in a radius direction by previously folding to bend a projected end of the inner frame 246 substantially by right angle. In this case, first, the magnet portion 241 is fitted to the outer frame 245 in a state of bringing one magnetic pole face thereof into close contact with the flange portion 244 of the first slinger member 242a. Further, the locking claw 247 of the outer frame 245 is folded to bend to be engaged with the peripheral edge portion on the outer diameter side of other magnetic pole face of the magnet portion 241 to be fastened. Thereafter, the second slinger member 242b is press-fitted thereto, and the locking portion 250 of the inner frame 246 is engaged with the peripheral edge portion on the inner diameter side of other magnetic pole face of the magnet portion 241. Therefore, the locking claw 247 and the locking portion 250 are fastened to pinch the magnet portion 241 in cooperation with the flange portion 244, and the magnet portion 241 and the slinger 242 are mechanically bonded. Thereby, the locking claw 248 is formed and therefore, it is not necessary to provide a plurality of notches at the inner frame 246 and molderability of the second slinger member 242b can be promoted.

Figure 33:
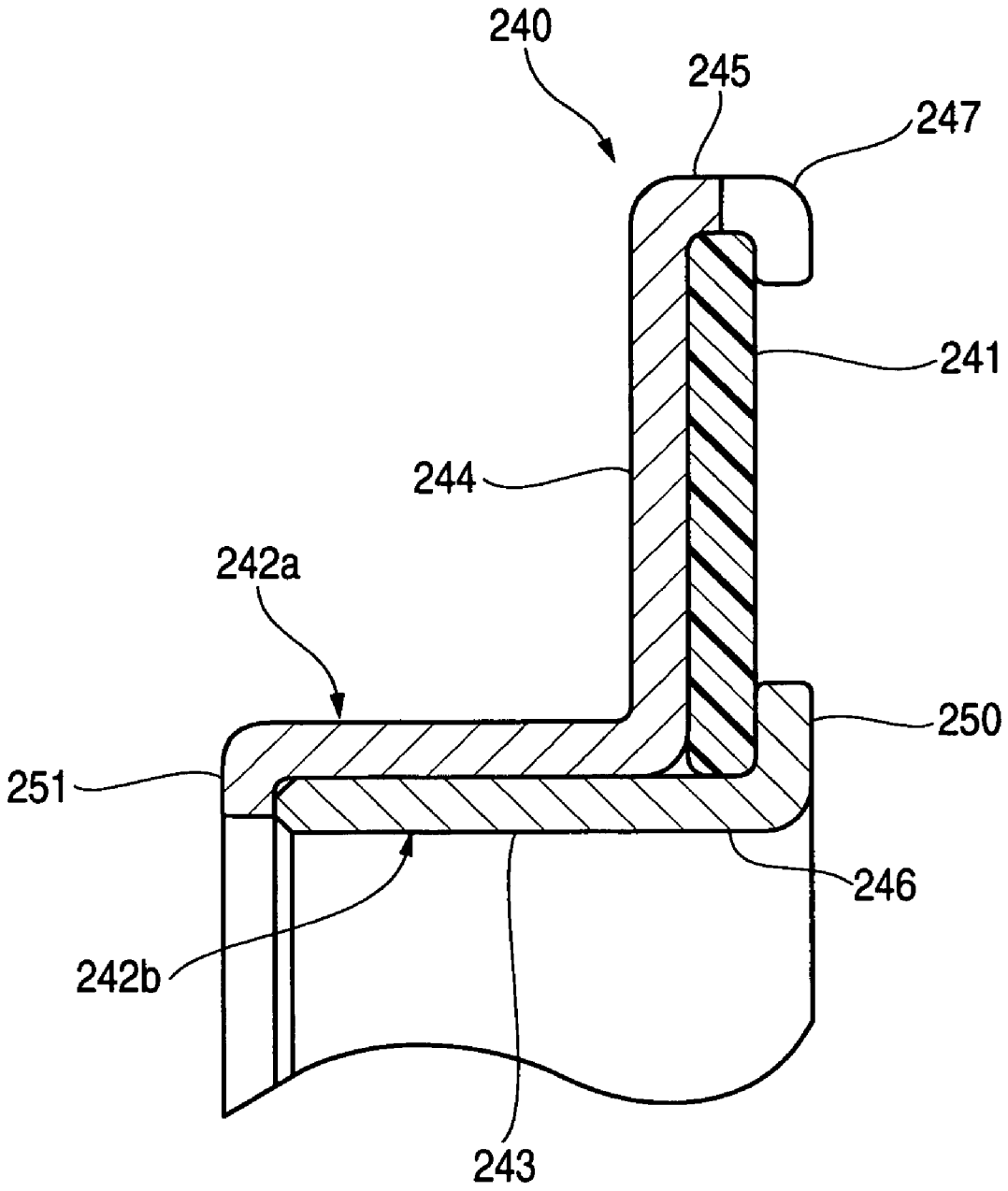
FIG. 33 is a sectional view of a magnetic encoder of a fourth modified example of the seventh embodiment.

Further, as a fourth modified example of the seventh embodiment, as shown by FIG. 33, there may be formed a stopper portion 251 in a flange-like shape developed to an inner side in a radius direction by being folded to bend substantially by right angle from an end portion in the axial direction of the cylindrical portion of the first slinger member 242a. In this case, a length in the axial direction of the fitting portion 243 of the second slinger member 242b is set such that a projected end of the fitting portion 243 of the second slinger member 242b is brought into contact with the stopper portion 251 when the locking portion 250 is engaged with the peripheral edge portion on the inner diameter side of the magnetic pole face of the magnet portion 241. Thereby, the magnet portion 241 can be prevented from being destructed by preventing the second slinger member 242b from being press-fitted thereto excessively.

Figure 34:
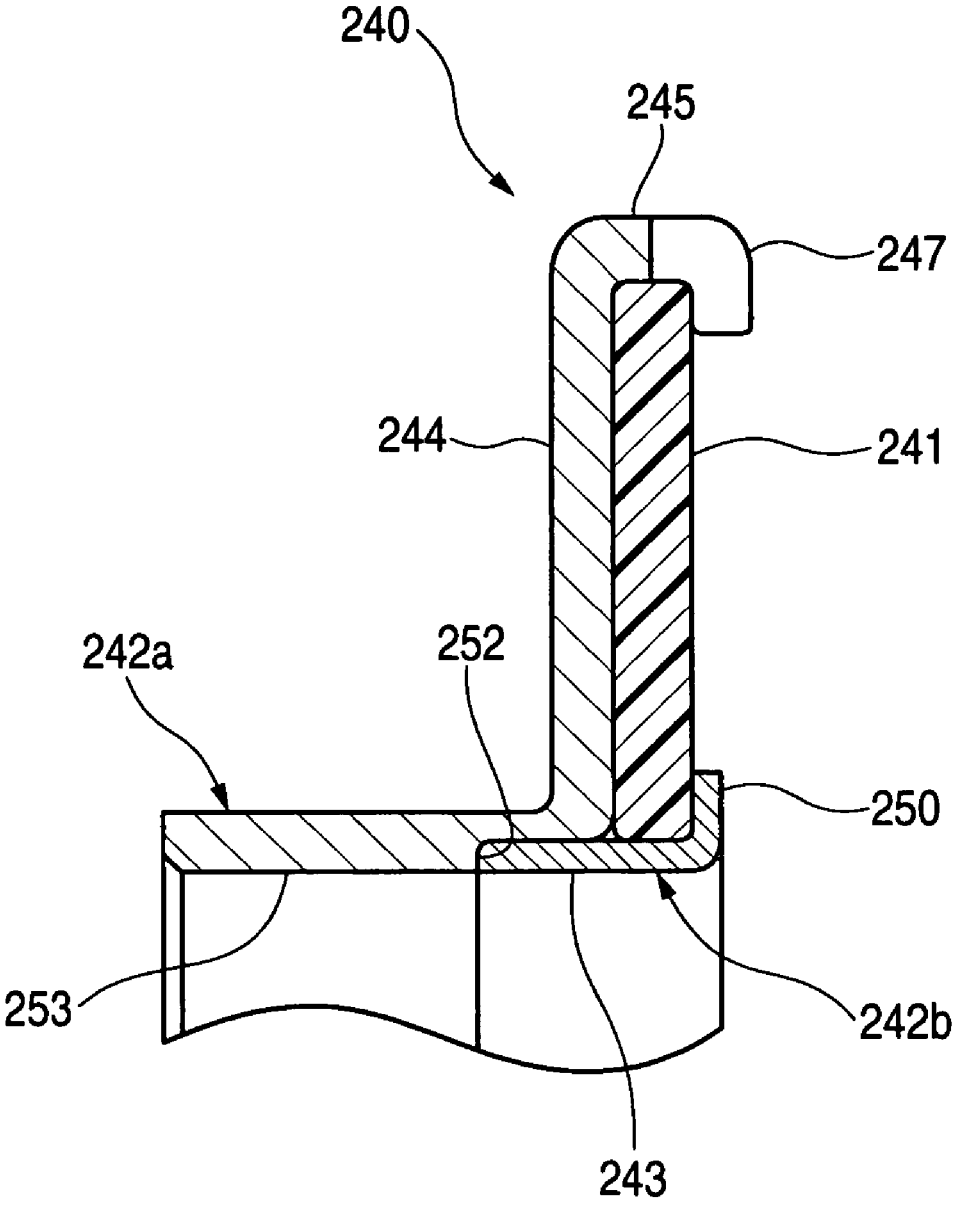
FIG. 34 is a sectional view of a magnetic encoder of a fifth modified example of the seventh embodiment.

Further, as a fifth modified example of the seventh embodiment, as shown by FIG. 34, there may be constructed a constitution in which at the cylindrical portion of the first slinger member 242a, an end portion in the axial direction continuous to the flange portion 244 is formed by a thin wall by machining or the like, a stepped portion 252 in a cylindrical shape is provided at an inner peripheral face thereof, further, the fitting portion 243 of the second slinger member 242b is constituted by an outer diameter substantially equal to an outer diameter of the stepped portion 252 and by a wall thickness substantially equal to a width in a radius direction of the stepped portion 251. In this case, a length in the axial direction of the fitting portion 243 of the second flange portion 242b is set such that when the second slinger member 242b is press-fitted and the locking portion 250 is engaged with the peripheral edge portion on the inner diameter side of the magnetic pole face of the magnet portion 241, a projected end of the fitting portion 243 is brought into contact with the stepped portion 252. Thereby, the magnet portion 241 can be prevented from being destructed by preventing the second slinger member 242b from being press-fitted thereto excessively, and when a space of attaching the encoder 240 (in other words, the inner diameter of the outer ring 241 and the outer diameter of the inner ring 42) is restricted, a width (area) in a radius direction of the magnet portion 241 can be enlarged.

Figure 35:
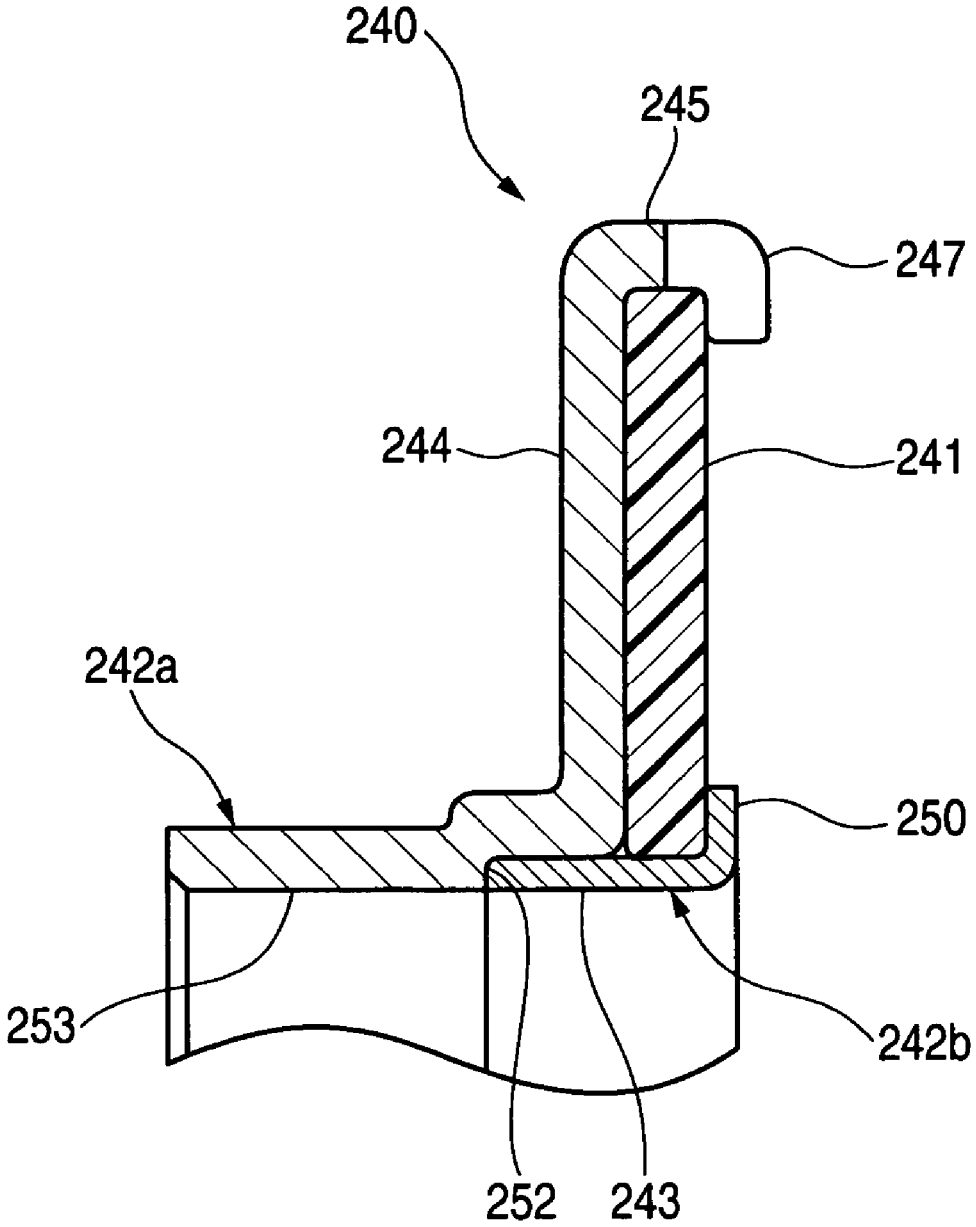
FIG. 35 is a sectional view of a magnetic encoder of a sixth modified example of the seventh embodiment.

Further, at the cylindrical portion of the first slinger member 242a, instead of constituting one end portion thereof in the axial direction connected to the flange portion 244 as described above by a thin wall by machining or the like, as a sixth modified example of the seventh embodiment, as shown by FIG. 35, the stepped portion 252 may be formed by forming the first slinger member 242a to provide a stepped portion by deep drawing or the like such that the end portion in the axial direction connected to the flange portion 244 is constituted by a large diameter.

Figure 36:
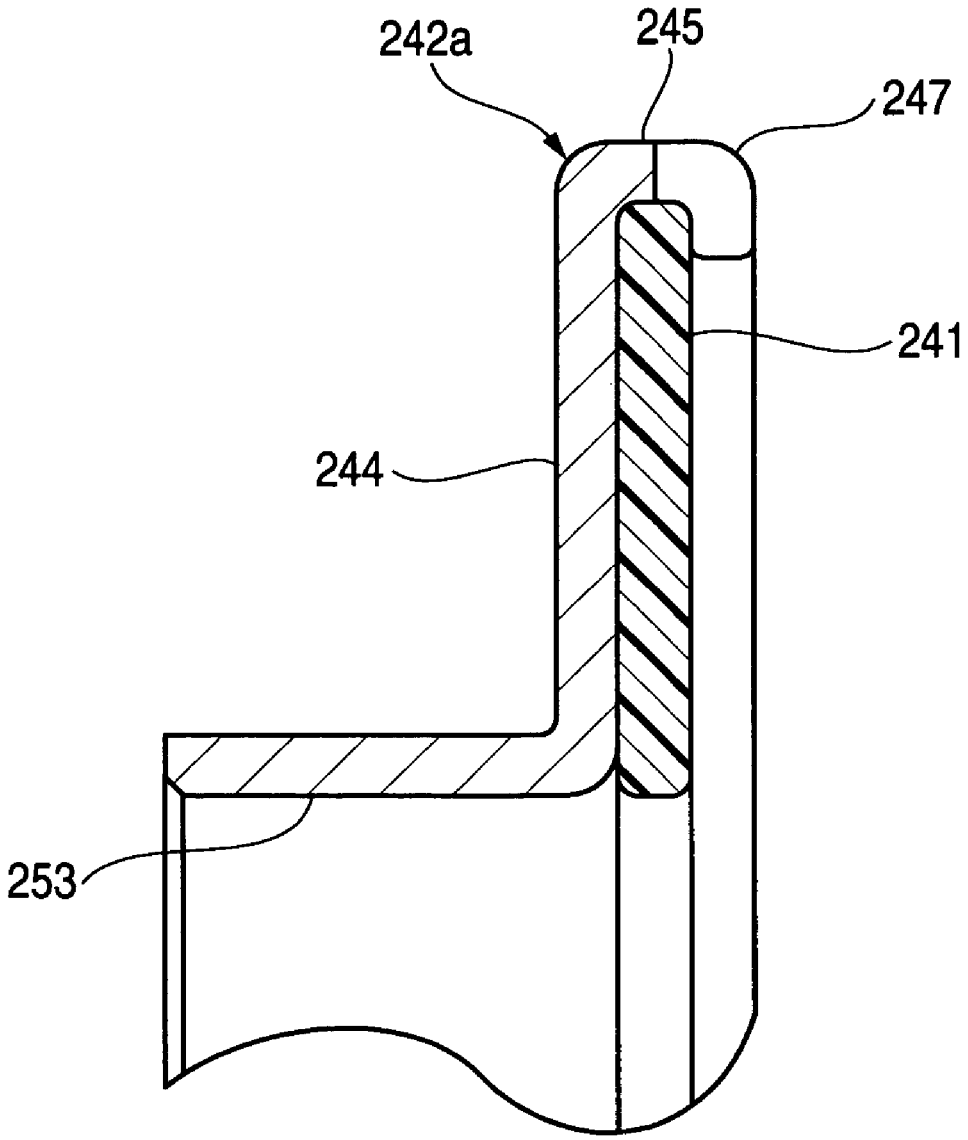
FIG. 36 is a sectional view of a magnetic encoder of a seventh modified example of the seventh embodiment.
Figure 37:
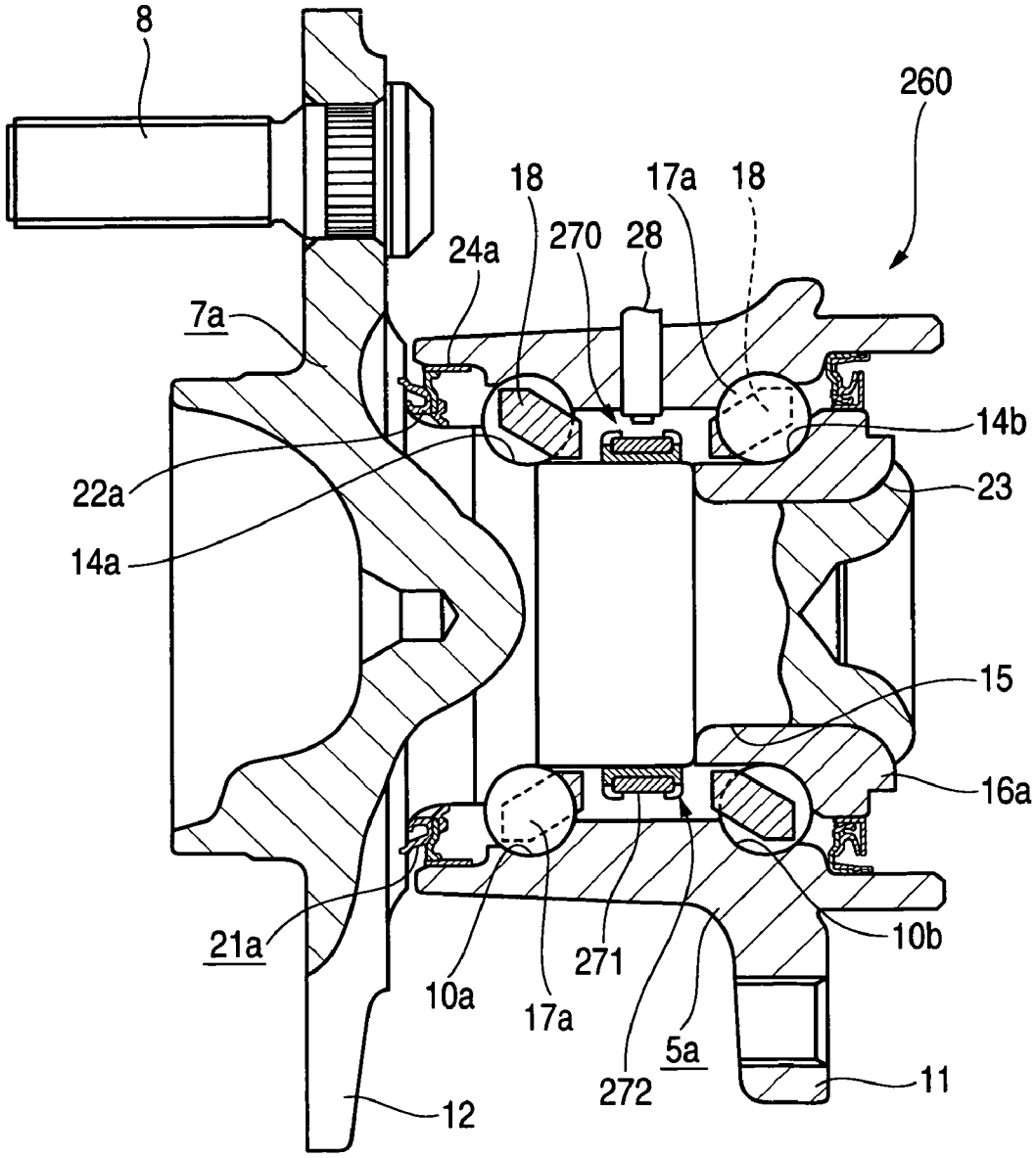
FIG. 37 is a sectional view of a hub unit bearing including an encoder constituting an eighth embodiment according to the invention.
Figure 38:
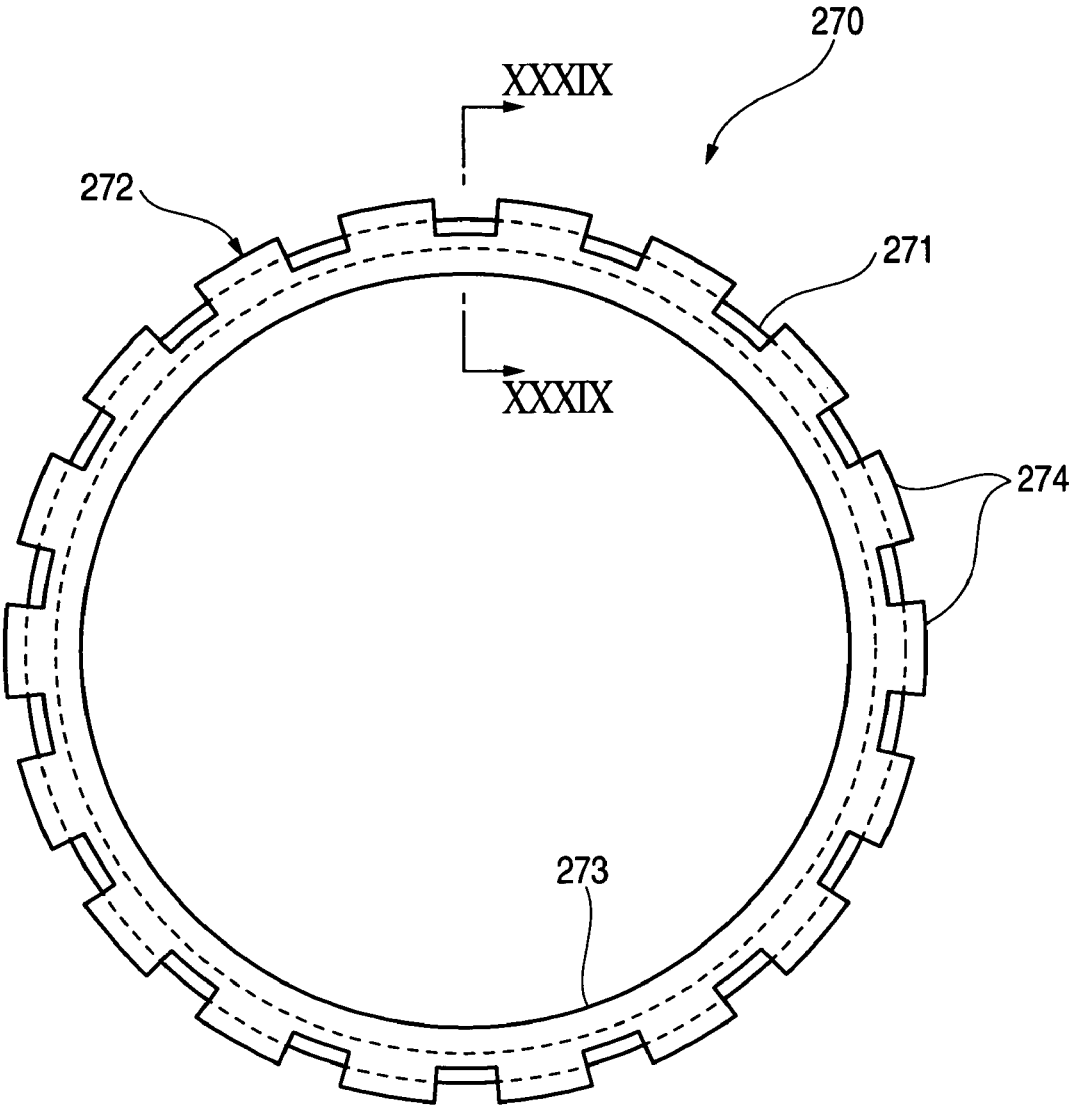
FIG. 38 is a plane view of the encoder of FIG. 37.
Figure 39:
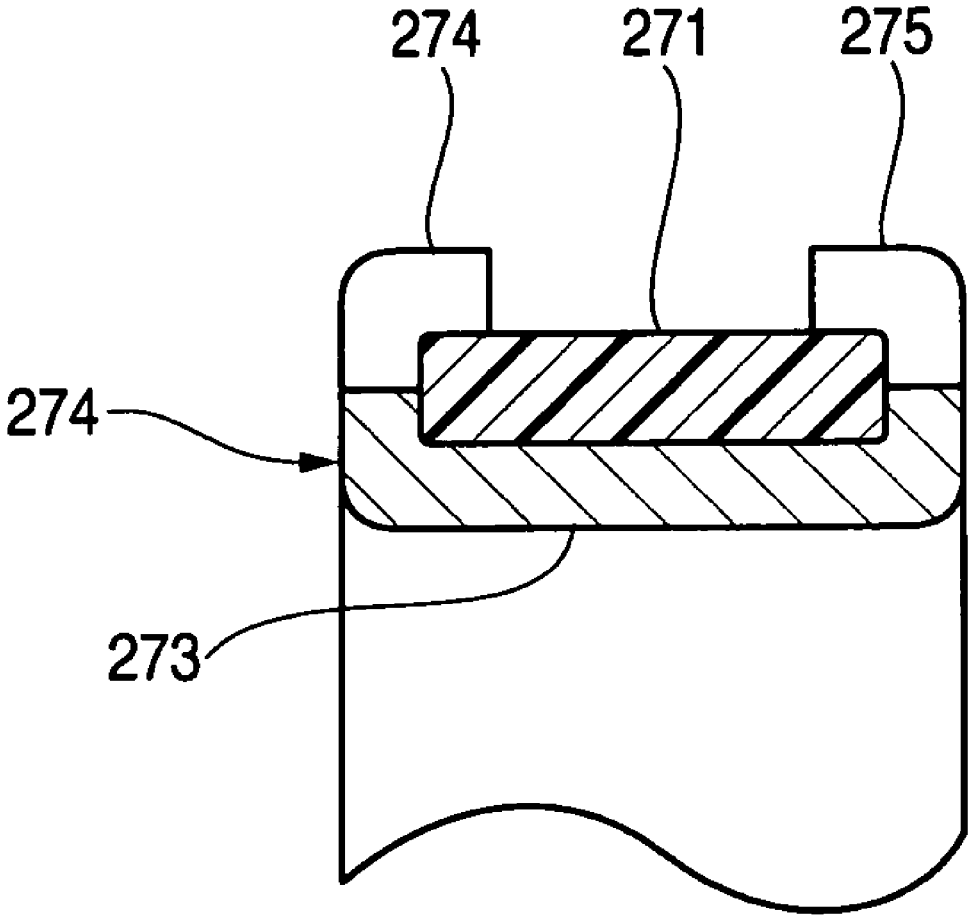
FIG. 39 is a sectional view in an arrow mark XXXIX-XXXIX direction of FIG. 38.

Further, as a seventh modified example of the seventh embodiment, as shown by FIG. 36, the magnet portion 241 may be held only by the first slinger member 242a. That is, the magnet portion 241 is held by being pinched by the flange portion 244 of the first slinger member 242a and the locking claw 247. Thereby, the fixed member is constituted by a single piece thereof, the locking claw may be fastened only to the peripheral edge portion on the outer diameter side of the magnet portion 241 and therefore, the magnet portion 241 and the fixed member are easily integrated, when the space of attaching the encoder 240 is restricted, the width (area) in the radius direction of the magnet portion 241 can further be enlarged. Preferably, one magnetic pole face of the magnet portion 241 and the flange portion 244 are bonded by using an adhering agent or the like.

According to the above-described embodiment, the magnetic encoder 240 is constituted by constituting the fixed member of the magnet portion 241 by the slinger 242 and therefore, a number of parts of the rolling bearing can be reduced by sharing the slinger 242 by the hermetically closing apparatus 45 and the magnetic encoder 240.

Further, the magnetic encoder 240 according to the embodiment can also be used by being integrated to the hub unit bearing as shown by FIG. 1. Further, the compositions of the magnet portion 241 and the slinger 242 constituting the magnetic encoder 240 of the embodiment may be constituted by those of the above-described embodiments, and since a bonding method thereof differs from that of the above-described embodiments and therefore, the compositions may pertinently be changed in accordance therewith.

EIGHTH EMBODIMENT

Next, a detailed explanation will be given of a hub unit bearing constituting a bearing for a wheel including a magnetic encoder according to an eighth embodiment of the invention in reference to FIG. 37 through FIG. 40. Further, portions equivalent to those of the hub unit bearing according to the first embodiment are attached with the same notations and an explanation thereof will be omitted or simplified.

A hub unit 260 rotatably supports a wheel (not illustrated) fixed to the attaching flange 12 of the hub 7a. The inner peripheral face of the outer ring 5a is formed with two rows of outer ring tracks 10a, 10b in parallel with each other, further, the outer peripheral faces of the hub 7a and the inner ring member 16a constituting the rotating member are formed with inner ring tracks 14a, 14b respectively opposed to the outer ring tracks 10a, 10b. A gap between the outer ring track 10a and the inner ring track 14a, and a gap between the outer ring track 10b and the inner ring track 14b are respectively rollably arranged with a plurality of the ball rows 17a, 17a held at equal intervals in the circumferential direction by the retainers 18, 18. A magnetic encoder 270 is arranged at the outer peripheral face of the hub 7a between the ball rows 17a, 17a.

Figure 40:
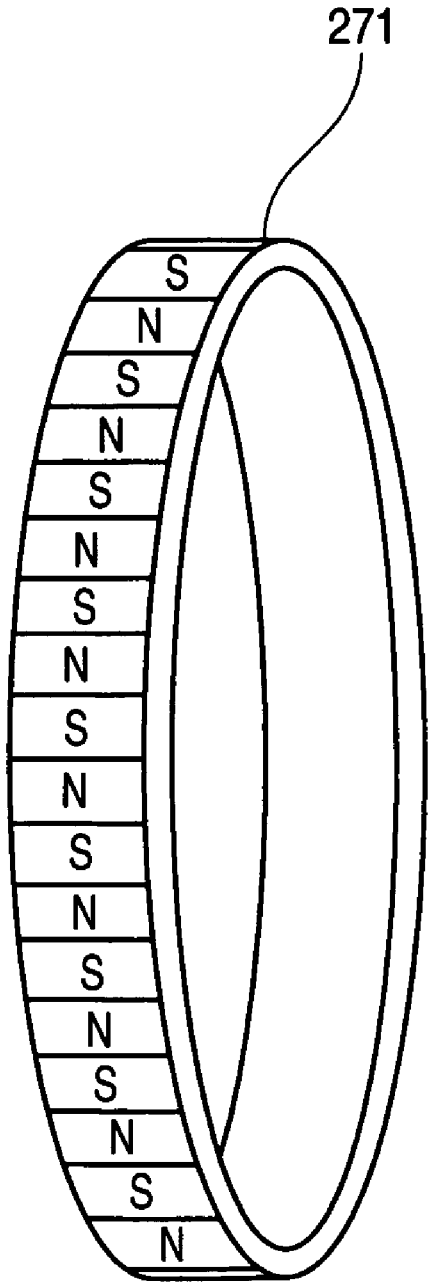
FIG. 40 is a perspective view of a magnet portion of the magnetic encoder of FIG. 37 and is a schematic view showing a magnetizing pattern of a permanent magnet.

The magnetic encoder 270 is constituted by a magnet portion 271 and a fixed member 272, the magnet portion 271 is constituted by subjecting the magnet material including the magnetic powder and the thermoplastic resin as the binder of the magnetic powder and pertinently including the magnetic powder in the range of 86 through 92 weight % to injection molding in the cylindrical shape, and magnetized with N poles and S poles alternately (that is, in multipoles) in the circumferential direction as shown by FIG. 40. In injection molding of the magnet portion 271, a magnetic field is applied from a center thereof in a radius direction, and the magnetic powder in the magnet portion 271 is oriented in the radius direction. Therefore, the magnet portion 271 is constituted by radial anisotropy and includes a pair of magnetic pole faces at an inner peripheral face and an outer peripheral face thereof.

The fixed member 272 is constituted by forming the magnetic metal material in the cylindrical shape, a center portion thereof in the axial direction includes a fitting portion 273 fitted to the outer peripheral face of the hub 7a at an inner peripheral face thereof, and fitted to an inner peripheral face of the magnet portion 271 at an outer peripheral face thereof. Further, end portions on both sides in the axial direction of the fixed member 272 are provided with pluralities of notches at equal intervals in respective circumferential directions, and the pluralities of locking claws 274, 275 are formed to project in the axial direction.

The magnet portion 271 is inserted from one end portion in the axial direction of the fixed member 272 and is tackedly supported by the fixed member 272 in a state of bringing a magnetic pole face on an inner diameter side into close contact with an outer peripheral face of the fitting portion 273. Further, the locking claws 274, 275 are folded to bend to be respectively engaged with the peripheral edge portions of the magnetic pole face on the outer diameter side of the magnet portion 271 and are fastened further. Thereby, the magnet portion 271 is pinched by the fitting portion 273 and the locking claws 274, 275 of the fixed member 272, and the magnet portion 271 and the fixed member 272 are mechanically bonded.

The fixed member 272 integrated with the magnet portion 271 is rotated along with the hub 7a by fitting the fitting portion 273 to the outer peripheral face of the hub 7a. Therefore, during a time period of rotating the hub 7a by one rotation, a magnetic flux density at one point at a vicinity of the magnet portion 271 is periodically changed by including a number of peaks in correspondence with a number of poles of the magnet portion 271. Further, the rotational number of the hub 7a (or wheel) is detected by detecting a change in the magnetic flux density by the sensor 28 arranged to be opposed to the magnetic pole face on the outer peripheral side of the magnet portion 271 in a radius direction.

Figure 41:
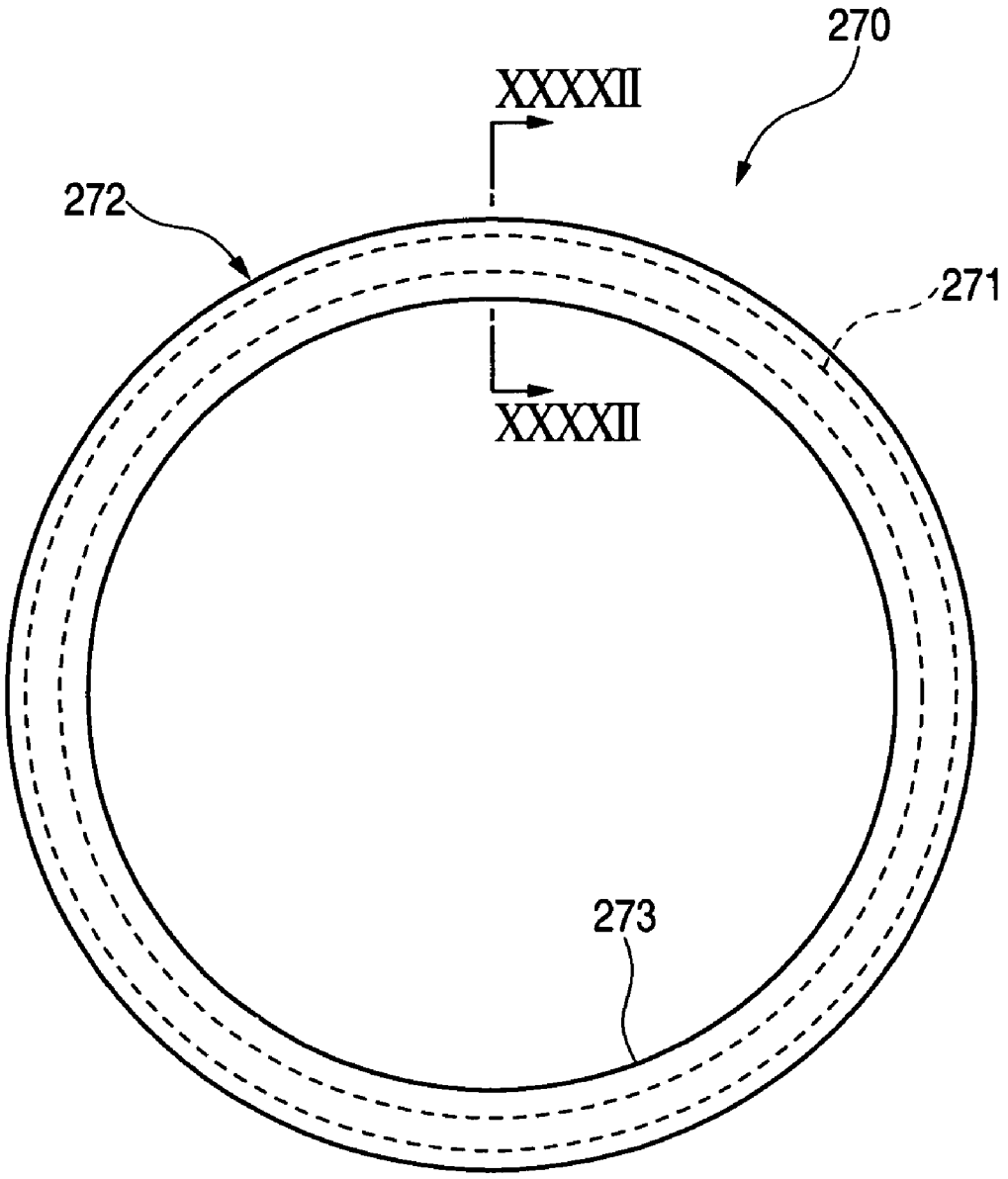
FIG. 41 is a plane view of a magnetic encoder constituting a modified example of the eighth embodiment.
Figure 42:
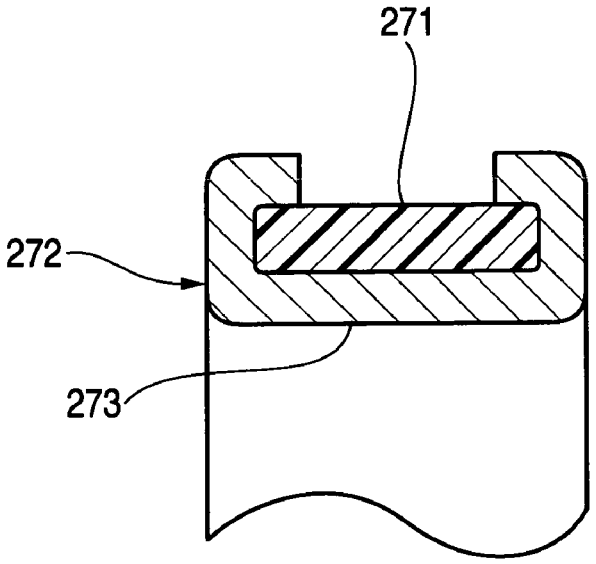
FIG. 42 is a sectional view in an arrow mark XXXXII-XXXXII direction of FIG. 41.

Further, although in the above-described hub unit bearing 260, there is constructed a constitution of respectively forming the pluralities of locking claws 274, 275 by providing notches at equal intervals in the circumferential direction at end portions on both sides in the axial direction of the fixed member 272 and folding to bend the locking claws 274, 275 to be fastened, the embodiment is not limited thereto. For example, there may be constructed a constitution in which one end portion in the axial direction of the fixed member 272 is formed in a circular ring shape having a section substantially in a U-like shape by previously bending the one end portion by 180 degrees to an outer side in the radius direction, the one end portion in the axial direction of the magnet portion 271 is fitted to a recessed portion in the circular ring shape to be tackedly supported thereby, thereafter, the locking claw formed on other end portion in the axial direction of the fixed member 272 may be folded to bend. Thereby, the magnet portion 271 which is tackedly supported can easily be positioned. Further, in this case, a notch may not be provided to one end portion in the axial direction formed in the circular ring shape having the section substantially in the U-like shape of the fixed member 272, further, as a modified example of the eighth embodiment, as shown by FIG. 41 and FIG. 42, also other end portion in the axial direction is not provided with a notch, a projected end thereof is gradually deformed plastically by a method of fastening by rocking or the like, and may be folded to a side of a permanent magnet over an entire periphery thereof. In this case, end portions on both sides in the axial direction of the fixed member 272 are engaged with peripheral edge portions of a magnetic pole face on an outer diameter side of the magnet portion 271 over an entire periphery thereof, and fastened to pinch the magnet portion 271 in cooperation with the fitting portion 273 and therefore, the magnet portion 271 and the fixed member 272 can mechanically bonded further solidly.

Further, a composition of the magnetic encoder 270 according to the embodiment is similar to that of the seventh embodiment.

Further, the invention is not limited to the above-described embodiment but can pertinently be modified or improved.

Although according to the embodiment, the magnetic encoder is used by attaching the magnet portion to the fixed member of the slinger or the like, the invention is applicable also to a constitution in which the magnet portion is directly attached to a rotating member.

Although according to the embodiment, an explanation has been given of the hub unit bearing, the rolling bearing unit, the main shaft apparatus integrated with the magnetic encoder, the magnetic encoders of the respective embodiments are applicable also to any of the hub unit bearing, the rolling bearing unit and the main shaft apparatus. Further, the magnetic encoder of the invention can also be used by combining the magnetic encoders of the respective embodiments.

EXAMPLES

Although the invention will be explained further by showing examples as follows, the invention is not restricted at all thereby. First, an explanation will be given of a constitution of a rolling bearing of Examples 1 through 4 fabricated based on the invention. A magnetic encoder of the rolling bearing used in Examples 1 through 4 is constituted by subjecting a magnet material to insert molding in a state of holding a slinger in dies, provided with axial anisotropy by orienting the magnet material by a magnet field in a state of applying the magnetic field in an axial direction, thereafter, magnetized with N poles and S poles alternately in multipoles to a total of 96 poles.

Example 1

In Example 1, the encoder is a PA (polyamide) 12 based axially anisotropic plastic magnet including 75 volume % of strontium ferrite and a maximum energy product thereof is 2.3 MGOe. Further, the slinger is formed by SUS430 and high frequency welding of the encoder and the slinger is not carried out. Further, a rubber material of a seal lip portion is constituted by NBR (acrylonitrile butadiene rubber) including carbon black, clay or the like.

Example 2

In Example 2, the encoder is PPS based axially anisotropic bond magnet including 75 [weight] *volume* % of SmFeN (samarium-iron-nitrogen) and a maximum energy product thereof is 7.2 MGOe. Further, the slinger is formed by SUS430 and high frequency welding of the encoder and the slinger is not carried out. Further, the rubber material of the sealing portion is constituted by FKM (fluororubber) including carbon black, diatomite or the like.

Example 3

In Example 3, the encoder is a PA 12 based axially anisotropic bond magnet including 75 [weight] *volume* % of NdFeB (neodymium-iron-boron), and a maximum energy product thereof is 11.9 MGOe. Further, the slinger is formed by SUS430 and high frequency welding of the encoder and the slinger is not carried out. Further, the rubber material of the sealing portion is constituted by NBR including carbon black, clay or the like.

Example 4

In Example 4, an encoder is a PA 12 based axially anisotropic plastic magnet including 75 volume % of strontium ferrite and a maximum energy product thereof is 2.3 MGOe. Further, the slinger is formed by SUS430 and high frequency welding of the encoder and the slinger is carried out. Further, in high frequency welding, a silane coupling agent is constituted by γ-glycidoxypropyltrimethoxy silane, the slinger is dipped in methanol solution including 10 weight % of the silane coupling agent, insert molding of the encoder is carried out after having being dried, thereafter, welding is carried out by high frequency heating by being heated at 200° C. for 30 seconds. Further, the rubber material of the sealing portion is constituted by NBR including carbon black, clay or the like. Table 1 shows constitutions of Examples 1 through 4 mentioned above.

TABLE 1

| | Example 1 | Example 2 | Example 3 | Example 4 |
|---|---|---|---|---|
| magnet portion | PA 12 based axially anisotropic plastic | PPS based axial anisotropic bond | PA 12 based axial anisotropic bond | PA 12 based axially |

TABLE 1-continued

| | Example 1 | Example 2 | Example 3 | Example 4 |
|---|---|---|---|---|
| | magnet (BHmax: 2.3 MGOe) including 75 volume % of strontium ferrite 96 (48 × 2) poles | magnet (BHmax: 7.2 MGOe) including 75 volume % of SmFeN 96 (48 × 2) poles | magnet (BHmax: 11.9 GOe) including 75 volume % of Nd—Fe—B 96 (48 × 2) poles | anisotropic plastic magnet (BHmax: 2.3 MGOe) including 75 volume % of strontium ferrite 96 (48 × 2) poles |
| slinger | SUS430 | SUS430 | SUS430 | SUS430 |
| high frequency welding | none | none | none | present |
| seal lip portion rubber material | NBR including carbon black, clay etc | FKM including carbon black, diatomite etc | NBR including carbon black, clay etc | NBR including carbon black, clay etc |

According to the magnetic encoders of the rolling bearing according to Examples 1 through 4, when an air gap equivalent to that of the background art is constituted, a number of poles of the magnetic encoder can be increased and accuracy of detecting the rotational number of the wheel can be promoted. Further, when the magnetic encoder is constituted by the number of poles the same as that of that of the background art, the air gap can be enlarged and a degree of freedom in arranging the sensor can be promoted. Further, depending on a content of the magnetic powder, the magnetic flux density can be made to be equal to or larger than 26 mT, when an interval (air gap) between the magnetic encoder and the sensor is constituted by 1 mm similar to that of the background art, the magnetic encoder can be magnetized by multipoles equal to or larger than 120 poles. At this occasion, the single pitch error can be made to be equal to or smaller than ±2%.

Next, a difference of an adhering force based on a difference of a bonding method and an adhering agent is evaluated by the following method.

Example 5

A phenolic resin based adhering agent (metalock N-15 made by Toyo Kagaku Kenkyusho) is coated on SUS430 plate member (width 40 mm, length 100 mm, thickness 1 mm) a surface of which is roughened by sand paper, dried by wind at room temperature for about 30 minutes, thereafter, a heating treatment is carried out at 120° C. for 30 minutes. The SUS430 plate member baked with the adhering agent is set to dies, and insert molding of a plastic magnet material (strontium ferrite including 12 nylon based anisotropic plastic magnet compound FEROTOP TP-A27N (content of strontium ferrite, 75 volume % made by Toda Kogyo)) is carried out by constituting a core thereby. Incidentally, a size of the molded plastic magnet is 20 mm in width, 30 mm in length, 3 mm in thickness, an area of a portion molded on SUS430 plate member by injection molding, that is, an area of bonding the plastic magnet and SUS430 plate is 200 $mm^2$ (20 mm×10 mm). Thereafter, the bonded member is subjected to a heating (secondary curing) treatment at 130° C. for 2 hours to provide a test piece of Example 5.

Example 6

A test piece of Example 6 is provided by a method similar to that of (Example 5) except that the phenolic resin based adhering agent used is metalock N-23 made by Toyo Kagaku Kenkyusho.

Example 7

A phenolic resin based adhering agent (metalock N-15 made by Toyo Kagaku Kenkyusho) is coated on SUS430 plate member (width 40 mm, length 100 mm, thickness 1 mm) a surface of which is roughened by sand paper, dried by wind at room temperature for about 30 minutes, thereafter, subjected to a heating treatment at 120° C. for 30 minutes. A test piece (width 20 mm, length 30 mm, thickness 3 mm) of aplastic magnet (strontium ferrite including 12 nylon based anisotropic plastic magnet compound FEROTOP TP-A27N (content of strontium ferrite, 75 volume %) made by Toda Kogyo)) is fixed to SUS430 plate member by a fixing jig or the like baked with the adhering agent to constitute a bonding area to be 200 $mm^2$, thereafter, the test piece is subjected to a heating treatment at 130° C. for 2 hours to provide a test piece of Example 7.

Example 8

A test piece of Example 8 is provided by a method similar to that of (Example 7) except that the phenolic resin based adhering agent used is metalock N-23 made by Toyo Kagaku Kenkyusho.

Example 9

A one solution type epoxy resin based adhering agent (LOCTITE Hysol 9432NA made by Henckel Japan) is coated on SUS430 plate member (width 40 mm, length 100 mm, thickness 1 mm) a surface of which is roughened by sandpaper, a test piece (width 20 mm, length 30 mm, thickness 3 mm) of a plastic magnet (strontium ferrite including 12 nylon based anisotropic plastic magnet compound EROTOP TP-A27N (content of strontium ferrite, 75 volume %) made by Toda Kogyo) is fixed onto the SUS430 plate member by a fixing jig or the like to constitute a bonding area to be 200 $mm^2$, thereafter, the test piece is subjected to a heating treatment at 120° C. for 1 hour to completely cure the adherin member to provide a test piece of Example 9.

Example 10

A test piece of Example 10 is provided by a method similar to that of (Example 9) except that the adhering agent used is a two solution type epoxy resin based adhering agent (LOCTITE E-20 HP made by Henckel Japan) and the heating treatment is not needed.

With regard to 6 kinds of adhering test pieces of Examples 5 through 10, a tensile test is carried out for respective 2 pieces thereof by a pulling speed of 5 mm/min and shear adhering strengths (average values) of respective adhering agents are evaluated. An experimental result is shown in Table as follows.

TABLE 2

| | Example 5 | Example 6 | Example 7 | Example 8 | Example 9 | Example 10 |
|---|---|---|---|---|---|---|
| composition of plastic magnet | nylon 12 + strontium ferrite magnetic powder (FEROTOP TP-A27N made by Toda Kogyo) | nylon 12 + strontium ferrite magnetic powder (FEROTOP TP-A27N made by Toda Kogyo) | nylon 12 + strontium ferrite magnetic powder (FEROTOP TP-A27N made by Toda Kogyo) | nylon 12 + strontium ferrite magnetic powder (FEROTOP TP-A27N made by Toda Kogyo) | nylon 12 + strontium ferrite magnetic powder (FEROTOP TP-A27N made by Toda Kogyo) | nylon 12 + strontium ferrite magnetic powder (FEROTOP TP-A27N made by Toda Kogyo) |
| route of adhering agent | phenolic resin based adhering agent (metalock N-15 made by Toyo kagaku Kenkyusho) | phenolic resin based adhering agent (metalock N-23 made by Toyo Kagaku Kenkyusho) | phenolic resin based adhering agent (metalock N-15 made by Toyo Kagaku Kenkyusho) | phenolic resin based adhering agent (metalock N-15 made by Toyo Kagaku Kenkyusho) | one solution type epoxy resin based adhering agent (LOCTITE Hysol 9432NA made by Henckel Japan) | Two solution type epoxy resin based adhering agent (LOCTITE ∈-20HP made by Henckel Japan) |
| bonding method | bonding + adhering by injection molding | bonding + adhering by injection molding | adhering | adhering | adhering | adhering |
| adhering shear strength | 12.6 MPa or higher (adhering portion is not exfoliated, magnet material is broken precedingly) | 13.1 MPa or higher (adhering portion is not exfoliated, magnet material is broken precedingly) | 0.3 MPa | 0.3 MPa | 4.6 KPa | 3.2 MPa |

It is known from Table 2 that in Example 5 and Example 6 in which the bonding face of the plastic magnet test piece and the SUS430 material plate is molded to be adhered, in comparison with Example 7 and Example 8 in which the adhering force is going to be ensured by operation of only secondary curing of a phenolic resin based adhering agent, or Example 9 and Example 10 in which a test piece and the SUS material plate are simply adhered by using one solution type epoxy and two solution type epoxy adhering agents, a higher adhering strength is ensured.

Next, in the magnetic encoder fabricated by insert molding by constituting the core by the slinger according to the invention, a test is carried out with regard to an adhering state by a difference in a surface treatment.

Example 11

Recesses and projections are formed by chemically etching an iron oxalate film formed on a surface of SUS430. An arithmetic mean height Ra of recesses and projections becomes 0.9 μm and a maximum height Rz thereof becomes 4.5 μm. Further, a phenolic resin based adhering agent (metalock N-15) made by Toyo Kagaku Kenkyusho) including 30% of a solid component whose major component is constituted by a resol type phenolic resin is further diluted by three times by methylethylketone and is coated on a surface of the slinger by a dipping treatment. The test piece is dried at room temperature for 30 minutes and left in a dehydrator at 120° C. for 30 minutes to thereby bring about a semicured state. SUS430 plate member baked with the adhering agent is set to dies, and insert molding of a plastic magnet material (strontium ferrite including 12 nylon based anisotropic plastic magnetic compound [FEROTOP TP-A27N] (content of strontium ferrite, 91 weight %) made by Toda Kogyo) is carried out from an inner peripheral portion by the disk gate by constituting a core thereby. After molding the gate is immediately cut, and a test piece in which the adhering agent is completely cured by secondary heating at 130° C. for 1 hour is made to constitute a SUS piece of Example 11.

Example 12

A test piece of Example 12 is provided by a method similar to that of (Example 11) except that the surface of SUS430 is formed by recesses and projections by shot blast, an arithmetic mean height Ra of recesses and projections is made to be 0.8 μm a maximum height Rz thereof is made to be 5.0 μm.

Table 3 as follows shows a result of pulling a catch portion of an outer peripheral portion of the encoder after having been cured by pliers.

TABLE 3

| | Example 11 | Example 12 |
|---|---|---|
| recesses and projections treatment | chemical etching by iron oxalate | shot blast |
| adhering state | By pulling by pliers, catch portion is exfoliated to be broken, magnet portion cannot be exfoliated further. | sufficient adhering force is maintained than in not treating surface |

Figure 4:
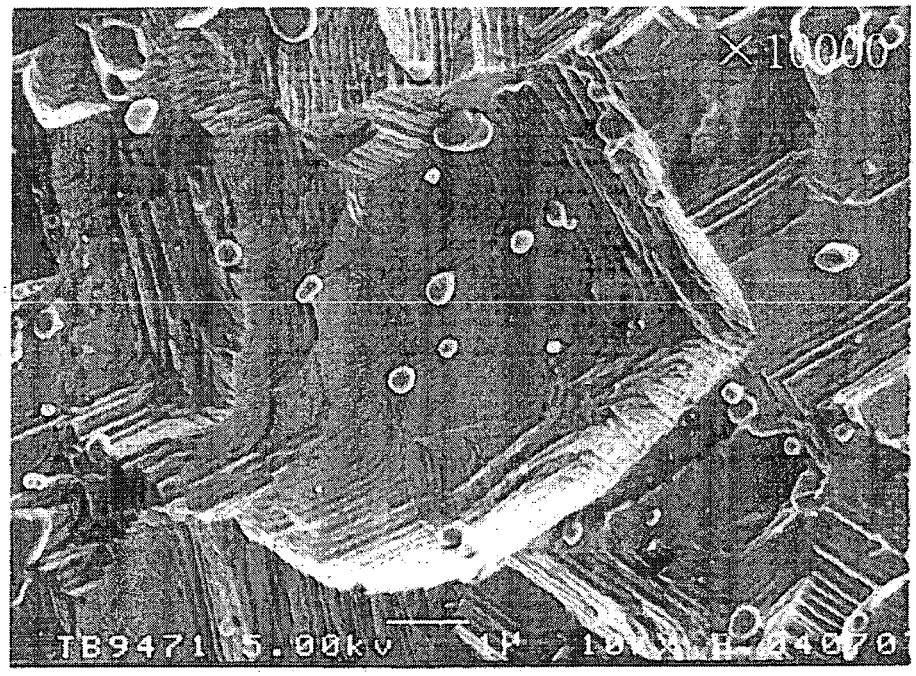
FIG. 4(a) shows a surface of a slinger subjected to a chemical etching treatment observed by a microscope.
FIG. 4(b) shows a surface of a slinger subjected to a chemical etching treatment observed by a microscope.
FIG. 4(c) shows a section showing a state of bonding a slinger and a magnet portion subjected to a chemical etching treatment observed by a microscope.
Figure 4:
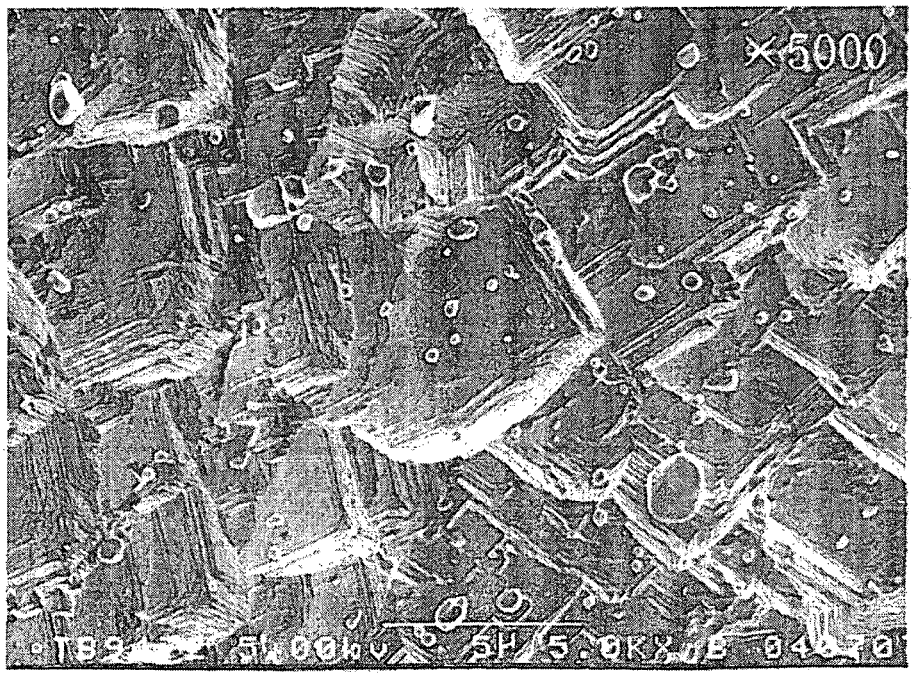
Figure 4:
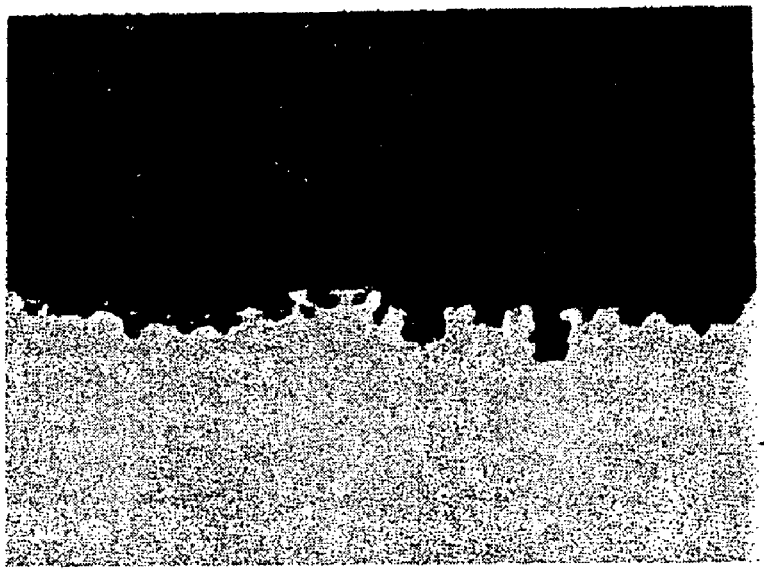

As is apparent from Table 3, although surface roughnesses hardly differ by the recesses and projections treatment, recesses and projections by the chemical etching treatment are constituted by a shape in which an inner portion of a recess portion is widened (FIG. 4(a) and FIG. 4(b)), thereby, the adhering agent is solidly adhered to the metal side by the wedge effect.

Next, as shown by Table 4 shown below, a heat shock test is carried out by using Examples 13 through 15 in which blending of the magnet material of the magnet portion is changed.

TABLE 4

| | Example 13 | Example 14 | Example 15 |
|---|---|---|---|
| Sr ferrite (wt %) | 91 | 89.5 | 91 |
| PA12 (wt %) | 6.5 | 7.6 | 8.7 |
| denatured PA12 (wt %) | 2.0 | 2.4 | 0 |
| Plasticizer | 0.2 | 0.2 | 0 |
| silane coupling agent | 0.3 | 0.3 | 0.3 |
| bending amount (ASTM D790; t = 3.2, room temperature) | 2.8 | 6.2 | 1.6 |
| BHmax [kJ/m$^3$] (MGOe) | 16.6 (2.0) | 14.3 (1.8) | 16.6 (2.0) |
| heat shock test result (120° C. 30 min ⇔ −40° C.30 min) | no crack by 1000 cycles | no crack by 1000 cycles | crack by 50 through 100 cycles |

Sr ferrite: anisotropic Sr ferrite for magnetic field orientation, FERO TOP FM-201 (made by Toda Kogyo)

PA12: PA 12 including copper based heat stabilizer (number average molecular weight 14000), UBE nylon P3014U (made by Ube Kosan)

denatured PA12: denatured PA12 (bending elastic modulus 147 MPa, melting point 154° C.), UBESTA XPA 9055X1 (made by Ube Kosan) plasticizer: p-hydroxy benzoic acid ethylhexyl (paraoxy benzoic acid ethylexyl), POBO (made by API corporation) silane coupling agent: y-aminopropyltriethoxy silane, A-1100 (made by Nippon Unicar)

Further, as a surface treatment of the slinger of Examples 13 through Example 15, similar to Example 11 mentioned above, a chemical blast treatment made by Nippon Parkerizing is carried out. Specifically, recesses and projections are formed by chemically etching an iron oxalate film formed on a surface of a plate member comprising SUS430 having a thickness of 0.6 mm. An arithmetic mean height Ra of recesses and projections is 0.2 through 0.3 μm, a maximum height Rz thereof is 1.8 through 3.1 μm.

Further, a phenolic resin based adhering agent (metalock N-15 made by Toyo Kagaku Kenkyusho) having 30% of a solid component whose major component is resol type phenolic resin is diluted further by three times by methylethylketone and is coated on the surface of the slinger by a dipping treatment. Thereafter, the adhering agent is brought into a semicured state by leaving the adhering agent in a dehydrator at 120° C. for 30 minutes after drying the adhering agent at room temperature for 30 minutes. A SUS430 plate member baked with the adhering agent is set to dies and insert molding of the magnet material is carried out from the inner peripheral portion by the disk gate by constituting the core thereby. After molding, the gate is immediately cut, further, the adhering agent is completely cured by subjecting the adhering agent to secondary heating at 150° C. for 1 hour.

Thereafter, a single member of the encoder portion (inner diameter 66 mm, outer diameter 76 mm, magnet portion thickness 0.9 mm) provided by integrating with the slinger by molding is subjected to a heat shock test repeating a cycle of 30 minutes at 120° C. and 30 minutes at −40° C. Respective 10 pieces of samples of Examples 13 through 15 are subjected to the test and cracks generated at the magnet portions are observed at respective 50 cycle.

As is apparent from Table 4, it is known that by including denatured PA12 resin as the binder, the bending amount of the material per se is increased and crack resistance is promoted.

Next, with regard to the magnet material of the composition of Example 14, magnetic property by presence or absence of a magnetic field is measured by using a magnetic field injection molding machine. Further, a shape of the magnetic encoder is constituted by that shown in FIG. 2 and the size is constituted by the size the same as that of the above-described. Further, the coil current in magnetizing is constituted by a value sufficient for saturation (sufficient for blending), inverse demagnetization is carried out in cooling, and demagnetization is carried out to a magnetic density of 1 mT or smaller by an oil condenser type demagnetizer. Thereafter, the material is overlapped with a magnetizing yoke of 96 poles (NS alternate) and magnetized by 1000 V, 1000 μF, and a magnetic flux density and pitch error are measured by an air gap of 1 mm while rotating the test piece. A result thereof is shown in Table 5.

TABLE 5

| | magnetic field generation | |
|---|---|---|
| | present | not present |
| magnetic flux density (N pole average, mT) | 37 | 27 |
| single pitch error (%; maximum) | 0.40 | 0.32 |

It is confirmed from a result of Table 5 that the magnetic property is promoted by carrying out molding under the magnetic field.

Next, a test is carried out with regard to a change in the magnetic property when the magnetic encoder is fabricated by different injection molding systems. Encoders of Examples 16 through 19 are magnetized in a circumferential direction after having been subjected to injection molding in the circular ring shape. Further, the magnet material of the magnet portion used in the magnetic encoder of Examples 16 through 19 is shown below.

magnet material for test:

strontium ferrite including 12 nylon based anisotropic plastic magnet compound [FEROTOP TP-A27N] (strontium ferrite: 75 volume %) made by Toda Kogyo Example 16

The encoder of Example 16 is molded by a disk gate type injection molding machine and is not oriented by the magnetic field in molding.

Example 17

The encoder of Example 17 is molded by the disk gate type injection molding machine and is oriented by the magnetic field in molding.

Example 18

The encoder of Example 18 is molded by 4 point pin gate type injection molding machine and is not oriented by the magnetic field in molding.

Example 19

The encoder of Example 19 is molded by the 4 point pin gate type injection molding machine and is oriented by the magnetic field in molding.

Table 6 shows a result of measuring magnetic properties (maximum energy products BHmax) of the magnetic encoders of Examples 16 through 19 by using a BH tracer. Further, with regard to measured values of Examples 18 and 19, magnetic properties at the weld portions are measured.

TABLE 6

| | Example 16 | Example 17 | Example 18 | Example 19 |
|---|---|---|---|---|
| gate type | disk gate | disk gate | 4 point pin gate | 4 point pin gate |
| magnetic field orientation | none | present | none | present |
| BH max (MGOe) | 1.8 | 2.1 | 0.8 | 1.6 |

According to Table 6, it is known that an encoder subjected to injection molding by the disk gate type is provided with the magnetic property more excellent than that of the encoder subjected to injection molding by the 4 point pin gate type regardless of presence or absence of magnetic field orientation. That is, according to the disk gate type, a high orientation degree can be achieved by aligning an axis of easy magnetization of respective magnetic powders, thereby, an excellent magnetic property can be achieved. On the other hand, with regard to the 4 point pin gate type, at the weld portion, the magnetic powders in the melted magnet material collide with each other and the axis of easy magnetization becomes random (becomes isotropic) and therefore, the magnetic property is significantly deteriorated. Further, even when the magnetic field orientation is carried out in injection molding by the 4 point pin gate type, it is known that it is difficult to completely orient the magnetic powder at the weld and the magnetic property is inferior to the magnetic property of the encoder molded only by injection molding by the disk gate type without carrying out magnetic field orientation. Further, even when a plastic magnet material including a magnetic powder of rare earth based of SmFeN (samarium-iron-nitrogen) or the like is used, a similar result is provided.

Next, in order to confirm an effect when a groove is formed at an adhering face of the magnet portion, the following test is carried out. Magnet portions of Examples 20 and 21 include strontium ferrite as a magnetic powder and polyamide 12 as a binder, and an encoder having an inner diameter 60 mm, an outer diameter 70 mm, a thickness 0.9 mm is molded by injection molding from raw material pellet formed by agitating a magnet material having a content of the magnet powder of 70 volume % to be needed by a biaxial extruding machine. According to molding conditions, a temperature of heating the resin is 270° C., injection time is 1.5 seconds.

Example 20

The encoder of Example 20 is formed with grooves in a circular ring shape having a section substantially in a trapezoidal shape at peripheral edge portions on an outer diameter side and an inner diameter side of one side end face in an axial direction thereof (that is, adhering face). Further, a surface roughness of the adhering face is made to be 0.8 μmRa by subjecting a die used in injection molding to crimping.

Example 21

The encoder of Example 21 is formed by the dimension the same as that of the encoder of Example 20, and the adhering face is not formed with a groove. Further, a surface roughness of the adhering face is 0.4 μmRa achieved by normal die face finishing.

The encoder of Example 20 is coated with an adhering agent uniformly on a circumference of a center portion in a diameter direction of the adhering face (that is, a middle portion of two pieces of grooves) and is adhered to an attaching member by applying a predetermined pressure. Further, also the encoder of Example 21 is uniformly coated with the same amount of the adhering agent at a portion the same as that of Example 20 and is adhered to the attaching member by applying a predetermined pressure. According to the encoder of Example 21, at either of the inner diameter side and the outer diameter side, the extra adhering agent overflows from the adhering face to outside. On the other hand, according to the encoder of Example 20, the adhering agent overflowing from the adhering face to outside is not recognized, further, the adhering agent is permitted by a capillary phenomenon also to an adhering face riding over the groove (that is, at the peripheral edge portion on the outer diameter side, a plane portion provided contiguously to an outer side in a radius direction of the groove, in the peripheral edge portion on the inner diameter side, a plane portion provided contiguously to an inner side in the radius direction of the groove).

Examples 22 Through 25

Next, with regard to magnetic encoders of Examples 22 through 25, an adhering strength between the encoder and the adhering agent owing to a surface roughness of the adhering face of the encoder is evaluated. Test pieces having a width 24 mm, length 100 mm, thickness 3 mm are molded by injection molding from raw material pellets from Examples 20 and 21. Surface roughnesses of a plane (that is, adhering face) rectified by a width direction and a length direction are changed for respective test pieces by subjecting a die used in injection molding to crimping. An acrylic based adhering agent (LOCTITE 648 made by Henckel corporation) is uniformly coated on the adhering face and the test piece is adhered to a flat plate of SUS430 constituting an attaching member by applying a predetermined pressure. Thereafter, a tensile load orthogonal to the adhering face is applied and a tensile strength is measured by a pulling speed of 5 mm/min. A result thereof is shown in Table 7. Further, Example 22 is a product finished by a normal die face and a surface roughness thereof is 0.4 μmRa.

Further, the tensile strengths of the respective test pieces are relative numerical values when the tensile strength of Example 22 is made to be 100. FIG. 43 shows a graph of a result shown in Table 7.

TABLE 7

| | Example 22 | Example 23 | Example 24 | Example 25 |
|---|---|---|---|---|
| surface roughness [μmRa] | 0.4 | 0.8 | 2.4 | 3.6 |
| tensile strength | 100 | 126 | 135 | 138 |

Figure 46:
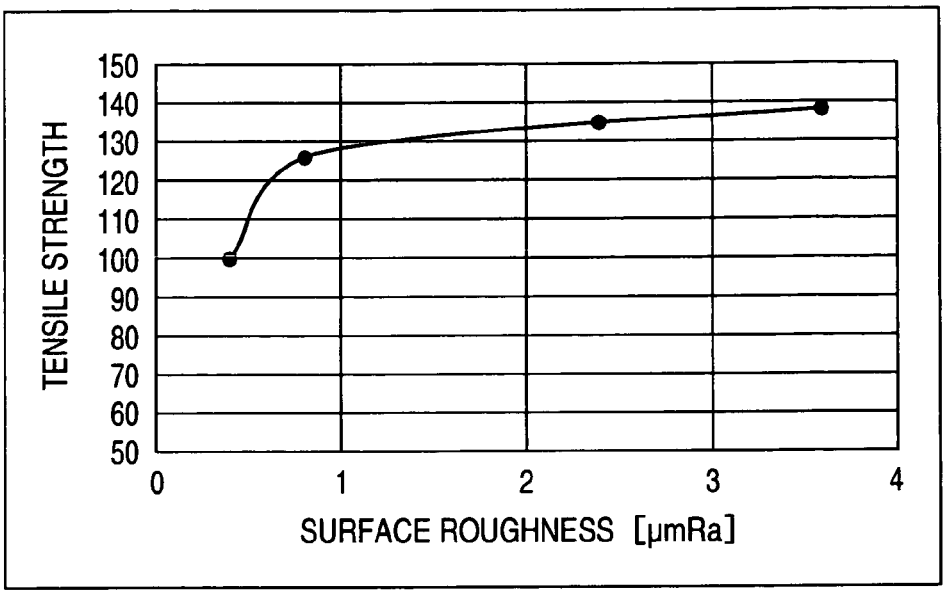
FIG. 46 is a graph showing a relationship between a surface roughness of an adhering face of an encoder and a tensile strength between the encoder and an adhering agent.
Figure 47:
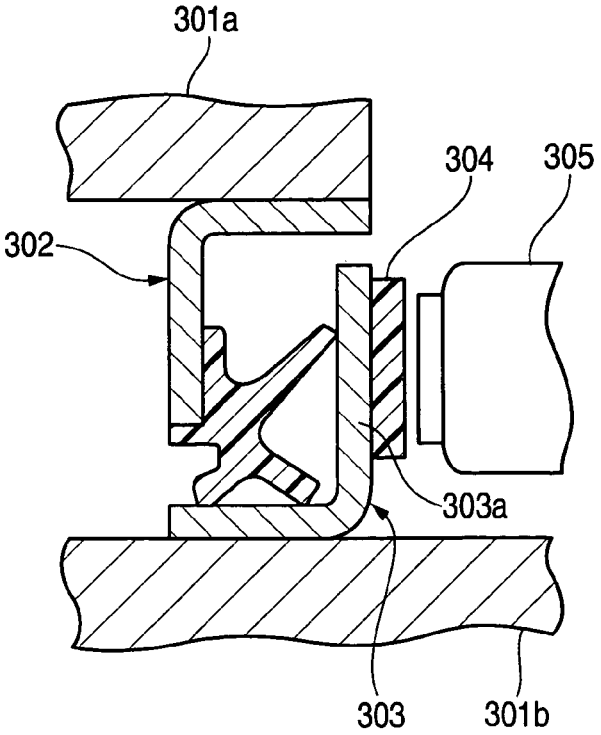
FIG. 47 is a sectional view showing a rolling bearing unit of a background art.

According to Table 7 and FIG. 46, it is known that although the tensile strength is increased in accordance with an increase in the surface roughness of the test piece, when the surface roughness of the adhering face of the test piece becomes less than 0.8 μmRa, the tensile strength is rapidly reduced. Therefore, it is preferable that the surface roughness of the adhering face of the encoder is equal to or larger than 0.8 μmRa.

Examples 26 Through 29

Next, a test is carried out with regard to holding strengths of magnetic encoders of Examples 26 through 29. Table 8 shows constitutions of the magnetic encoders of Examples 26 through 29. The magnet portions of the magnetic encoders of Examples 26 through 29 are subjected injection molding in a cylindrical shape in a state of applying a magnetic field in a thickness direction thereof, made to be axial anisotropy and magnetized with N poles and S poles in a circumferential direction alternately by a total of 96 poles. Further, the magnet portion and the fixed member are integrated by a constitution of the fixed member shown in the seventh embodiment.

TABLE 8

| | Example 26 | Example 27 | Example 28 | Example 29 |
|---|---|---|---|---|
| magnet portion | PA 12 based axially anisotropic plastic magnet (BHmax: 2.3 MGOe) including 75 volume % of strontium ferrite 96 (48 × 2) poles | PPS based axially anisotropic bond magnet (BHmax: 7.2 MGOe) including 75 volume % of SmFeN 96 (48 × 2) poles | PA 12 based axially anisotropic bond magnet (BHmax: 11.9 GOe) including 75 volume % of Nd—Fe—B 96 (48 × 2) poles | PA 12 based axially anisotropic plastic magnet (BHmax: 2.3 MGOe) including 75 volume % of strontium ferrite 96 (48 × 2) poles |
| Slinger | SUS430 | SUS430 | SUS430 | SUS430 |
| high frequency welding | none | none | none | present |
| seal lip portion rubber material | NBR including carbon black, clay etc | FKM including carbon black, diatomite etc | NBR including carbon black, clay etc | NBR including carbon black, clay etc |
| Holding strength | O | O | O | O |

Examples 30, 31

Further, Table 9 shows constitutions of encoders of Example 30 and Example 31. Permanent magnets of the encoders of Example 30 and Example 31 are molded by injection molding in a cylindrical shape in a state of applying a magnetic field in a radius direction, made to be radial anisotropy and magnetized with N poles and S poles in a circumferential direction alternately by a total of 96 poles. Further, the magnet portion and the fixed member are integrated by a constitution of the fixed member shown in the seventh embodiment.

TABLE 9

| | Example 30 | Example 31 |
|---|---|---|
| magnet portion | PA 12 based radial anisotropic plastic magnet (BHmax: 2.3 MGOe) including 75 volume % of strontium ferrite 96 (48 × 2) poles | PPS based radial anisotropic bond magnet (BHmax 7.2 MGOe) including 75 volume % of SmFeN 96 (48 × 2) poles |
| Slinger | SUS430 | SUS430 |
| Holding Strength | O | O |

In any of Example 26 through Example 31, the permanent magnet is not detached from the fixed member in a rotating test. Further, depending on the content of the magnetic powder, the magnetic flux density which has been about 20 mT in the background art can be increased to be equal to or larger than 26 mT. Therefore, when the air gap between the permanent magnet of the sensor is made to be 1 mm similar to that of the background art, the permanent magnet which has been magnetized in multipoles of 96 poles in the background art can be magnetized in multipoles equal to or larger than 120 poles while maintaining a magnetic flux per pole. At this occasion, the single pitch error can be made to be equal to or smaller than ±2%. That is, according to the encoder according to the invention, when an air gap equivalent to that of the background art is constituted, accuracy of detecting the rotational speed of the wheel can be promoted by increasing a number of poles of the permanent magnet. Further, when a pole number of the magnet is made to be equal to that of the background art, the air gap can be enlarged, and a degree of freedom in arranging a sensor can be promoted.

Although an explanation has been given of the invention in details and in reference to the specific embodiments, it is apparent for the skilled person that the invention can variously be changed or modified without deviating from the spirit and the range of the invention.

The application is based on Japanese Patent Application (Japanese Patent Application No. 2004-014033), filed on Jan. 22, 2004, Japanese Patent Application (Japanese Patent Application No. 2004-024111), filed on Jan. 30, 2004, Japanese Patent Application (Japanese Patent Application No. 2004-148741), filed on May 19, 2004, Japanese Patent Application (Japanese Patent Application No. 2004-289967), filed on Oct. 1, 2004, and a content thereof is incorporated herein by reference.

INDUSTRIAL APPLICABILITY

The invention provides the highly reliable magnetic encoder having a high magnetic property and enabling to detect a rotational number with high accuracy and is utilized for detecting a rotational number of a rotating member in a rolling bearing unit, a main shaft apparatus, a hub unit bearing or the like.

The invention claimed is:

1. A bearing for a wheel comprising:

a fixed ring, a rotating ring, a plurality of rolling members rollably arranged in a circumferential direction between the fixed ring and the rotating ring, and a magnetic encoder, wherein:

the magnetic encoder comprises a magnet portion substantially in a circular ring shape magnetized in multipoles in a circumferential direction and a fixed member, the magnet portion is bonded to the fixed member and includes a magnetic member and a thermoplastic resin, the magnet portion and the fixed member are bonded by [at least one of] a phenolic resin based adhering agent [and an epoxy resin based adhering agent], [and]

the adhering agent is baked to the fixed member in a semicured state and further cured in a process of forming the magnet portion by insert molding, *and*

*the magnetic member is strontium ferrite, and the thermoplastic resin is polyamide based resin.*

[2. The bearing according to claim 1, wherein the thermoplastic resin is polyamide based resin or polyphenylene sulfide (PPS).]

3. The bearing according to claim [2] *1*, wherein the thermoplastic resin is polyamide 6, polyamide 12, polyamide 612 or polyamide 11.

4. The bearing according to claim 3, wherein the thermoplastic resin contains a silane coupling agent or an oxidization preventing agent.

[5. The bearing according to claim 2, wherein the thermoplastic resin is polyamide 12, polyamide 612, polyamide 11 or polyphenylene sulfide (PPS).]

6. The bearing according to claim 1, wherein a flexural deflection at 23° C. of the magnet portion (thickness t =3.0 mm, ASTM D790; span distance of 50 mm) is within a range of 2 to 10 mm.

7. The bearing according to claim 6, wherein the thermoplastic resin includes a [thermoplastic] *denatured polyamide* resin at least having a soft segment in a molecule.

[8. The bearing according to claim 6, wherein a plasticizer is included by about 0.1 through 4 weight % in total weight.]

9. The bearing according to claim 1, wherein

[the magnet portion includes at least ferrite as the magnetic member, and]

the [magnetic member] *magnet portion* includes 60 through 80 volume % of a magnet [portion] *powder*.

10. The bearing according to claim 9, wherein the magnetic member of the magnet portion is an anisotropic magnet which is orientated by a magnetic field.

11. The bearing according to claim 9, wherein [the] magnetic property of the magnet portion is in a range of 1.3 through 15 MGOe as a maximum energy product (BHmax).

12. The bearing according to claim 11, wherein the magnetic property of the magnet portion is in a range of 1.63 through 2.38 MGOe as a maximum energy product (BHmax).

13. The bearing according to claim 12, wherein a flexural deflection at 23° C. of the magnet portion (thickness t =3.0 mm, ASTM D790; span distance of 50 mm) is [n] *in* a range of 2 through 10 mm.

14. The bearing according to claim 9, wherein a number of poles of the magnet portion is about 70 through 130 poles, and a single pitch error is equal to or smaller than ±2 %.

[15. The bearing according to claim 1, wherein the magnet portion and the fixed member are bonded by said phenolic resin based adhering agent.]

[16. The bearing according to claim 1, wherein the magnet portion and the fixed member are bonded by said epoxy resin based adhering agent.]

17. The bearing according to claim 1, wherein [the] *a* bonding surface of the fixed member has recesses and projections having 0.2 through 2.0 μm by an arithmetic mean height Ra and about 1.5 through 10 [pm] *μm* by a maximum height Rz.

18. The bearing according to claim 1, wherein the magnet portion pinches a flange portion of the fixed[,] member so that the magnet portion and the fixed member are mechanically bonded.

19. The bearing according to claim 18, wherein [the] *a* bonding surface of the fixed member has recesses and projections having 0.2 through 2.0 μm by an arithmetic mean height Ra and about 1.5 through 10 μm by a maximum height Rz.

[20. The bearing according to claim 18, wherein said phenolic resin based adhering agent or said epoxy resin based adhering agent are used together.]

21. The bearing according to claim 1, wherein a notched portion is provided on an outer circumference of a flange portion of the fixed member, and the magnet portion and the fixed member are mechanically bonded by the notched portion.

22. The bearing according to claim 21, wherein [the] *a* bonding surface of the fixed member has recesses and projections having 0.2 through 2.0 μm by an arithmetic mean height Ra and about 1.5 through 10 μm by a maximum height Rz.

[23. The bearing according to claim 21, wherein said phenolic resin based adhering agent or said epoxy resin based adhering agent are used together.]

24. The bearing according to claim 1, wherein the fixed member includes a plurality of members, and is mechanically bonded to the magnet portion.

* * * * *